FIG. I

INVENTOR
A. E. JOEL, JR.
BY
William F. Simpson
ATTORNEY

INVENTOR
A. E. JOEL, JR.
BY
William F. Simpson.
ATTORNEY

March 24, 1959  A. E. JOEL, JR  2,879,338
IDENTIFICATION SYSTEM
Filed Feb. 9, 1953  29 Sheets-Sheet 3

INVENTOR
A. E. JOEL, JR.
BY William F. Simpson,
ATTORNEY

March 24, 1959

A. E. JOEL, JR 2,879,338

IDENTIFICATION SYSTEM

Filed Feb. 9, 1953

INVENTOR
A. E. JOEL, JR.
BY
William F. Simpson.
ATTORNEY

March 24, 1959  A. E. JOEL, JR  2,879,338
IDENTIFICATION SYSTEM
Filed Feb. 9, 1953  29 Sheets-Sheet 10

INVENTOR
A.E. JOEL, JR.
BY William F. Simpson
ATTORNEY

March 24, 1959

A. E. JOEL, JR 2,879,338

IDENTIFICATION SYSTEM

Filed Feb. 9, 1953

INVENTOR
A.E. JOEL, JR.
BY William F. Simpson

ATTORNEY

March 24, 1959  A. E. JOEL, JR  2,879,338
IDENTIFICATION SYSTEM
Filed Feb. 9, 1953  29 Sheets-Sheet 18

INVENTOR
A. E. JOEL, JR.
BY William F. Simpson
ATTORNEY

March 24, 1959

A. E. JOEL, JR 2,879,338

IDENTIFICATION SYSTEM

Filed Feb. 9, 1953

INVENTOR
A. E. JOEL, JR.
BY
William F. Simpson.

ATTORNEY

March 24, 1959

A. E. JOEL, JR 2,879,338

IDENTIFICATION SYSTEM

Filed Feb. 9, 1953

INVENTOR
*A.E. JOEL, JR.*
BY
*William F. Simpson.*

ATTORNEY

INVENTOR
A.E. JOEL, JR.
BY William F. Simpson.
ATTORNEY

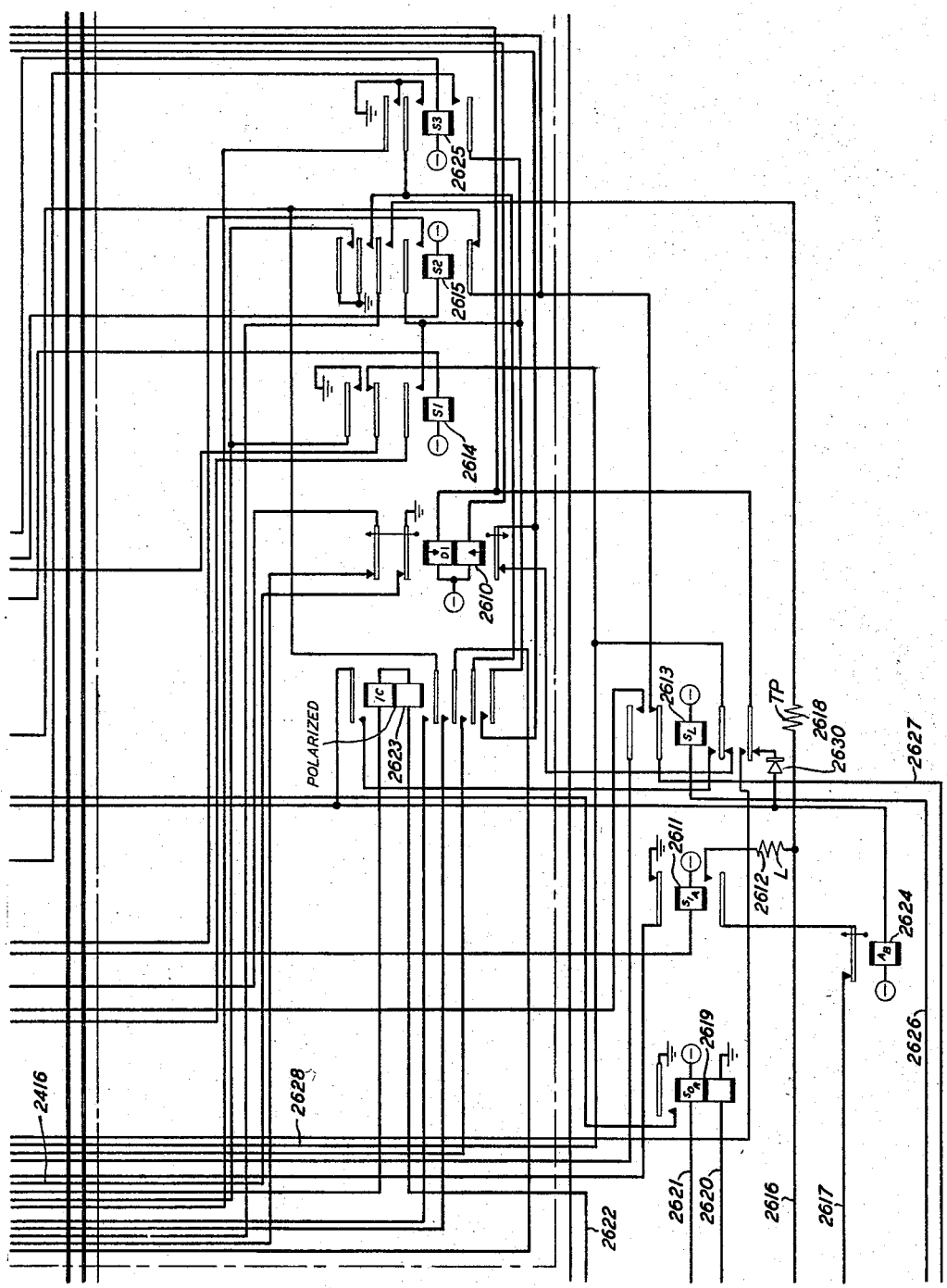

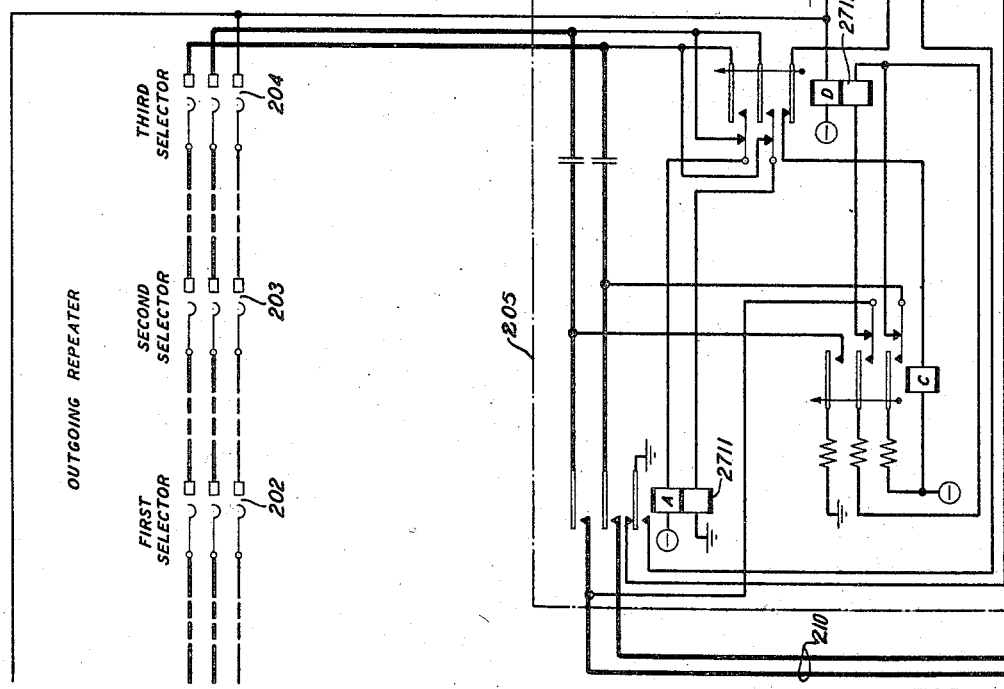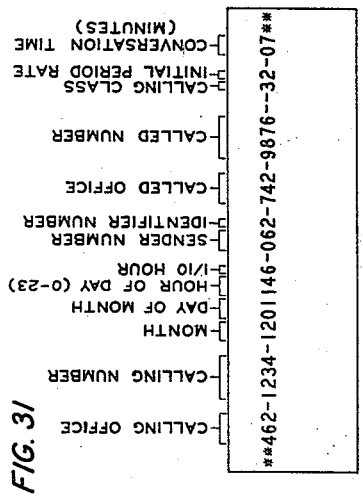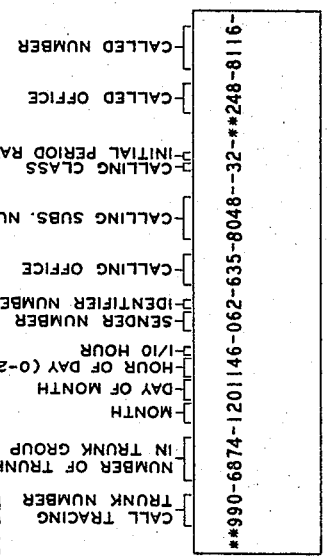

INVENTOR
A.E. JOEL, JR.
BY William F. Simpson
ATTORNEY

March 24, 1959

A. E. JOEL, JR 2,879,338

IDENTIFICATION SYSTEM

Filed Feb. 9, 1953

INVENTOR
A. E. JOEL, JR.
BY *William F. Simpson*
ATTORNEY

United States Patent Office 2,879,338
Patented Mar. 24, 1959

2,879,338

IDENTIFICATION SYSTEM

Amos E. Joel, Jr., South Orange, N.J., assignor to Bell Telephone Laboratories, Incorporated, New York, N.Y., a corporation of New York Application February 9, 1953, Serial No. 335,640

18 Claims. (Cl. 179—18)

This invention relates to telephone systems and more particularly to methods, circuits and apparatus for tracing to the origin calls in dial telephone switching systems.

An object of this invention is to provide circuits, apparatus, equipment and methods to enable a subscriber to cause automatic switching equipment to operate automatically without the aid of an operator or an attendant which equipment will trace to the origin a call and automatically print both the called and calling subscriber's directory numbers as well as identify certain of the trunks or communication paths employed in establishing the connection.

Subscribers are sometimes seriously annoyed by calls which are repeatedly made to their lines by persons whose sole object is to maliciously annoy them. At these times and at other times when calls are made to a particular line for the purpose of making blackmailing or extortional threats, it is highly desirable to be able to trace to the origin all such calls.

In manual exchange areas it is comparatively a simple matter for an operator to trace to the origin any call at the request of the called party. However, in exchange areas equipped with dial switching equipment not requiring the services of an operator to establish connections, it has been very difficult heretofore to trace such annoyance calls because an established connection is interrupted as soon as the calling party restores his receiver to the switchhook and all record of the call is usually lost.

It is, therefore, an object of this invention to provide methods, systems and facilities to enable the subscriber in a dial switching area connected to a dial switching telephone exchange to have calls to his line automatically traced to the subscriber's station originating the call and thereafter or concurrently therewith print information relative to the call. The equipment provided in accordance with this invention does not require the services of an operator or attendant at the central station with the result that it may be called into operation at once so that the tracing of the call can be initiated at any desired time by the called subscriber.

In accordance with an exemplary embodiment of the invention set forth herein the subscriber who complains that he is being annoyed is provided with an additional line circuit and switchhook, button or key-controlled contact. In addition, special call tracing equipment is provided at the exchange which cooperates with the automatic ticketing equipment provided at telephone exchanges for automatically printing charge tickets. This automatic equipment at the central station is called into operation by the actuation of the special key at the called subscriber's station and is employed to trace the call to the trunk or line over which the call arrives at the subscriber's station. The automatic call tracing equipment then initiates another call back to the exchange of origin of the trunk and further transmits signals to control switches at this station to direct the call tracing equipment at said exchange of origin to select the outgoing terminals of the trunk over which the annoyance call was transmitted to the called subscriber's station. The call tracing equipment at the central station to which the originating subscriber is connected then traces the call through the switches at this exchange and determines the calling subscriber's number. The call tracing equipment then transmits the number to the call tracing equipment at the exchange to which the called subscriber is connected where this information together with the directory number of the called subscriber is printed on a special ticket together with the time and date of the call. Thereafter, the call tracing equipment is dismissed and available for tracing other calls to the same or other subscribers in a similar manner.

In the exemplary embodiment set forth herein the call tracing equipment is arranged to cooperate with the switches in a so-called step-by-step switching system. It is to be understood, of course, that it may be arranged to cooperate with other types of switching systems. Furthermore, for the purpose of illustration two central switching stations are shown in the drawings. The call originating subscriber's station is shown connected to one of these stations and the called subscriber station is connected to the other. It is to be understood, of course, that both subscribers' stations may be connected to the same central switching station. Of course, the arrangements shown herein are not limited to two central switching stations but may be applied to a plurality of switching stations all of which cooperate one with another.

Another object of this invention is to provide improved methods, circuits and facilities for automatically identifying the trunk circuit over which a call to a given subscriber's station arrives.

Another object of this invention relates to improved control circuits, methods and apparatus for concurrently printing numerals or symbols identifying central offices, trunk circuits, subscribers' lines, etc. and transmitting signals representing the numerals and symbols identifying the said central offices, trunks, circuits, subscribers' lines, etc.

A feature of this invention relates to methods, circuits and apparatus for checking the numbers or identifying subscribers' stations characterized in that upon the connection to a circuit extending to a line or trunk to be identified means are provided for maintaining the established connection independent of the supervisory condition of said connection until the circuit, line or station has been identified.

Another feature of this invention relates to an improved switching or hunting means to direct an identifier to search through both the tip fields and ring fields in an effort to identify the tip party or ring party of a two-party line as well as individual lines.

A feature of this invention relates to improved circuits, apparatus and methods for circuits cooperating with automatic call identifying and ticketing apparatus whereby this apparatus may be used without alteration for tracing calls through an automatic telephone switching exchange.

Another feature of this invention relates to improved circuits, methods and apparatus for registering information in an automatic call identifying and ticketing sender which information identifies trunk circuits and exchanges from which said trunk circuits extend.

A feature of this invention relates to improved circuits, apparatus and methods for registering in a call identifying sender the identity of a party making a call to another subscriber's line in a fully automatic telephone exchange system.

Another feature of this invention relates to improved circuits, methods and apparatus for employing a call tracing and ticketing sender in two or three different manners to obtain information and then to record this information on a single ticket.

Another feature of this invention relates to apparatus and equipment for printing upon a ticket the identity of a trunk, the identity of a central office connected to the distant end of said trunk, the identity of a calling subscriber's line at said distant office and the identity of the line to which said call from the distant office over said trunk is directed.

Another feature of this invention is directed to circuits, apparatus and methods for initiating a call tracing call from one central office to another central office over the interoffice trunks normally employed to establish calls from one office to said other office.

Another feature of this invention is directed to automatic means for transmitting signals for controlling automatic switching equipment to automatically extend a connection from a call tracing sender to a trunk circuit extending to a distant office.

Another feature of this invention relates to controlling call identifying equipment at a central office over a trunk circuit and then transmitting signals representing the identity of a circuit determined by said call identifying circuit back over said trunk circuit.

The foregoing objects and features of this invention may be more readily understood from the following description when it is read with reference to the attached drawings in which:

Figs. 2 to 29 show in detail the various circuits represented in Fig. 1 when Figs. 2 through 29, inclusive, are arranged adjacent one another as shown in Fig. 30;

Figure 2:
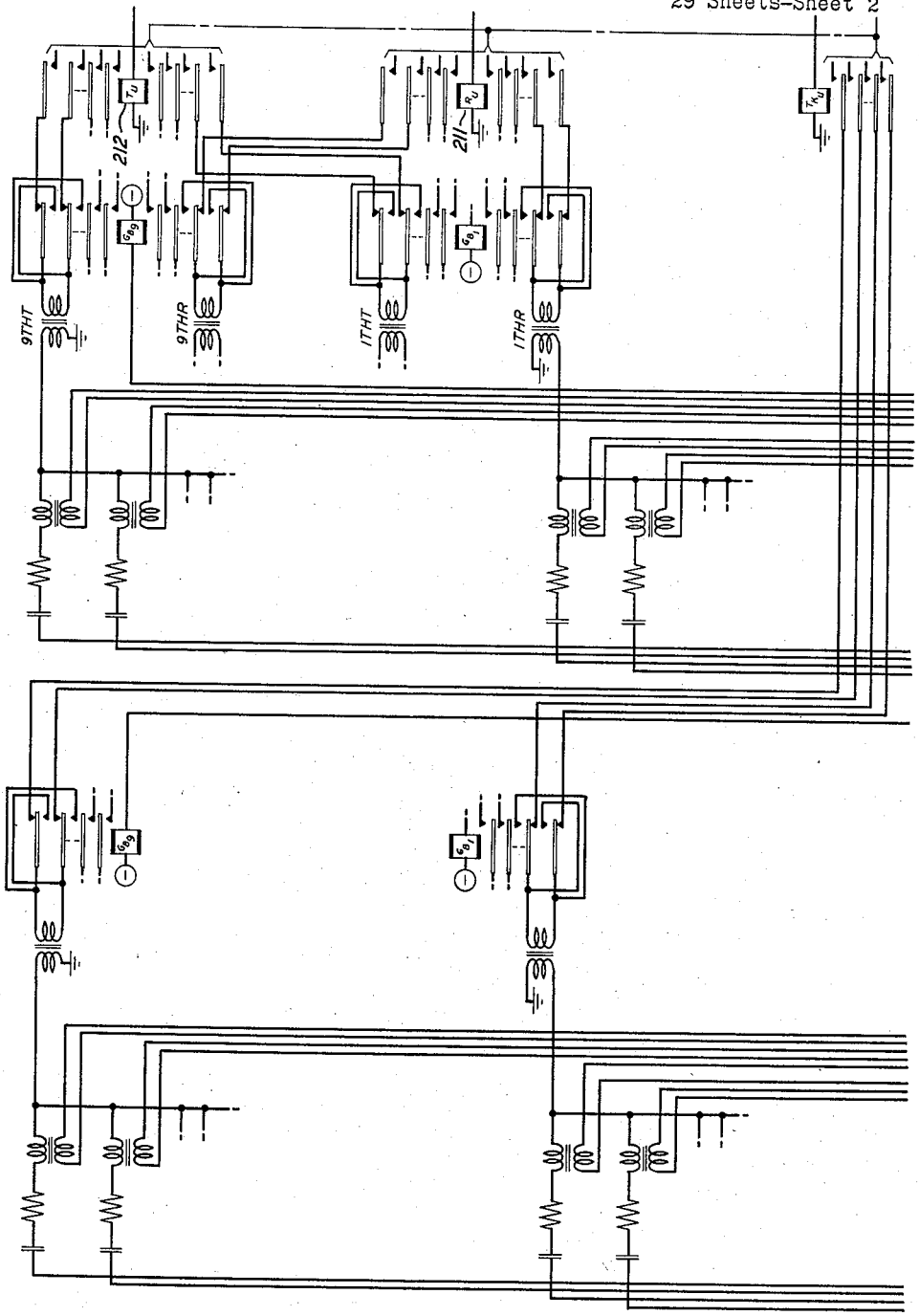
Figure 3:
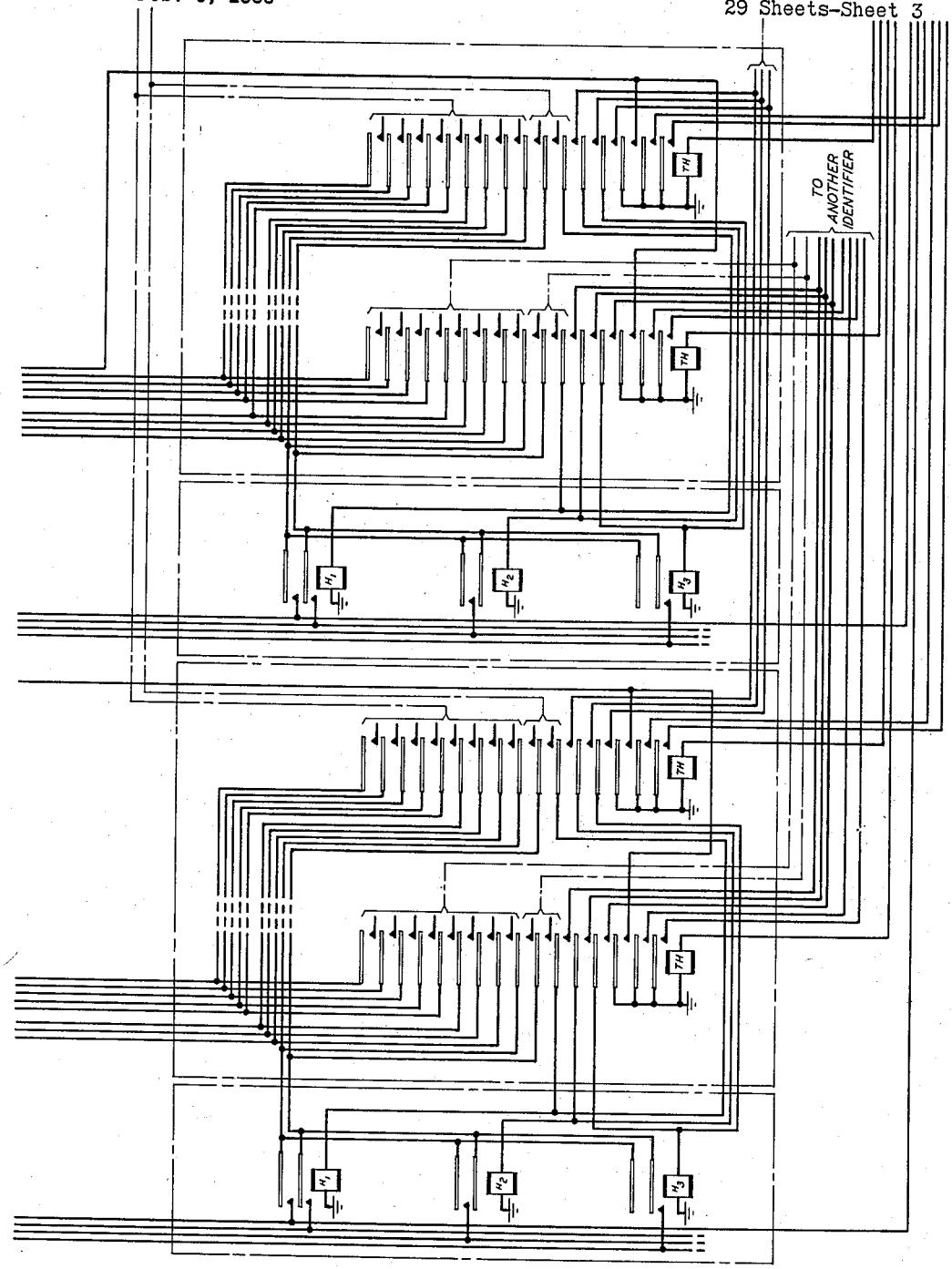
Figure 4:
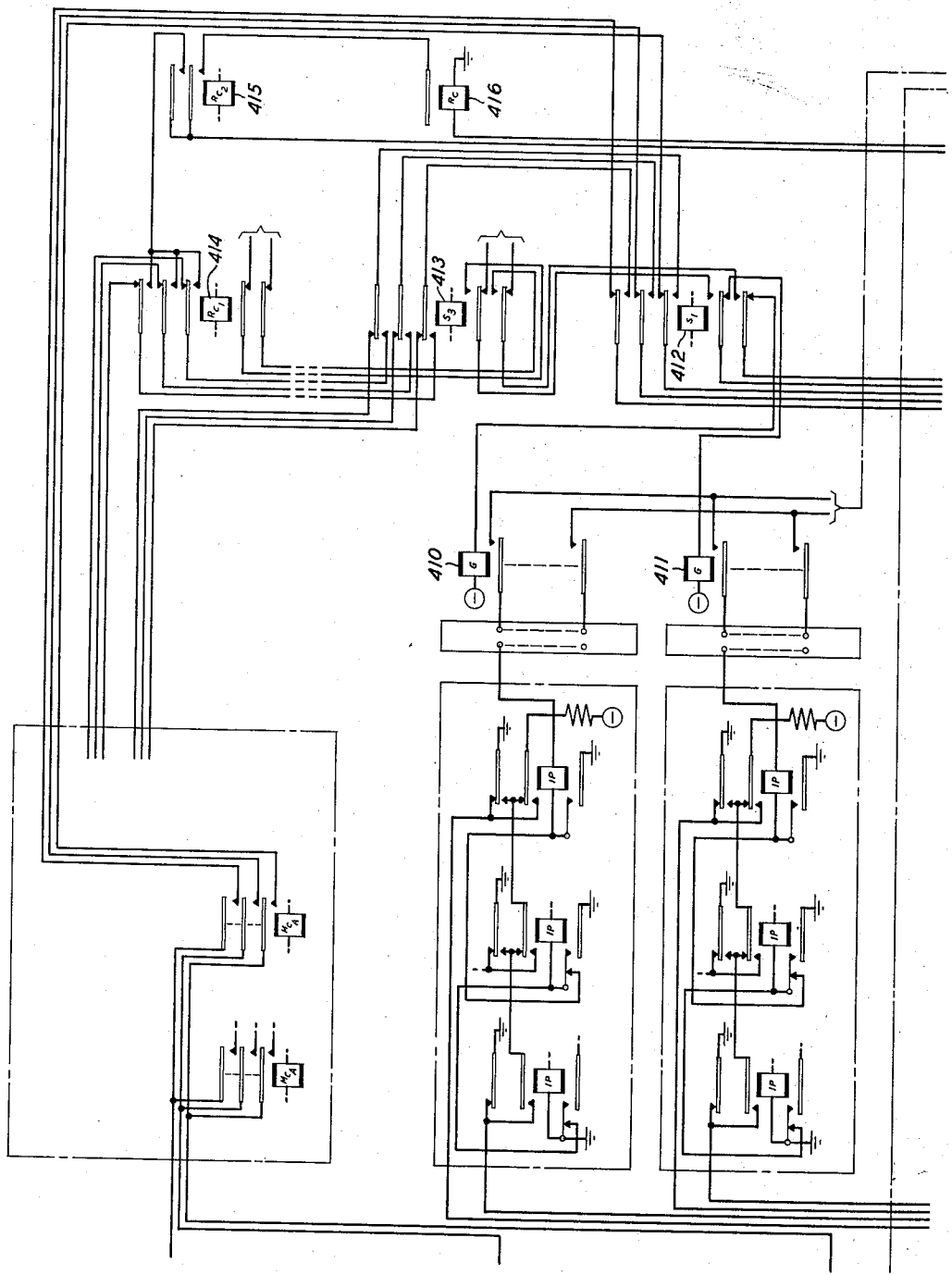
Figure 5:
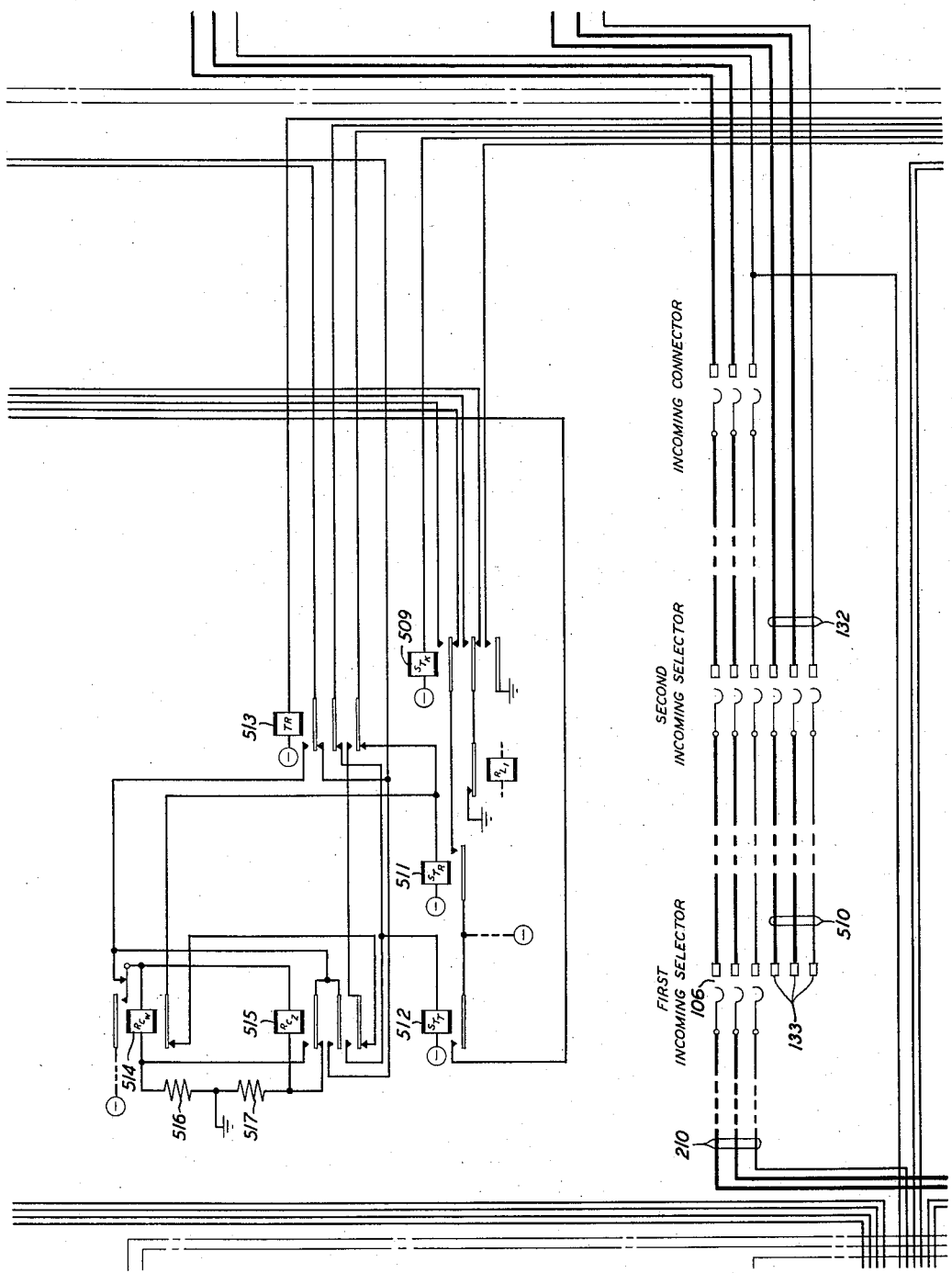
Figure 6:
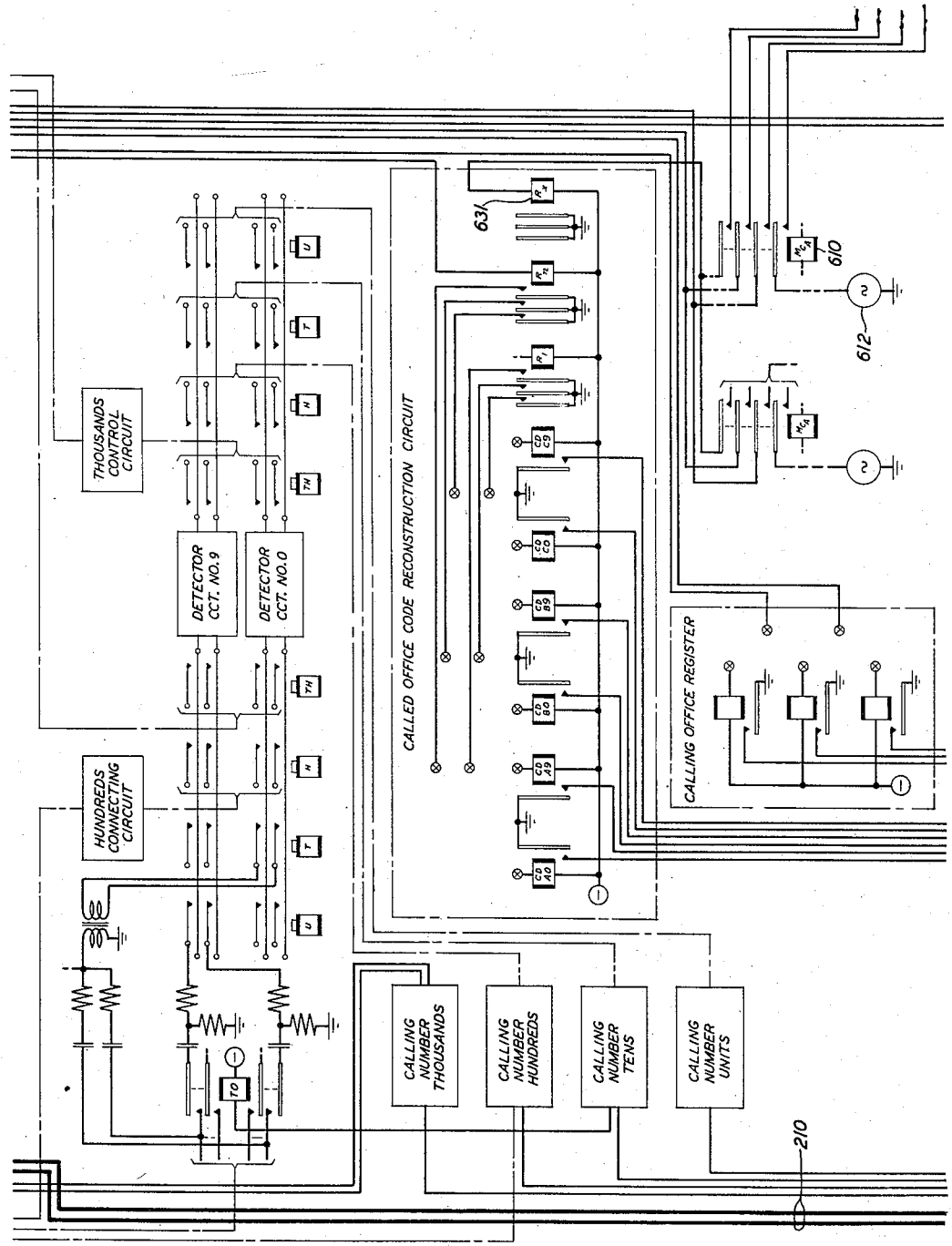
Figure 7:
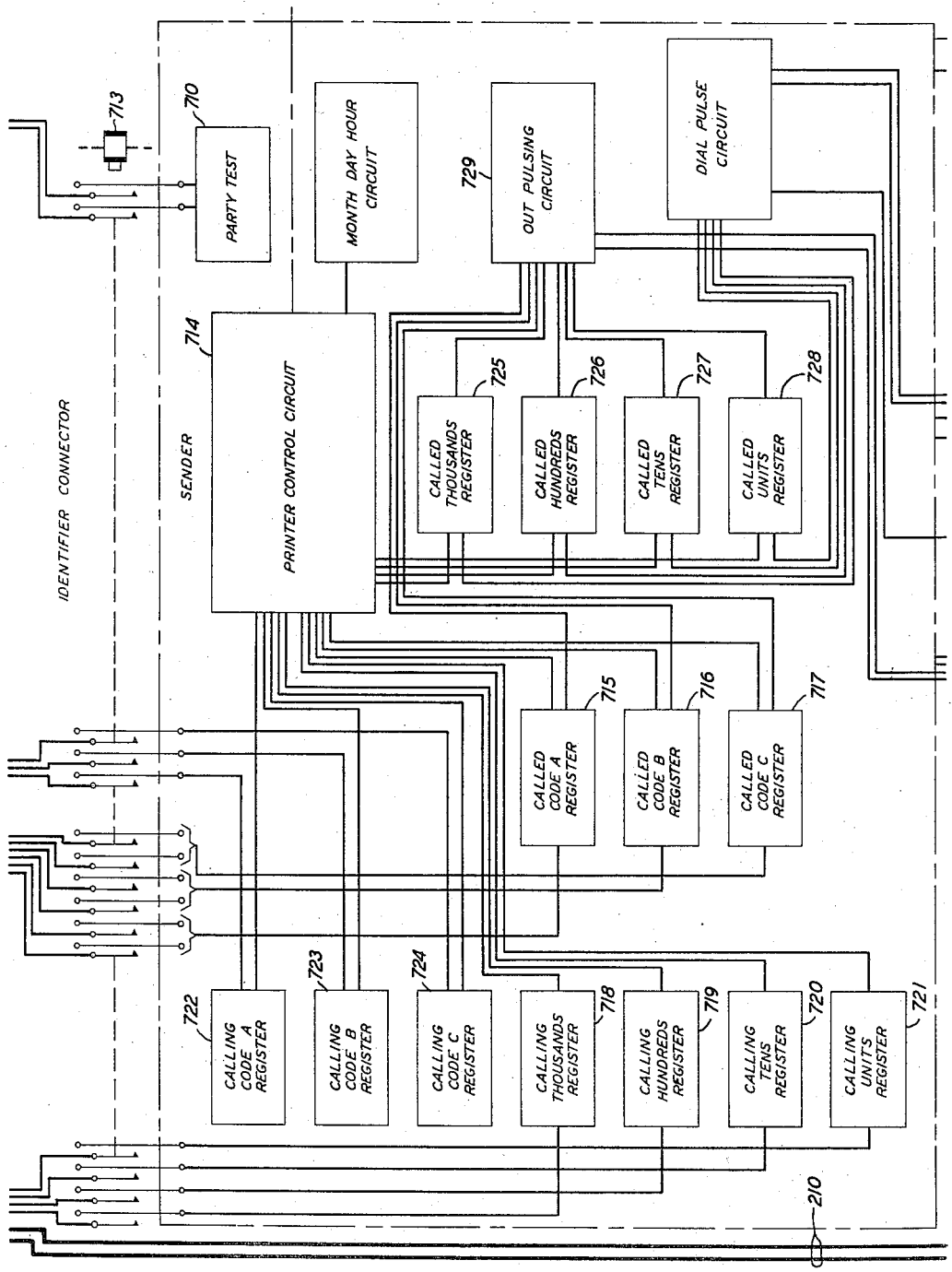
Figure 8:
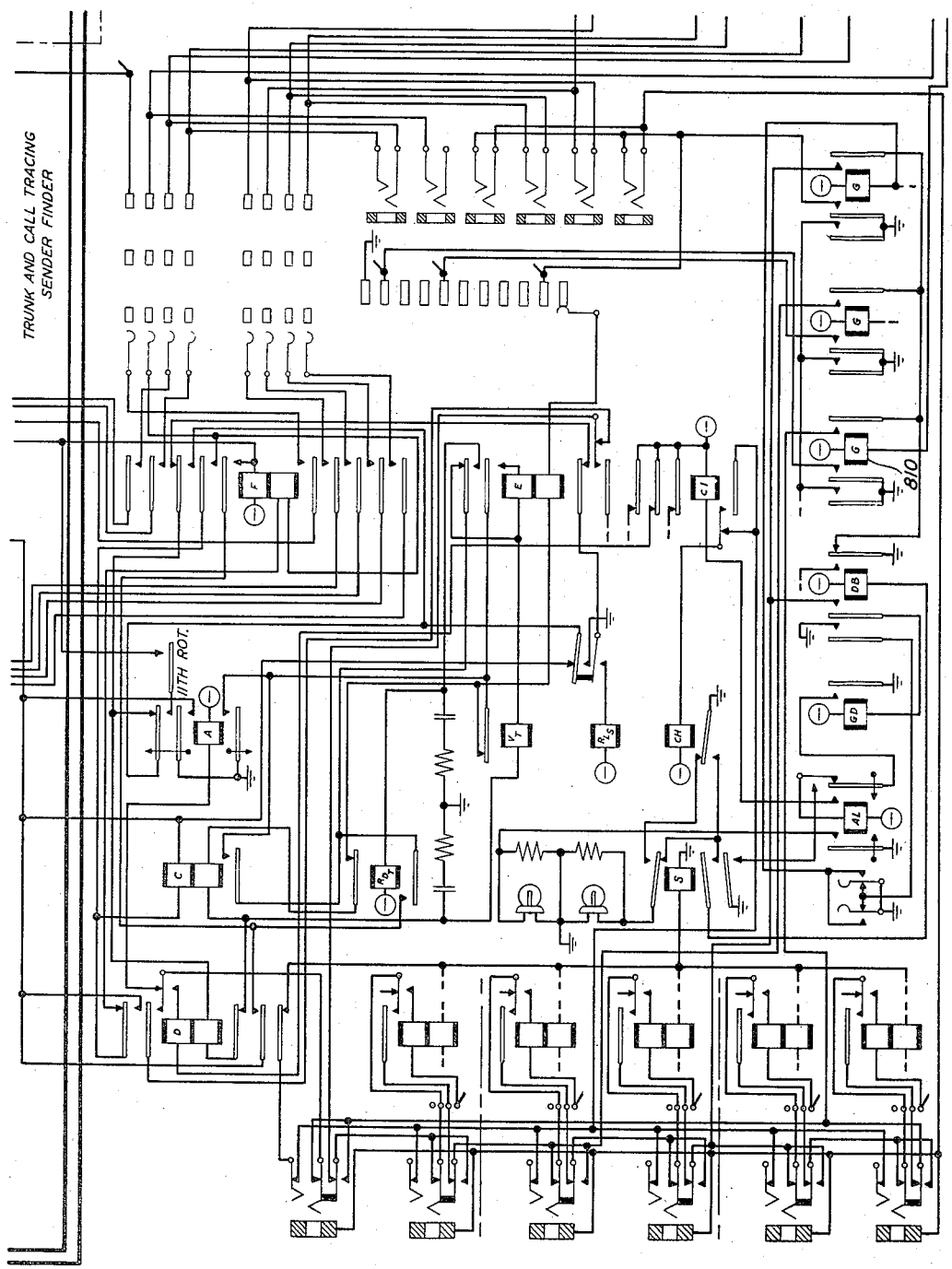
Figure 9:
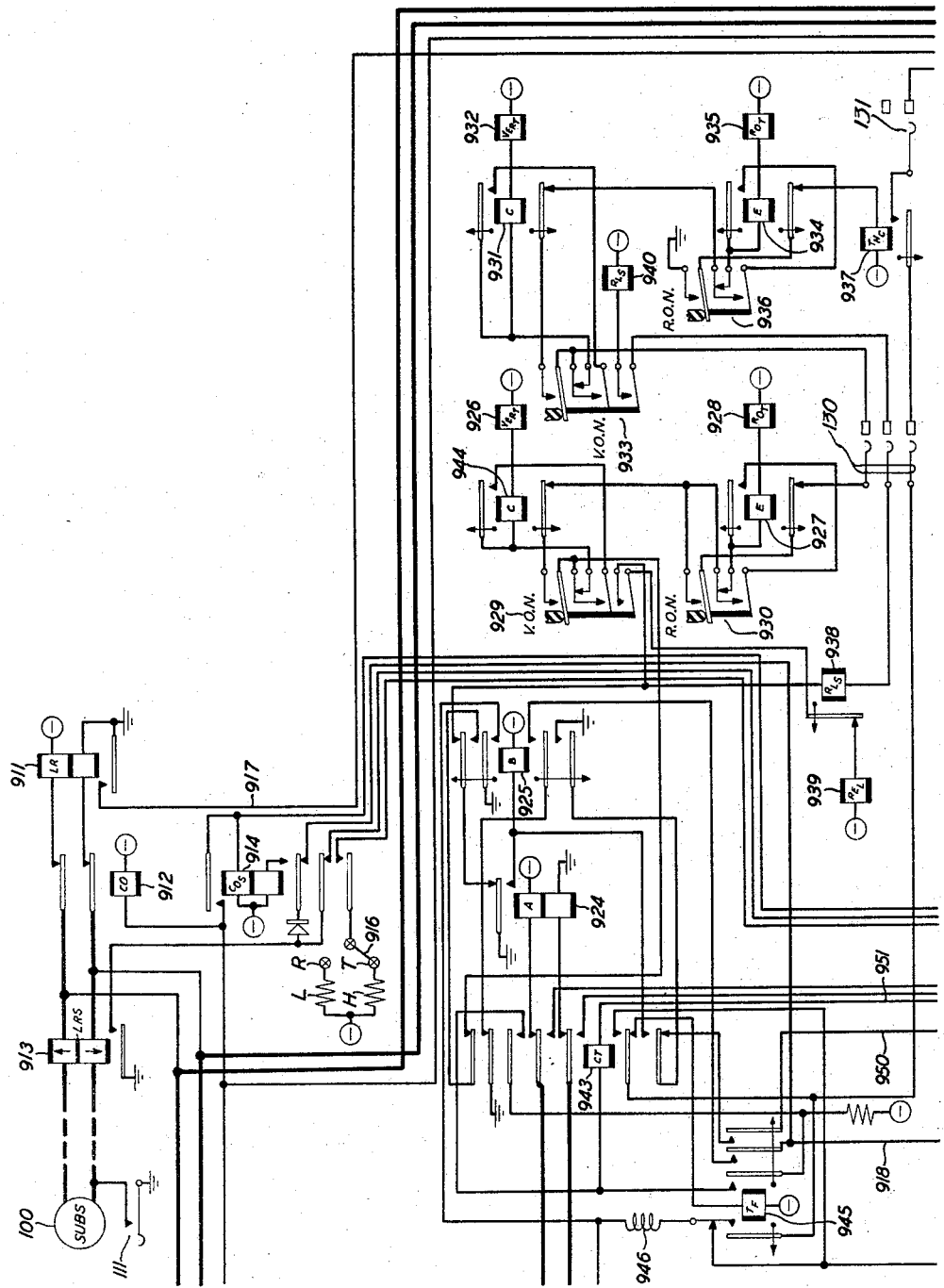
Figure 10:
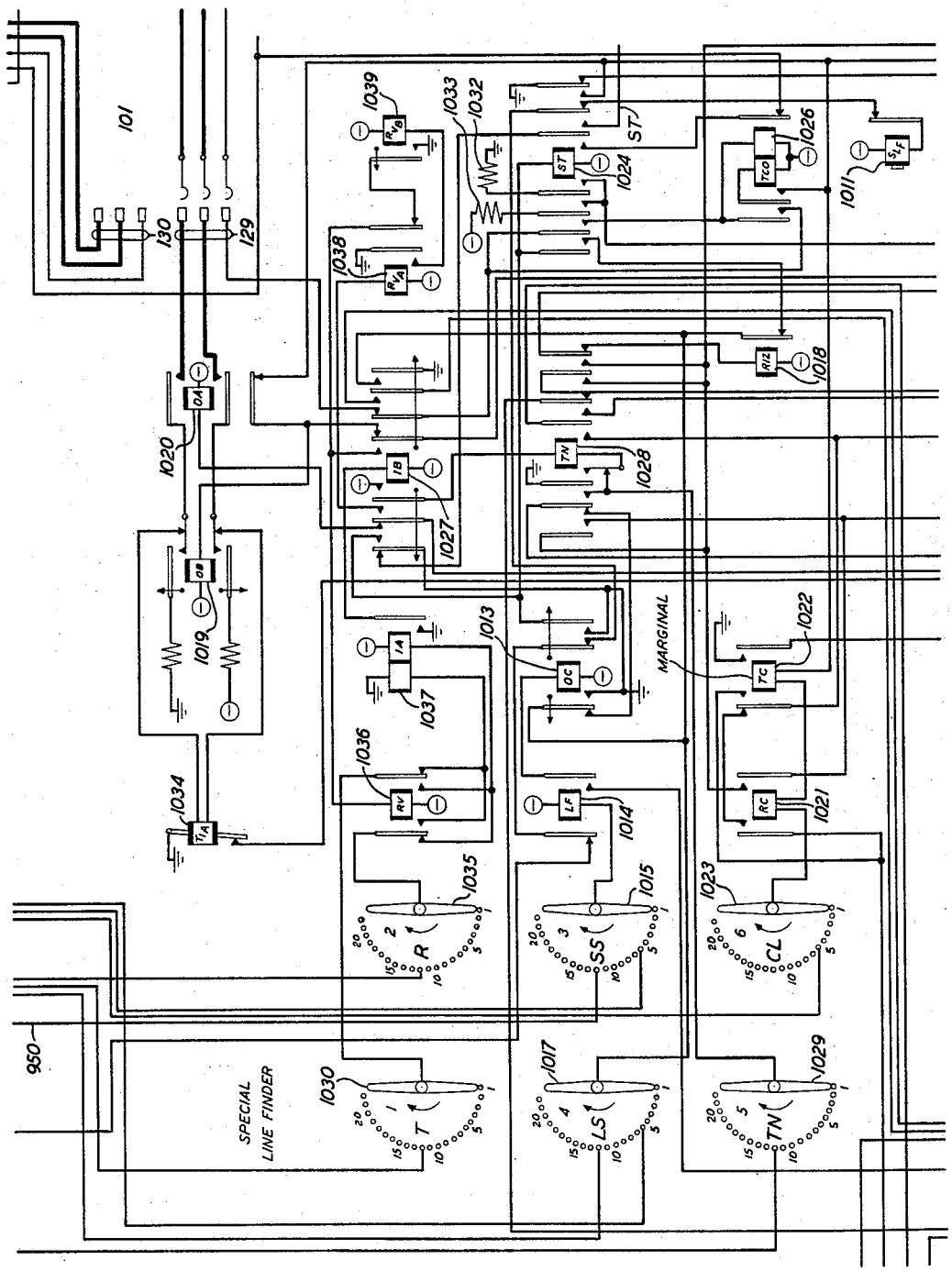
Figure 11:
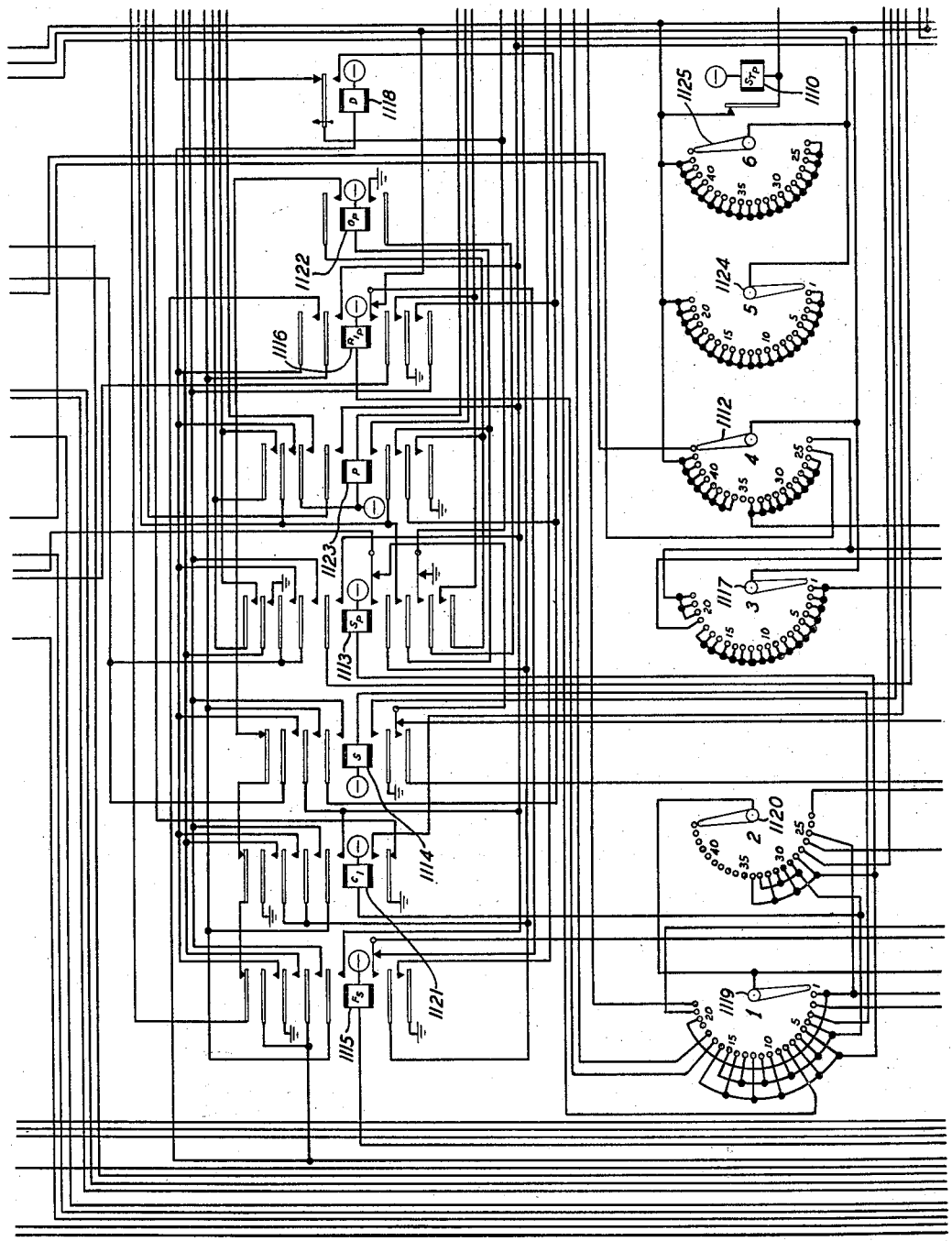
Figure 12:
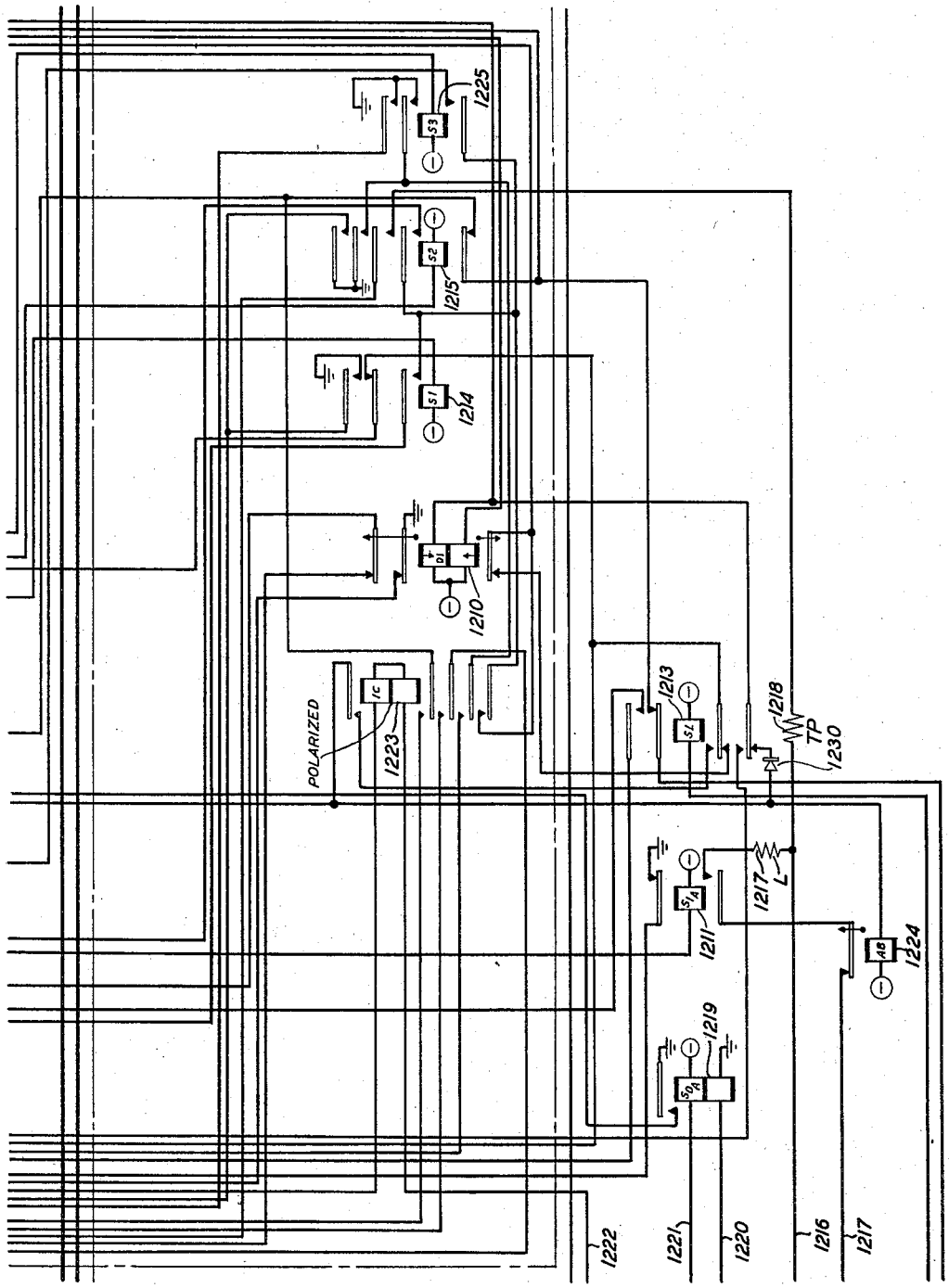
Figure 13:
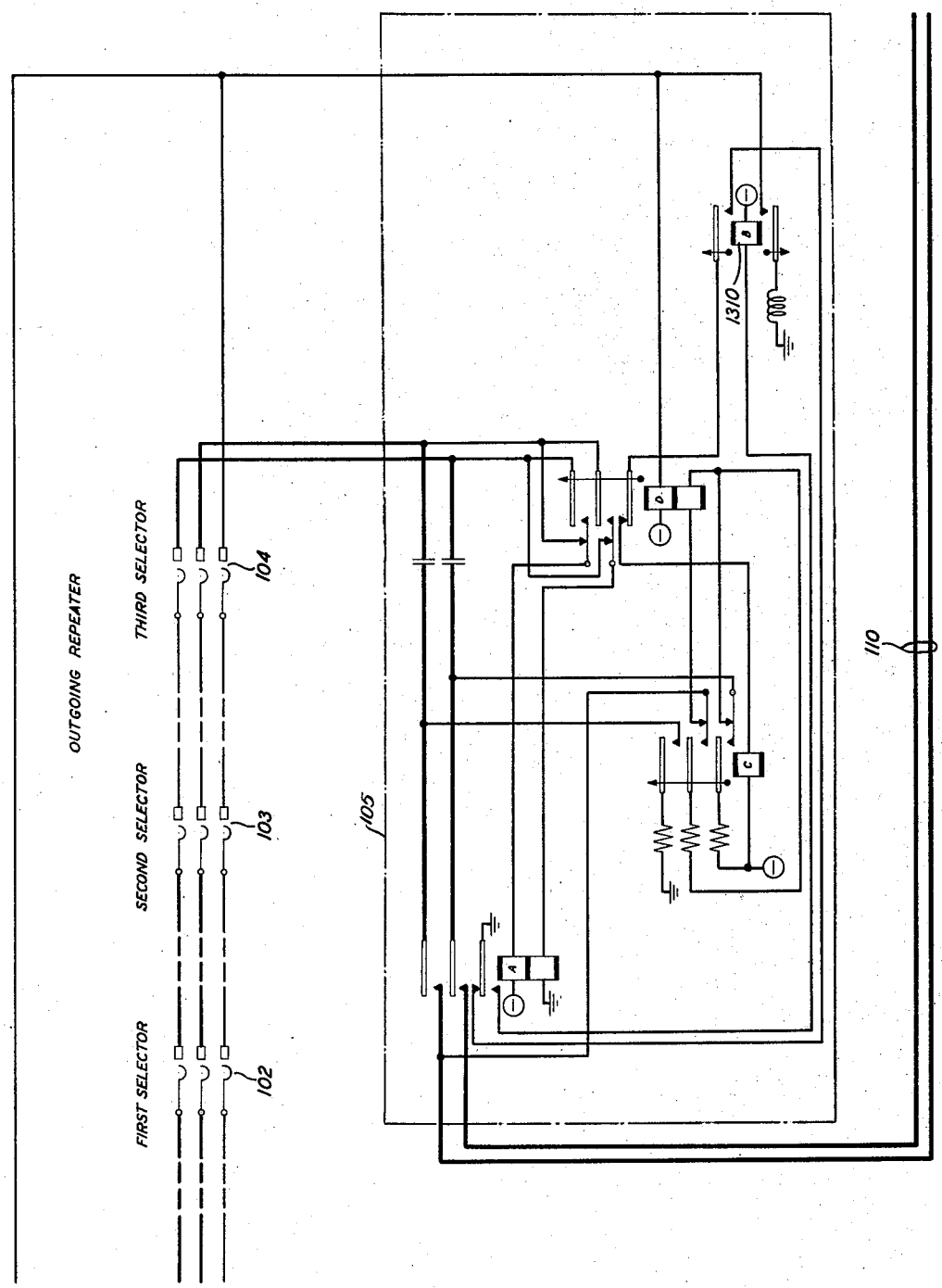
Figure 14:
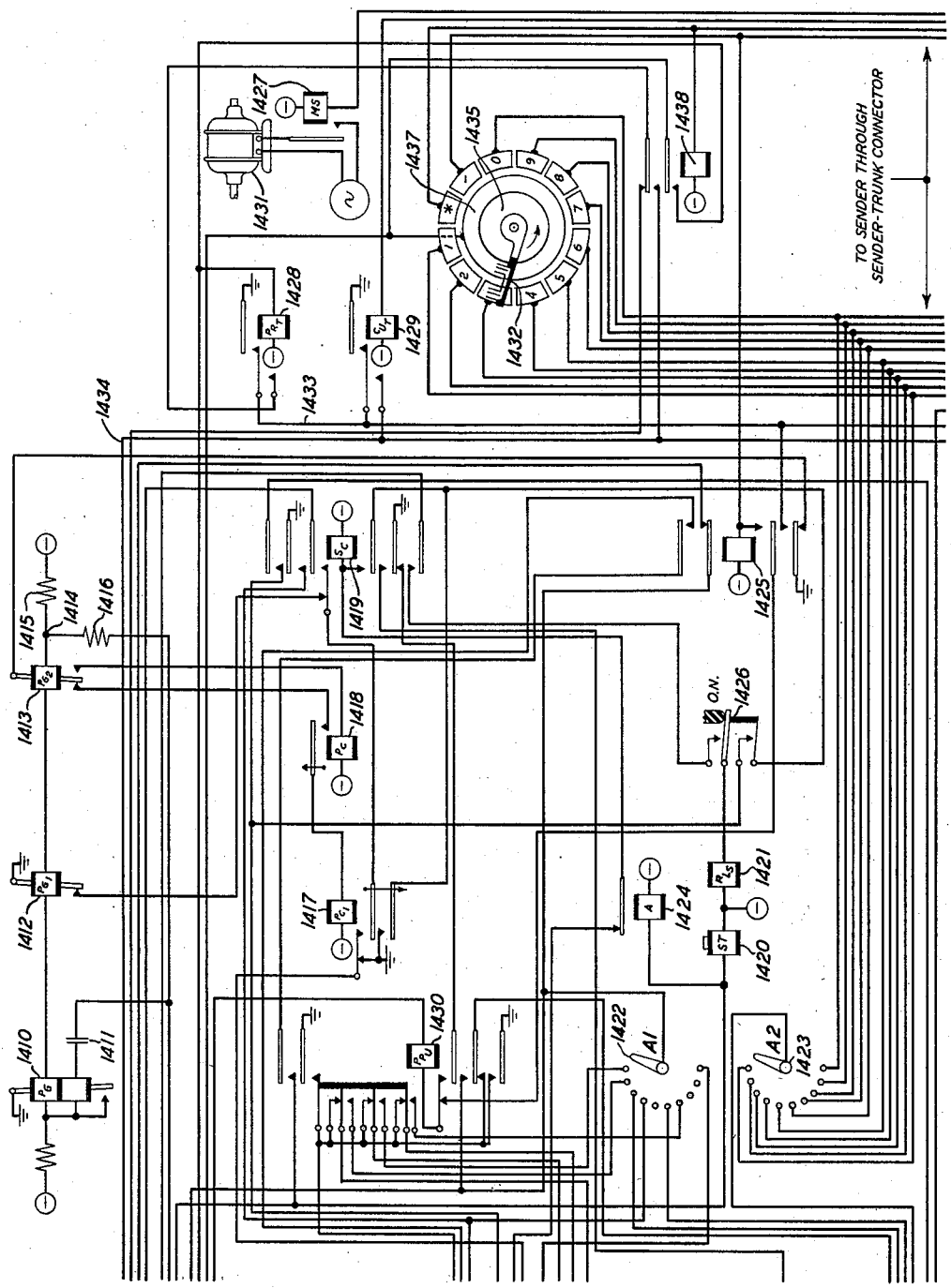
Figure 15:
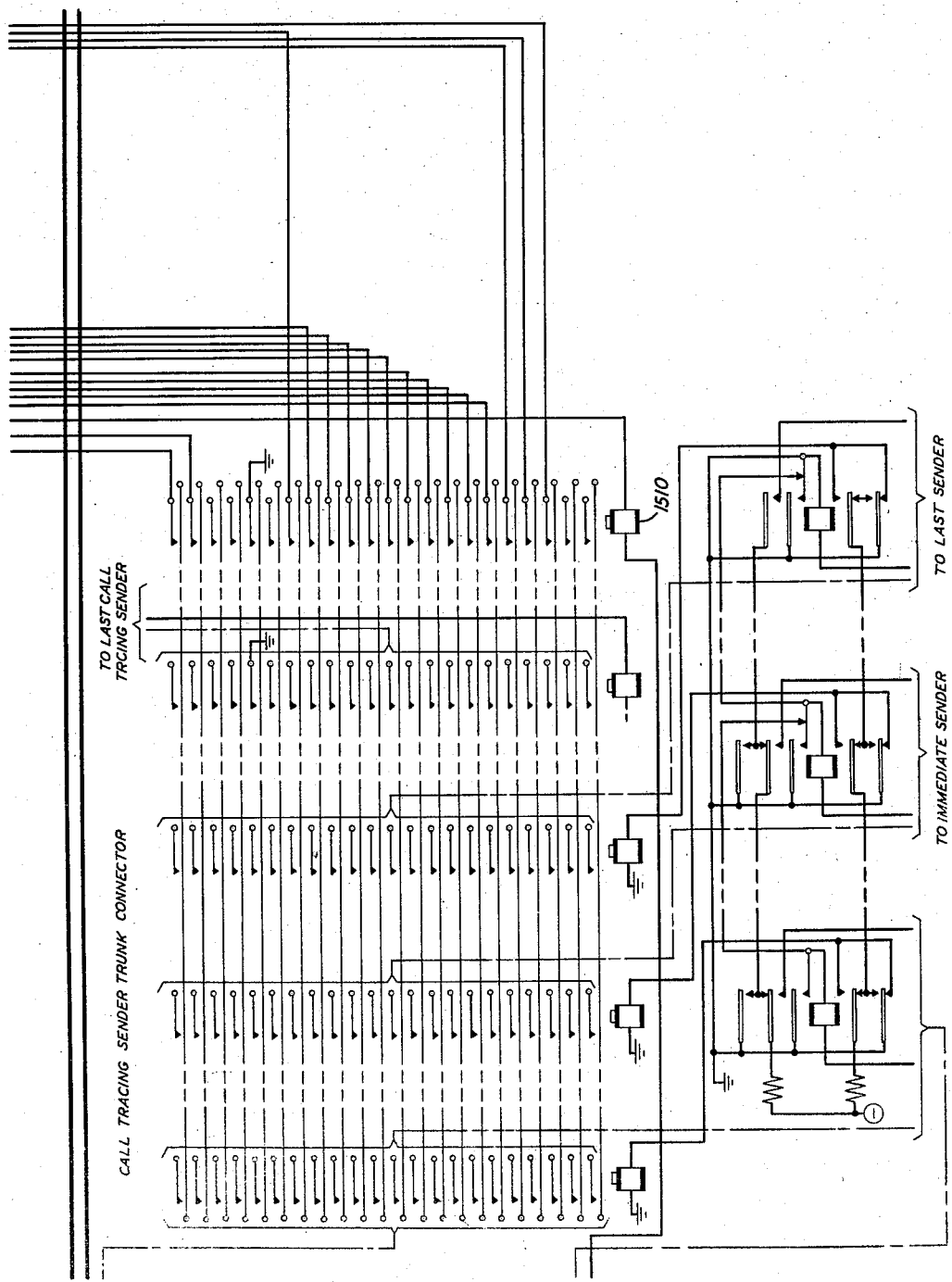
Figure 16:
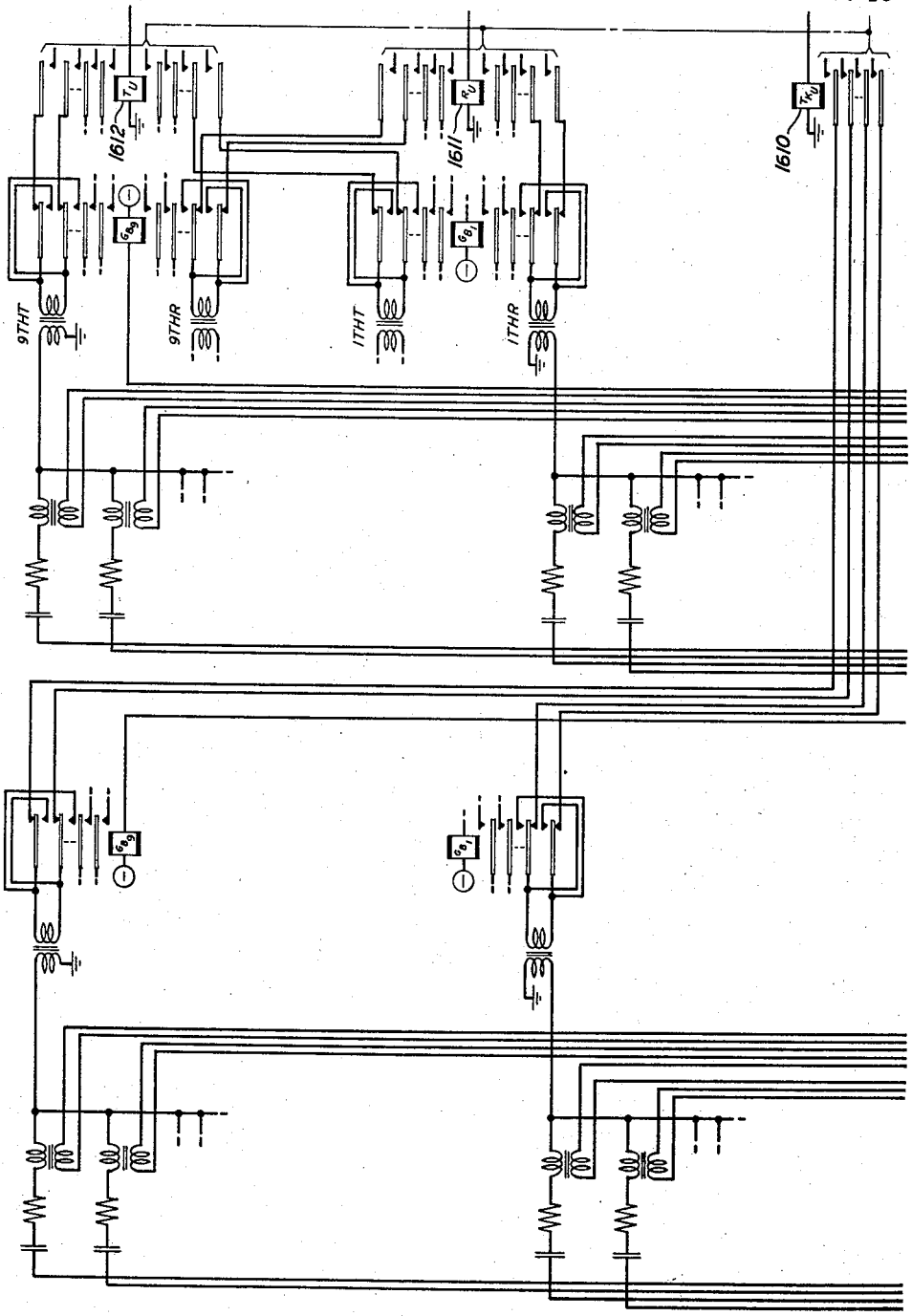
Figure 17:
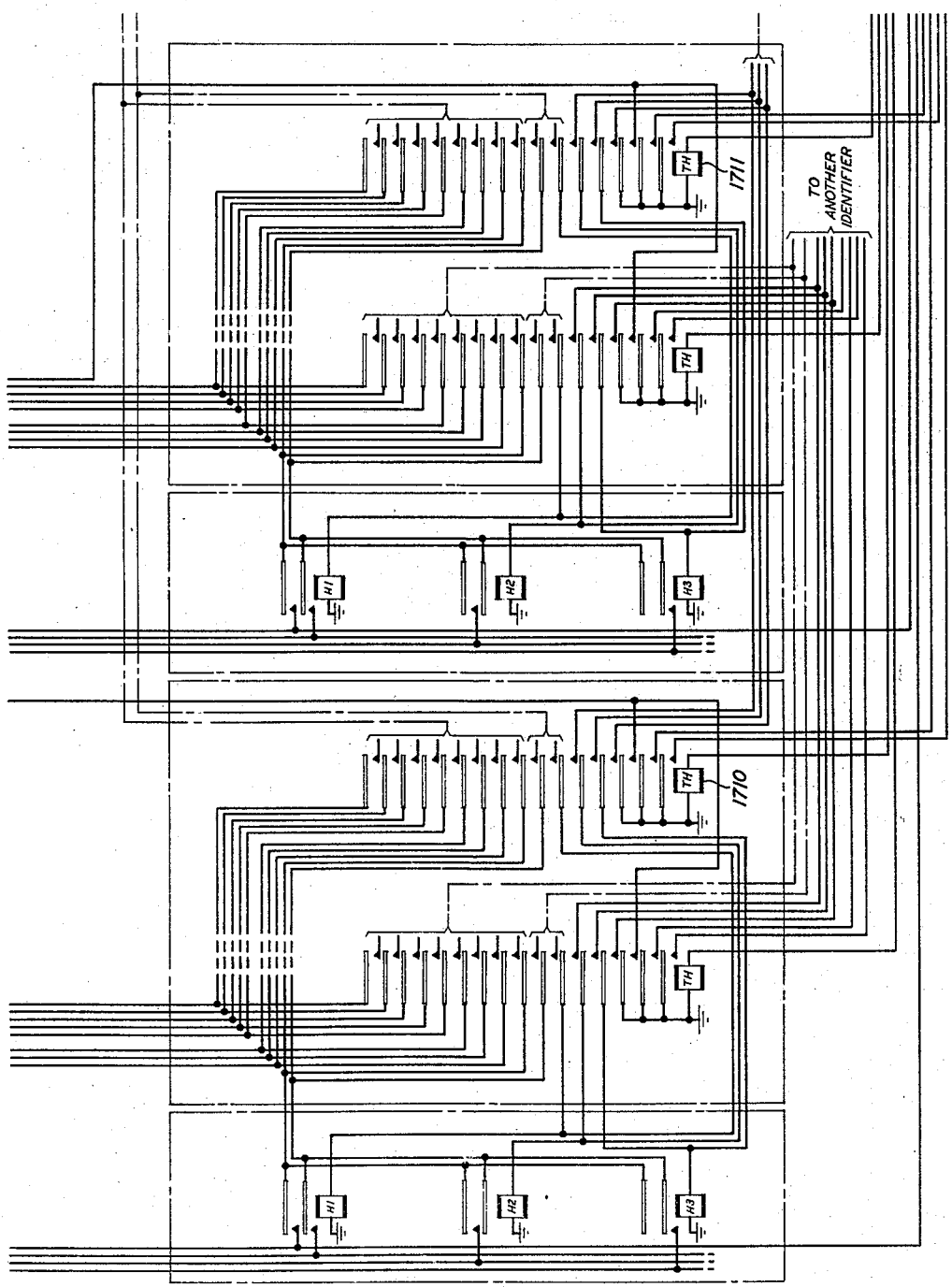
Figure 18:
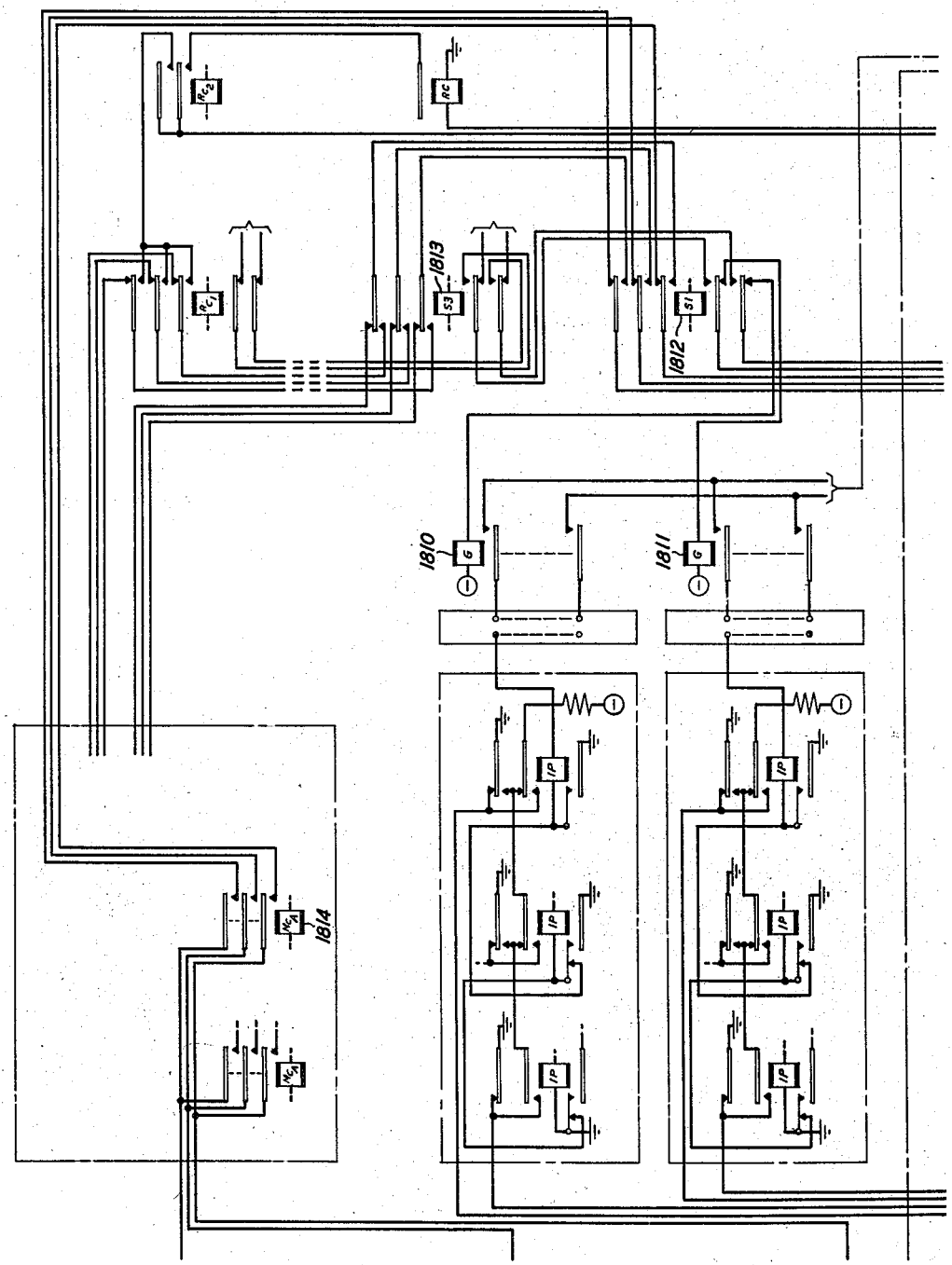
Figure 19:
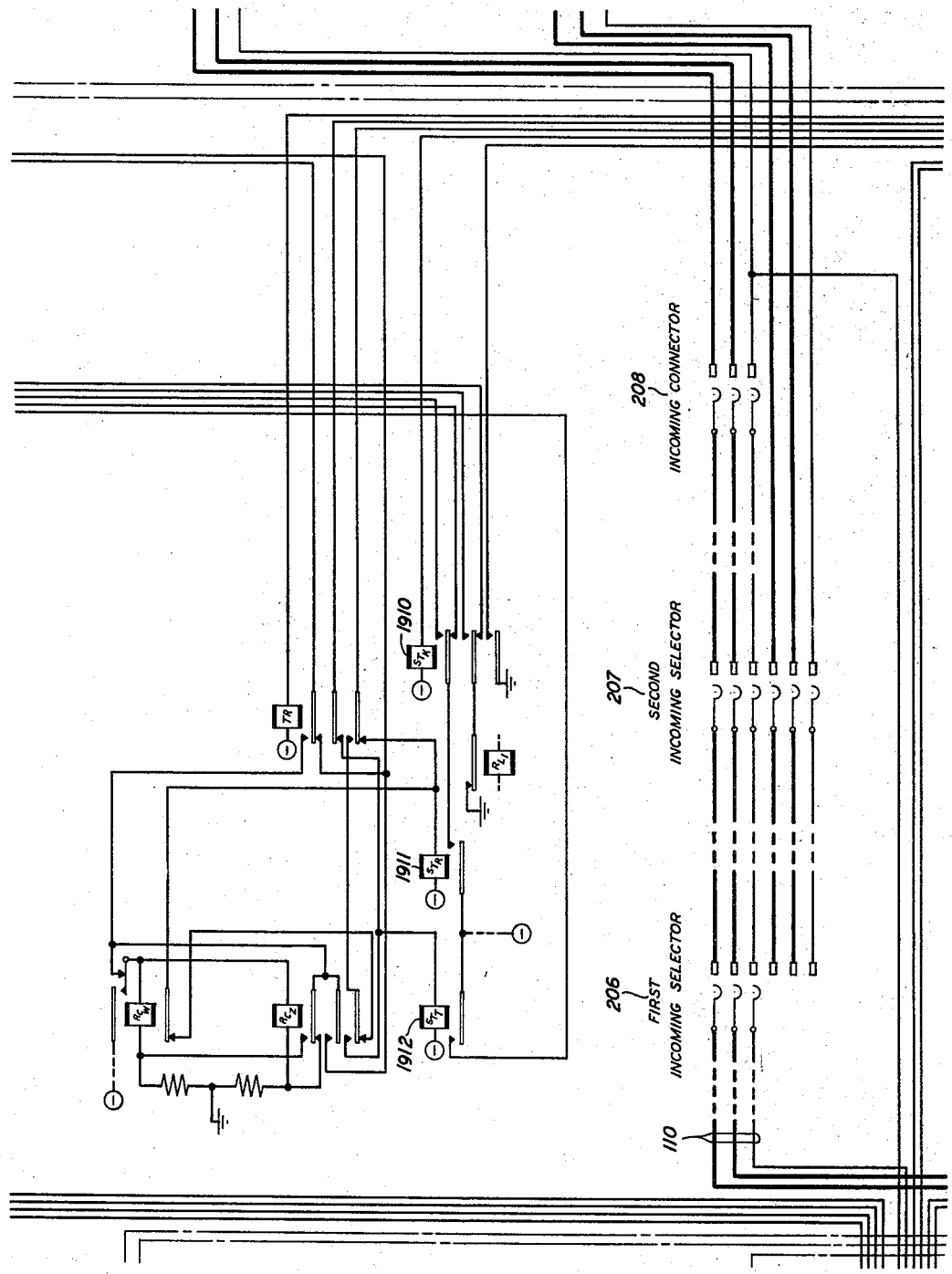
Figure 20:
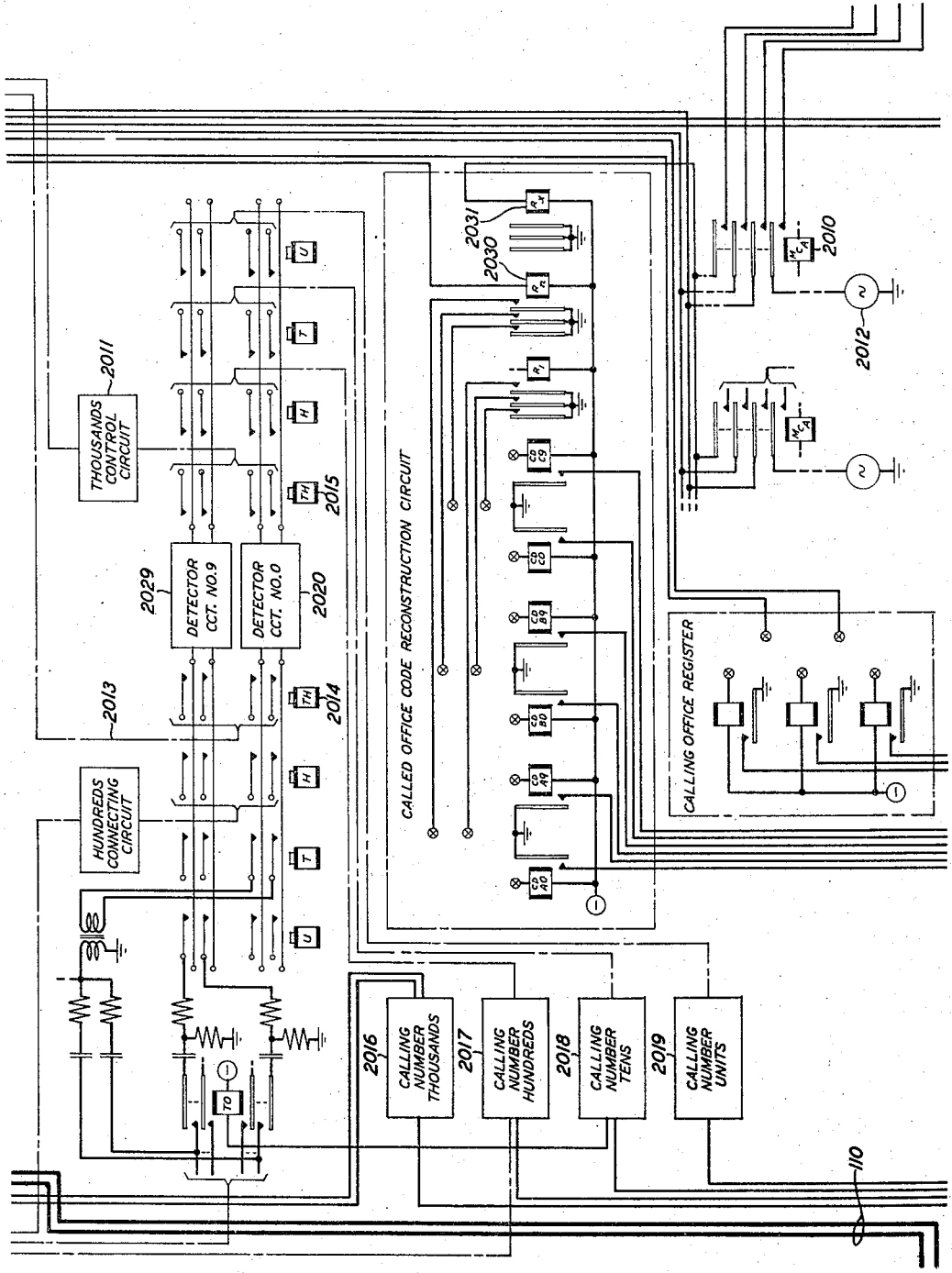
Figure 21:
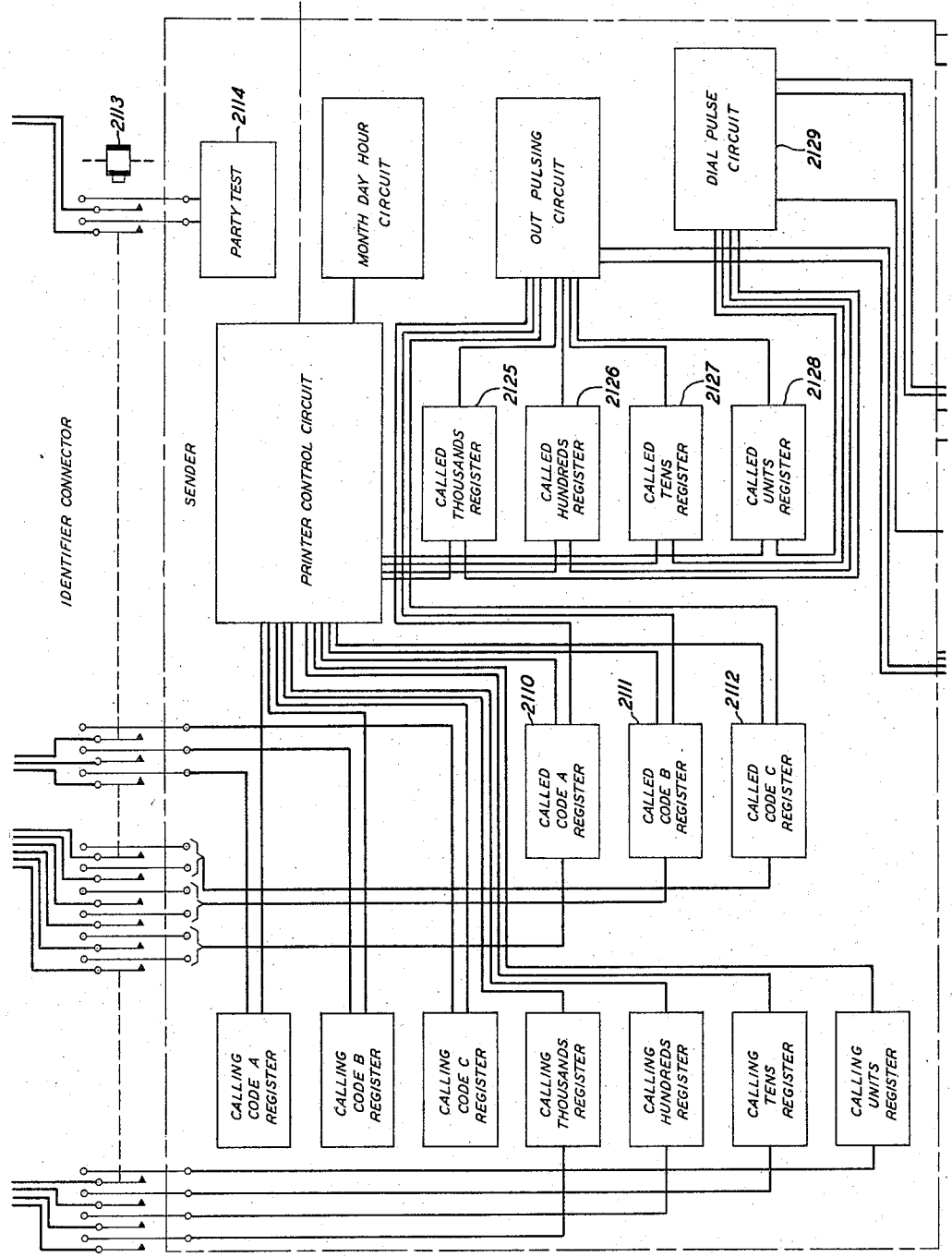
Figure 22:
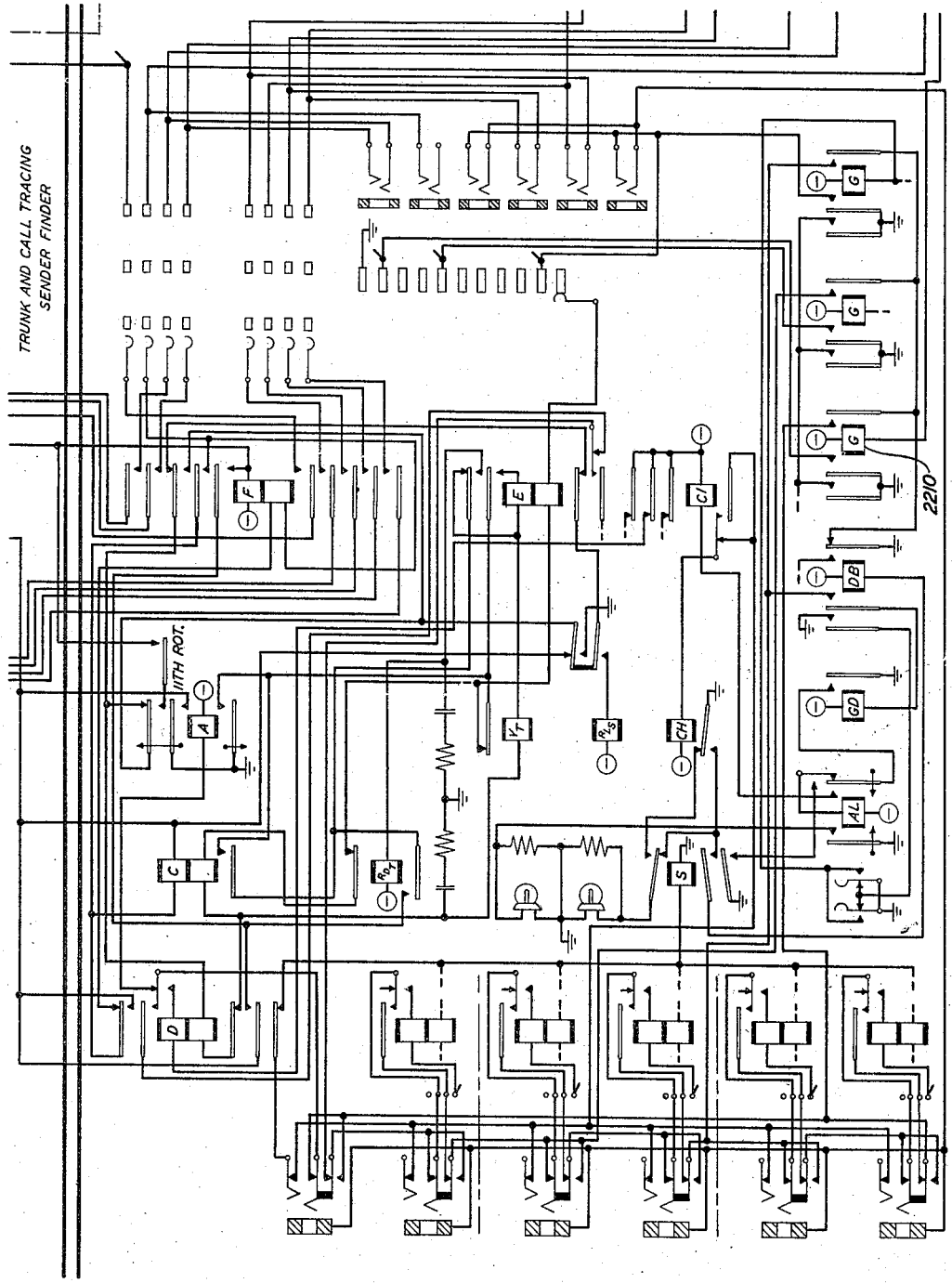
Figure 23:
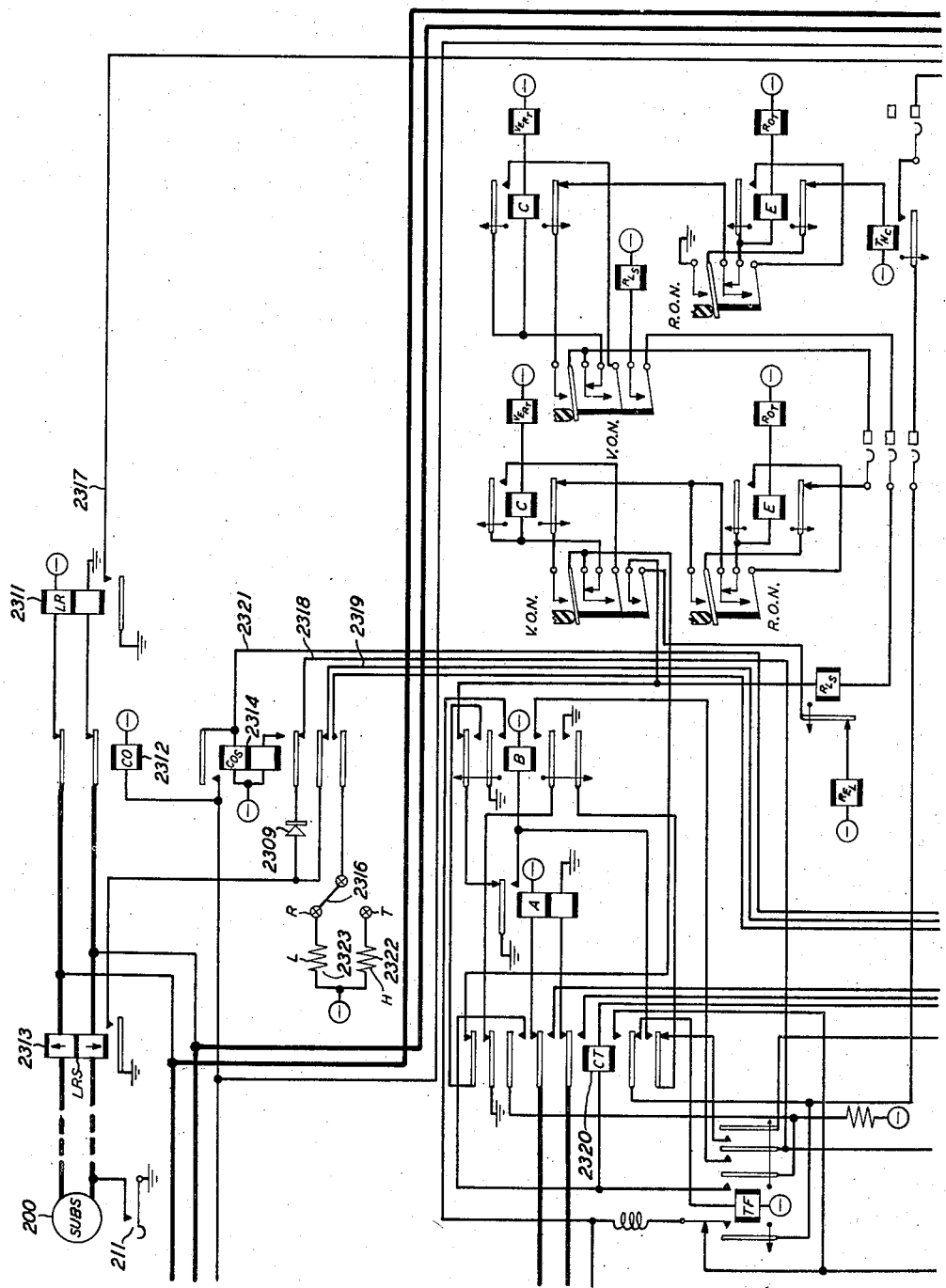
Figure 24:
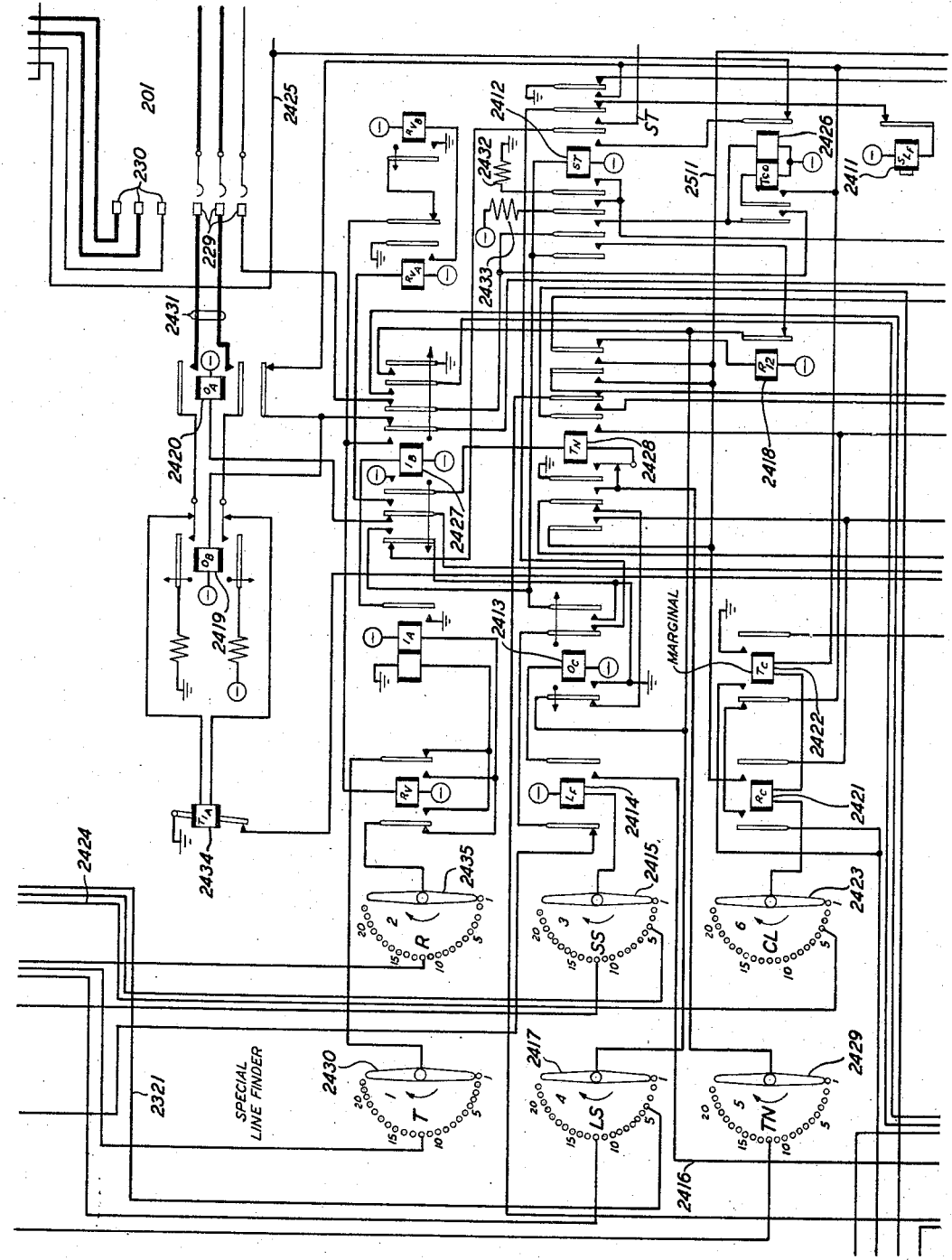
Figure 25:
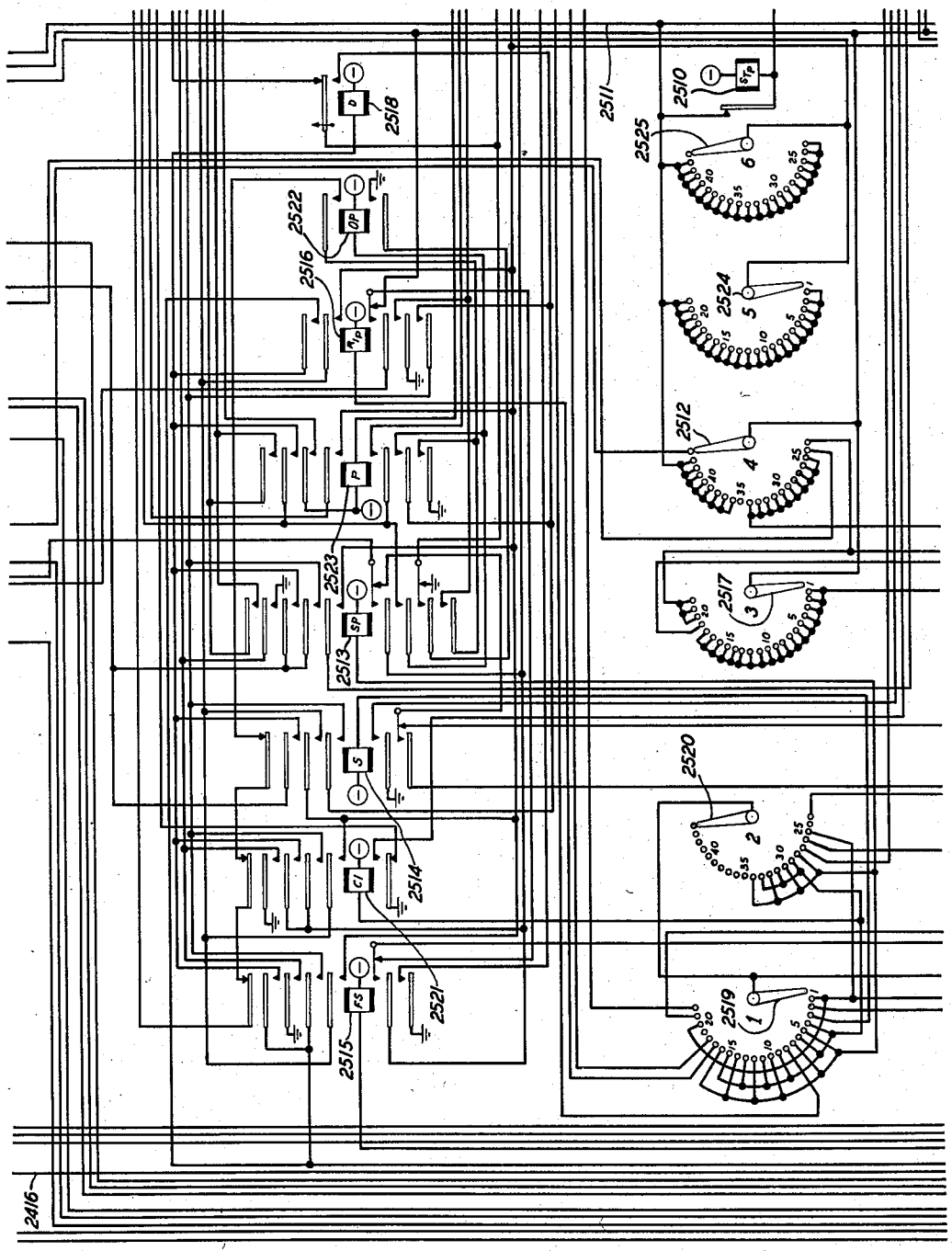
Figure 28:
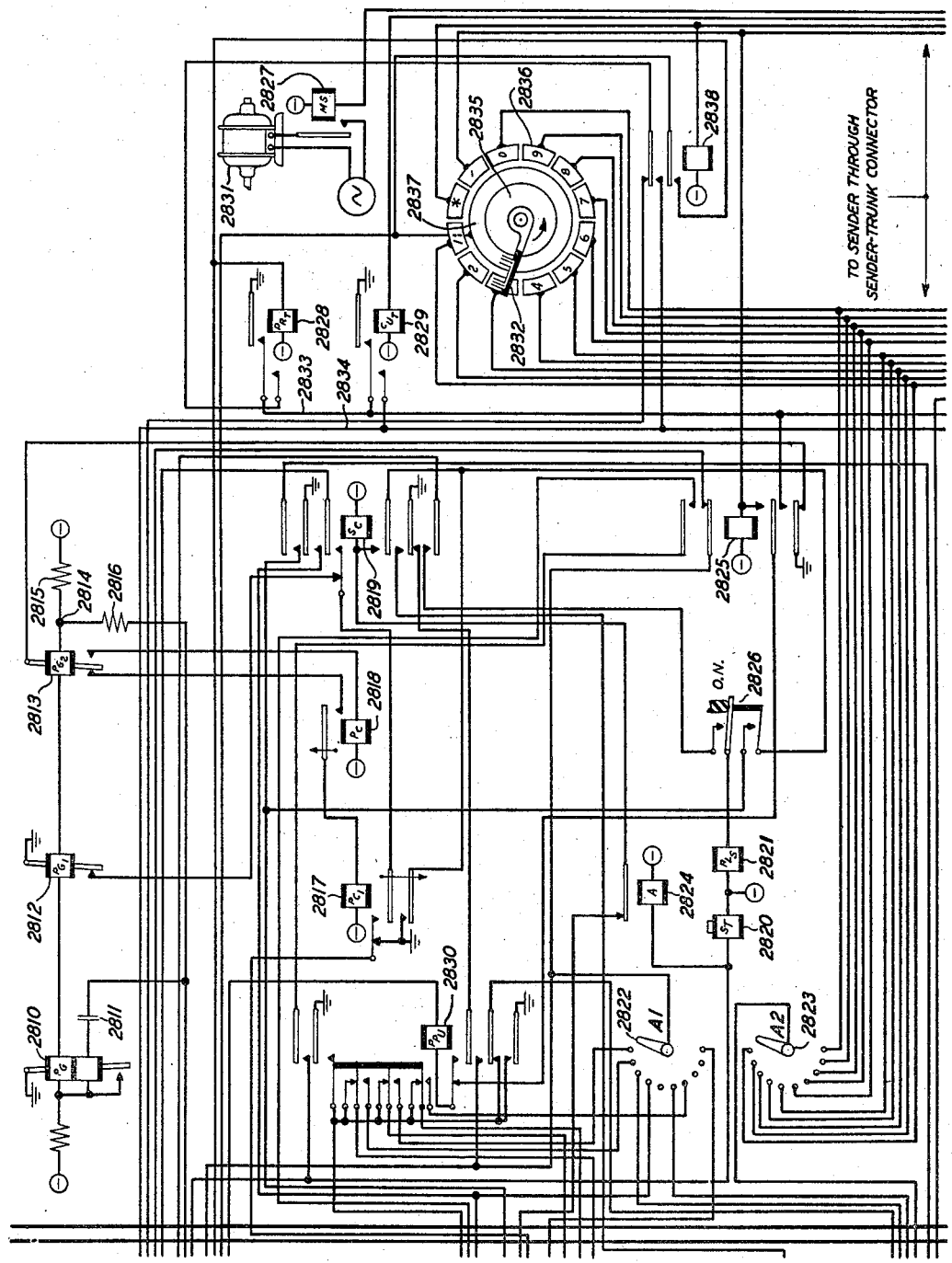
Figure 29:
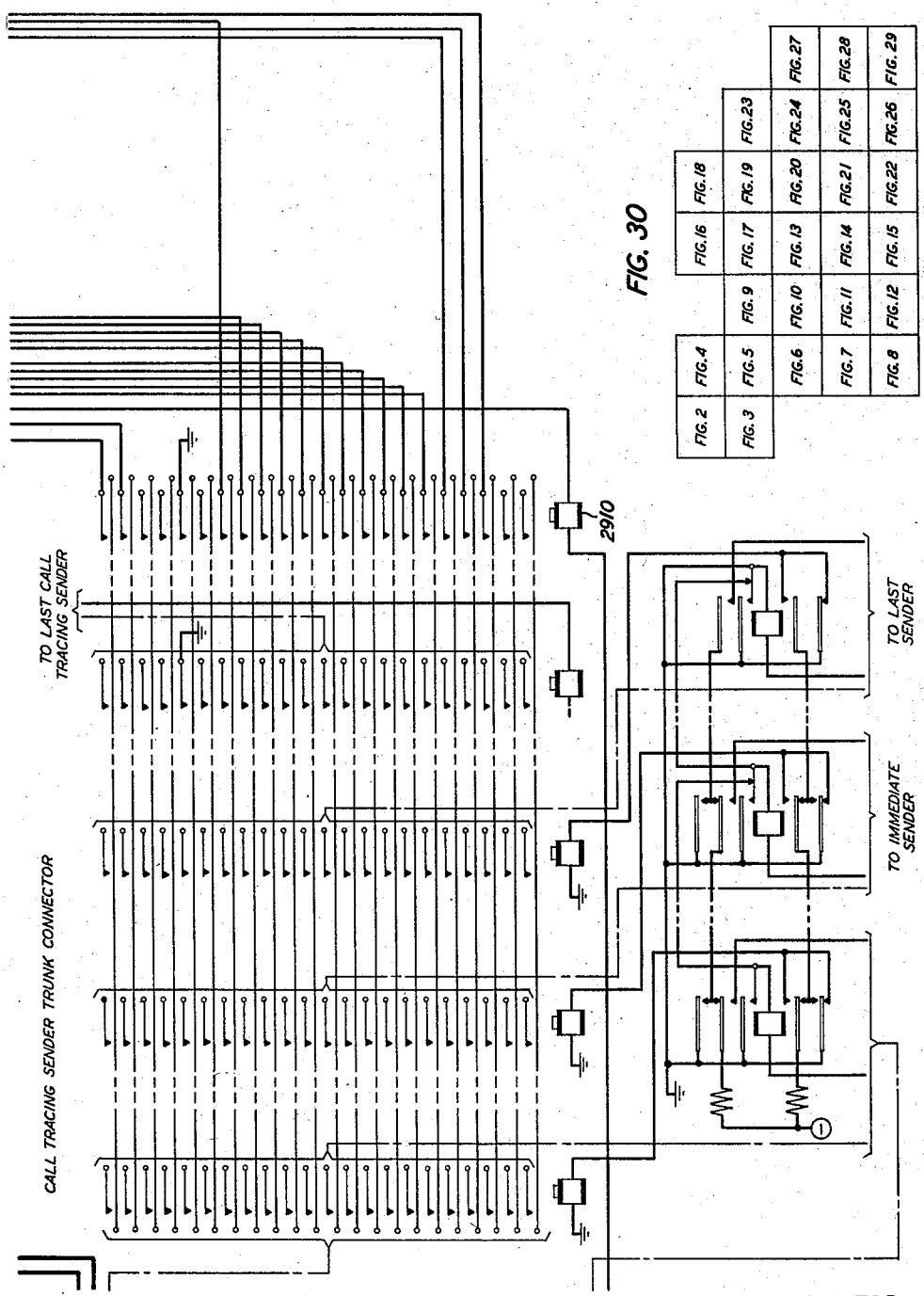

Figs. 2 through 15, inclusive, show the details of the circuits at one central office and Figs. 16 through 29 show the details of similar circuits at a second central office or switching center;

More particularly, Fig. 2 shows part of an identifier circuit;

Fig. 3 shows another part of an identifier circuit;

Fig. 4 shows part of an identifier circuit;

Fig. 5 shows still another part of the same identifier circuit as well as certain selector switches;

Fig. 6 shows another part of the same identifier circuit;

Fig. 7 shows part of an identifier connector circuit and part of a call ticketing sender circuit;

Fig. 8 shows part of the same sender circuit as shown in Fig. 7 together with the sender-finder circuit;

Fig. 9 shows a subscriber's station circuit and line circuit together with a special line circuit; Fig. 9 also shows detailed circuits of a trunk distributing circuit and trunk distributor selecting switches;

Fig. 10 shows a special finder circuit and part of a call tracing sender circuit;

Fig. 11 shows part of the same call tracing sender circuit;

Fig. 12 shows part of the same call tracing sender circuit;

Fig. 13 shows representations of selector switches at the central office employed in establishing communication paths through the office and also an outgoing repeater circuit;

Fig. 14 shows part of the call tracing sender circuit;

Fig. 15 shows a connector circuit for establishing connections between the call ticketing and identifying circuit and the call tracing sender circuit;

Fig. 16 shows part of an identifier circuit;

Fig. 17 shows another part of an identifier circuit;

Fig. 18 shows part of an identifier circuit;

Fig. 19 shows still another part of the same identifier circuit as well as certain selector switches;

Fig. 20 shows another part of the same identifying circuit;

Fig. 21 shows part of an identifier connector circuit and part of a call ticketing sender circuit;

Fig. 22 shows part of the same sender circuit as shown in Fig. 21 together with the sender-finder circuit;

Fig. 23 shows a subscriber's station circuit and line circuit together with a special line circuit; Fig. 23 also shows detailed circuits of a trunk distributing circuit and trunk distributor selecting switches;

Fig. 24 shows a special finder circuit and part of a call tracing sender circuit;

Fig. 25 shows part of the same call tracing sender circuit;

Fig. 26 shows part of the same call tracing sender circuit;

Fig. 27 shows representations of selector switches at the central office employed in establishing communication paths through the office and also an outgoing repeater circuit;

Fig. 28 shows part of the call tracing sender circuit;

Fig. 29 shows a connector circuit for establishing connections between the call ticketing and identifying circuit and the call tracing sender circuit;

Fig. 30 shows the manner in which Figs. 2 through 29, inclusive, are arranged adjacent one another;

Fig. 31 shows the information normally printed by a call ticketing trunk under control of the call identifying and ticketing sender such as disclosed in an application of Gooderham identified herein; and Fig 32 shows the information printed by the call tracing sender in accordance with the present invention when controlled by the same call identifying and ticketing sender when this sender is employed in cooperation with the other circuits in accordance with the exemplary embodiment of this invention shown in the drawings and described herein.

General description

Figure 1:
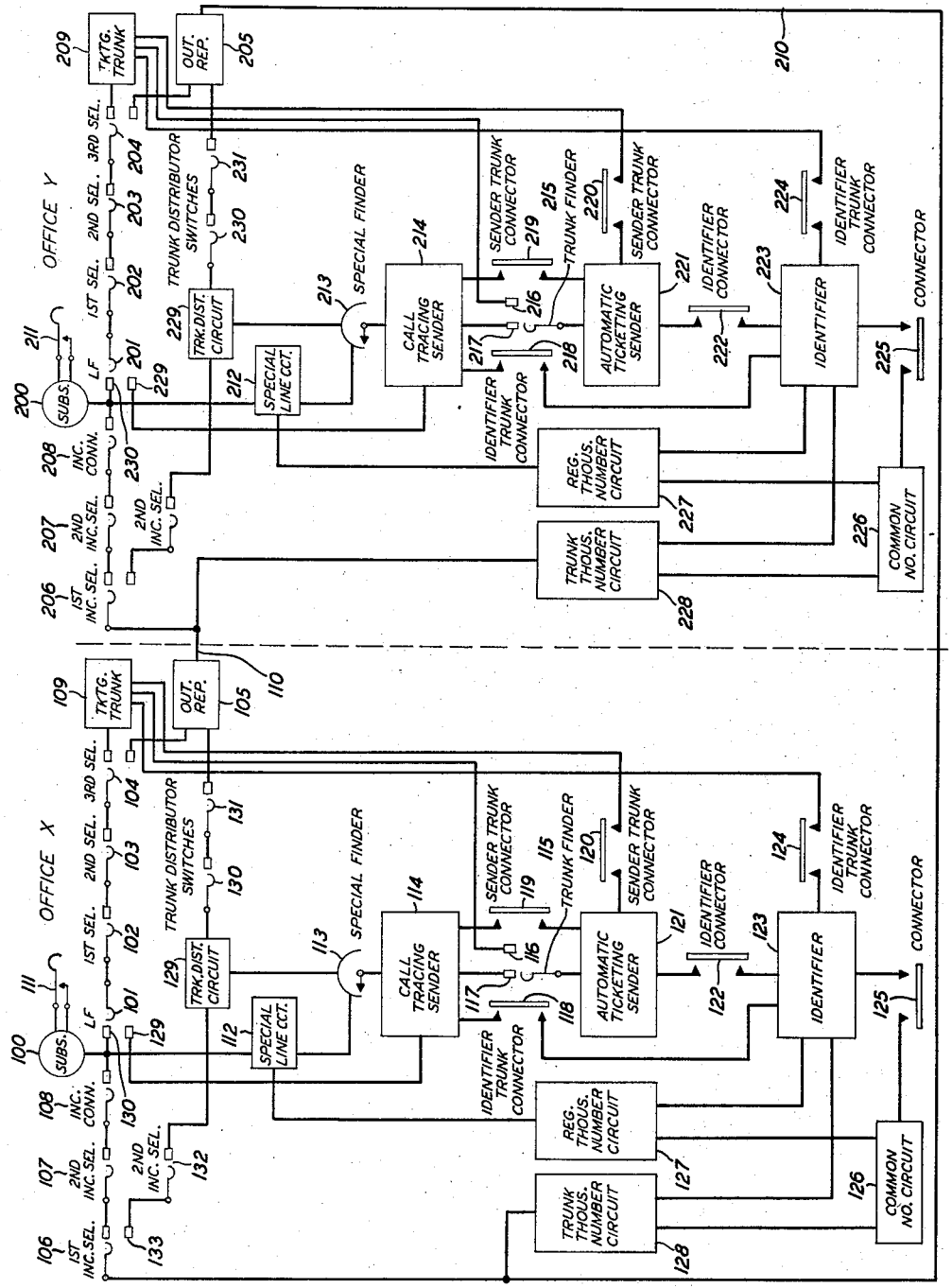
Fig. 1 shows in outline form the various circuits at two central exchanges and the manner in which they cooperate in tracing a call from a subscriber's station connected to one central office to another subscriber's station connected to another central office.

Fig. 1 shows in outline form the call tracing circuits and facilities and the manner in which they cooperate with the other switching equipment at a central exchange together with the manner in which this equipment cooperates with automatic ticketing and call charging equipment provided at such exchanges.

In Fig. 1, circuits at two offices, namely, office X and office Y are indicated. Subscriber's station 100 is indicated as being connected to office X and a second subscriber's station 200 is shown connected to the switching equipment at office Y. While only one subscriber's station is actually shown at each of these offices, many subscribers' stations are interconnected with each of the offices; stations shown are representative of any or all of these stations connected to the respective switching stations.

For purpose of illustration, it is assumed that the subscriber at station 100 has initiated a call for the subscriber's station 200 and that the subscriber at station 200 wishes to trace the origin of the call back to station 100.

The subscriber's station 100 in initiating the call will remove his receiver from the hook which causes his line circuit to function and set the line finder 101 into operation in a well understood manner which line finder finds the called subscriber's line and connects it to a first selector 102. The first selector 102 supplies dial tone to the calling subscriber who then dials a first symbol, digit, or numeral of the called subscriber's station identification.

For purpose of illustration, it is assumed that the called subscriber's station identification comprises three symbols, letters or numerals identifying office Y together with four additional numerals or other symbols which identify the subscriber's station 200 and the line interconnecting this station with the central exchange.

The subscriber upon dialing the first digit of the office Y code causes the first selector 102 to step to the proper level and then to select an idle second selector 103 which second selector in turn responds to a second series of dial pulses representing the second symbol or numeral of office Y. The second selector in responding to these pulses will select a third selector 104 which selector in turn responds to the third digit dialed by the subscriber and selects, under the assumed conditions, a trunk such as 110 extending to office Y through an outgoing repeater circuit 105.

Of course, if subscriber 200 had been connected to office X the third selector would then select a first incoming selector which in turn would select a second incoming selector under control of the next two digits of the subscriber's designation. Such selectors are represented at 106 and 107. The final two digits would then control connector 108 to select their subscriber's line. However, under the assumed conditions, subscriber's station 200 is connected to office Y. Consequently, the first three digits are employed to control the first selectors 102, 103 and 104 to select an outgoing repeater 105 terminating a trunk 110 extended to office Y. Depending upon the office code dialed by the subscriber 100 the connection may be set up through a ticketing trunk 109 which may be selected from any one of the first three selectors. The ticketing trunk thereafter would control the establishment of a connection over a trunk to office Y wherein the ticketing trunk operates as a special outgoing repeater. Under these circumstances, the circuits will operate in substantially the same manner as described herein where it is assumed that the selectors 102, 103 and 104 select the outgoing repeater 105 in response to the first three digits dialed by the calling subscriber 100. The outgoing repeater is connected to trunk 110 extending to a first incoming selector 206 at office Y. The trunk at office Y may terminate in an incoming repeater or other suitable trunk terminating equipment and since this equipment operates in its normal or usual manner it has not been shown in the drawing and is not described herein, it being understood, of course, that such equipment is provided as required. The incoming selector 206 responds to the first of the last four digits of the subscriber's designation and selects a second selector 207 which selector responds to the next succeeding digit and in turn selects an idle incoming connector 208 which in turn responds to the last two digits of the subscriber's station 200 designation and extends a connection to the subscriber's station 200. The subscriber's bell at station 200 is then automatically rung and when the subscriber at station 200 answers the call he can ascertain its nature. If the call is one which he desires to trace he will then actuate his special call tracing key 211 or button and set into operation call tracing equipment at the two central exchanges in accordance with the present invention.

Of course, the called subscriber may engage the calling party in conversation to allow the call tracing equipment sufficient time to function to trace the call to the calling subscriber's line. However, the automatic call tracing equipment operates expeditiously so that while it requires considerable time to read and understand the various individual operations described hereinafter the equipment will perform the various operations and functions quite rapidly in the matter of several seconds or less.

Upon actuation of the special call tracing key 211 by the subscriber at station 200 a special line circuit 212 is set into operation which line circuit initiates the operation of one of a group of special finder switch and circuits 213. The special finder switch 213 is individual to a call tracing sender 214. It is to be understood, of course, that more than one call tracing sender may be provided at each of the central exchanges so that a corresponding plurality of the special finder switches 213 is provided.

When the special finder 213 in response to a request by the subscriber to trace a call through the special line circuit 212 finds the subscriber's line, operation of the call tracing sender 214 is initiated. The call tracing sender 214 sets into operation the trunk finder 215 of the normal call identifying equipment at the central office Y.

The automatic ticketing and identifying equipment at each of the central offices may be of a type, for example, such as disclosed in a Patent 2,629,016, issued February 17, 1953, to J. W. Gooderham. In the exemplary embodiment of the call tracing equipment described herein the call tracing equipment has been arranged and designed to cooperate with the automatic ticketing and identifying equipment of the type disclosed in said Gooderham application. Except for certain cross-connections described herein the equipment described in said Gooderham application cooperates in combination with the call tracing equipment described herein and said automatic ticketing and identifying equipment described in said Gooderham application requires no changes or modifications except suitable cross-connections described herein. As disclosed in said Gooderham application, numerous cross-connections are required at each of the central stations for this equipment to function properly. Additional and different cross-connections are required for causing this equipment to cooperate with the call tracing equipment described herein as will be explained hereinafter.

The call tracing sender 214 is in many respects similar to a ticketing trunk such as 209 and cooperates with the automatic ticketing sender 221 and identifier 223 in a somewhat similar manner to the manner in which the call ticketing trunk 209 cooperates with this equipment.

In the case of a call tracing operation, the call tracing sender 214 initiates operation of the trunk finder 215 which trunk finder finds the call tracing sender 214 instead of a ticketing trunk 209. When the trunk finder 215 finds the set of terminals represented at 217 extending to the call tracing sender 214, the call tracing sender again advances and dials a zero into the automatic ticketing sender 221. The automatic ticketing sender upon seizure awaits the dialing of one digit before it advances and initiates operation of other elements of the system. Upon the dialing of a zero into the automatic ticketing sender 221, this sender 221 causes the identifier connector 222 to be actuated and in turn causes the identifier trunk connector 218 to be actuated which two connectors connect the automatic ticketing sender and the call tracing sender to the identifier 223. At this stage in automatic ticketing operation the automatic ticketing sender 221 normally operates the identifier trunk connector 224 and the sender trunk connector 220. However, since the call tracing sender initiated the operation of the automatic ticketing sender 221 the identifier trunk connector 218 and the sender trunk connector 219 are actuated instead.

Normally, in an automatic ticketing call the identifier 223 advances and determines the code dialed by the subscriber to reach the ticketing trunk and also applies tone over the ticketing trunk 209 sleeve back through the selector switches and through the thousands number group 227 and common number group circuit 226 and through the connector 225 to the identifier 223. In the case of a call tracing operation, the identifier advances at this time and applies tone or alternating current back through the call tracing sender 214, the special finder switch 213 and special line circuit 212 to the sleeve of the subscriber's line 200 and then through the connector 208 and selector switches 207 and 206 to the sleeve of the incoming trunk 110 over which the called subscriber 200 was called. A connection extends from the sleeve of trunk 110 to the trunk thousands number circuit 228 and then through the common number circuit 226 and connector 225 to the identifier 223. Inasmuch as the automatic ticketing sender 221 and the identifier 223 were set into operation by the call tracing sender 214 the identifier is instructed by means of suitable circuits to search through the trunk thousands number circuit 228 instead of the regular subscriber's thousands number circuit 227 for the tone. Except for searching in a different group of circuits the identifier circuit searches in the same manner and in locating the tone determines the trunk group and trunk number of the trunk then connected to the subscriber's station 200 through the selector switches 206, 207 and connector 208.

As pointed out above, the identifier is normally provided with cross-connections to enable the identifier to determine the number dialed by a subscriber to reach the ticketing trunk 209. However, in the case of call tracing operation, these cross-connections are not provided so the identifier is unable to make any such determination or reconstruct the called office code. Instead, other cross-connections are provided from the trunk thousands number circuit for operating a route relay which route relay is similar to a route relay operated by a reconstructed code and indicates to the identifier the code or digits that must be dialed to reach the calling office, i.e., office X. In other words, the route relay is cross-connected so that it indicates to the identifier and the automatic ticketing sender 221 the office code of the calling office X.

In place of cross-connections from the thousands number circuit normally employed to inform the identifier 223 and the automatic ticketing sender 221 of the calling office code at this time, cross-connections are provided between the call tracing sender 214 and the identifier 223 and automatic ticketing sender 221 to indicate the code which must be dialed to actuate switches in the distant office to reach a special trunk distributor circuit 129. It is assumed herein that this special code will be 990. It is to be understood, however, that any other suitable code may be provided. It is further assumed herein that only the first two digits of this code are actually required to select the trunk 110. Of course, this trunk may be selected with one, two or three digits and the circuits operate in substantially the same manner as described herein when suitable cross-connections are made.

In the exemplary embodiment set forth herein, it is assumed that the same code will be assigned in each of the offices for reaching a trunk distributor circuit similar to circuit 129. Thus, on call tracing operations the circuits are arranged to provide the code 990 to the automatic ticketing sender 221 and identifier 223 in place of the calling office code. Of course, different codes may be employed in different central offices when desired. In place of the calling subscriber's number the trunk number is registered in the identifier 223 and the automatic ticketing sender 221.

The operation of the route relay from the trunk thousands number circuit described above also causes the automatic ticketing sender to discard the zero dialed into it from the call tracing sender 214 in the same manner that the sender will disregard the first digit dialed into it when it is desired to change the routing of the call by means of the route relay as set forth in said above-identified Gooderham application. Furthermore, the route relay in combination with suitable cross-connections including cross-connections from the route relay is employed to select a suitable class of service code and to properly condition the class of service equipment of the automatic ticketing sender 221 and the identifier 223.

Finally, upon the operation of the route relay as described above and thus the determination of the calling office code, the automatic ticketing sender 221 will advance and cause the call tracing sender 214 to advance and in effect initiate a call tracing call with the result that one of the line finders in the line finder group 201 is set into operation and finds the group of terminals represented by terminal 229 connected to the call tracing sender 214. As a result, one of the line finders of the line finder group 201 will find the terminal 229 and connect a first selector such as 202 to the call tracing sender 214. Thereafter, the automatic ticketing sender 214 sends a first digit of the office code of office X which causes the selector switch 202 to be actuated and in turn pick a second selector such as 203. This second selector is actuated in response to the second digit of the office code of office X transmitted by the automatic ticketing sender 221. The selector 203 thereupon finds an idle selector 204 which selector in turn responds to the third digit of the office code and selects the trunk outgoing to office X. This trunk is provided with an outgoing repeater 205 in the exemplary embodiment of this invention shown in detail in the drawing and described herein. Thereafter, the call tracing sender 214 is arranged to ignore further pulsing from the automatic ticketing sender at this time over the connection 217 through the trunk finder 215. The call tracing sender 214 then advances and permits the automatic ticketing sender through the sender trunk connector 219 to control the printing of information in the automatic ticketing sender which is normally the calling office code. However, as pointed out above, the digits 990 have been entered into the automatic ticketing sender as the calling office code due to the cross-connections from the call tracing equipment. The call tracing sender 214 in addition to printing these digits causes the first two digits, namely, 99 to be transmitted through the special finder switch 213, the special line circuit 212, the line finder terminal 229 and the line finder 201 through the selectors 202, 203 and 204 and then through the outgoing repeater 205 and then over the trunk 210 back to office X. The trunk 210 at office X terminates in a first incoming selector 106 which selector in response to a digit 9 selects the terminal on the ninth level thereof indicated by terminal 133 in Fig. 1. Thereafter, this selector selects an idle selector 132 and in response to the second digit 9 the second selector responds and selects an idle trunk distributor circuit represented by circuit 129 in Fig. 1.

The automatic ticketing sender 221 also transmits a zero to the call tracing sender 214 after the digits 99 and the call tracing sender are arranged to print this digit on a ticket. However, in the exemplary embodiment set forth herein, the call tracing sender 214 does not transmit this zero but may be readily arranged to do so.

After transmitting the code normally considered the calling office code by the automatic ticketing sender the automatic ticketing sender next transmits the calling subscriber's line identification which in the case of a call tracing operation is the trunk number of the trunk over which the call arrived at the called office. This number is transmitted to the call tracing sender through the sender connector 219. The call tracing sender 214 responds to this number by causing it to be printed and in addition transmits dial pulses representing the number over the above-traced path through the line finder 201 and selector switches 202, 203 and 204 to the outgoing repeater 205 and trunk 210 to office X and then at office X through the first selector 106 and second selector 132 to the trunk distributor circuit 129. From the trunk distributor 129 the pulses are transmitted to the trunk distributor switches 130 and 131. Switch 130 responds to two digits of the dialed number and switch 132 responds to the second two digits of this number. The operation of these two switches in response to the four digits of the trunk number selects the sleeve of the trunk 110 at office X and establishes a connection from this sleeve back through the trunk distributor circuit 129.

When a connection is made to the sleeve of the outgoing trunk, such as trunk 110, an additional ground is applied to this sleeve circuit to hold the switches 104, 103 and 102 and line finder 101 until after the calling line has been identified.

In addition to causing the pulses representing the trunk number to be transmitted through it, the trunk distributor 129 also initiates the operation of the special finder switch 113 associated with an idle call tracing sender 114. As a result, this finder switch finds the trunk distributor circuit 129 and interconnects it with the call tracing sender 114 at office X. Upon seizure of this circuit it initiates the operation of a trunk finder 115 individual to an idle automatic ticketing sender 121 which finder circuit finds the terminal 117 of the call tracing sender 114 and interconnects the automatic ticketing or identifying sender 121 therewith. Thereupon, the call tracing sender 114 dials a zero into the automatic ticketing sender 121 in order to set this automatic ticketing or identifying sender 121 into operation. The automatic ticketing sender 121 thereupon calls in the identifier 123 through the identifier connector switches 122 and the identifier in turn actuates the identifier trunk connector switches or relays 118 and sender trunk connector switches or relays 119 as well as the connector switches 125.

Inasmuch as the call tracing sender has been seized from a trunk distributor circuit 129 instead of a special line circuit 112 the call tracing sender instructs the identifier to search through the regular thousands number circuit instead of through the trunk thousands number circuit as described above at office Y. The identifier thereupon transmits tone back through the call tracing sender 114, the special finder switch 113 and then over the sleeve of the trunk distributor circuit 129 and then through the sleeve circuit of switches 130 and 131 to the sleeve circuit of the outgoing repeater 105. The tone of alternating current is then transmitted from the sleeve circuit of the outgoing repeater 105 back through the sleeve circuit of the selector switches 104, 103 and 102 and the line finder 101 through the line finder terminals 130 to the sleeve of the calling subscriber's line 100. The sleeve circuit also extends to the regular thousands number circuit.

The identifier under these circumstances searches for the tone through the regular thousands number circuit in the usual manner when the identifier is identifying a calling subscriber in automatically ticketing a call as described in the above-identified Gooderham application except that the identifier is arranged to search through both the tip and ring fields for the tone. In searching for the tone and finding the tone on the sleeve of the calling subscriber's line the identifier registers the identity of this line and transmits it to the automatic ticketing sender 121. The automatic ticketing sender 121 in turn causes this number to be printed in the call tracing sender 114 and in turn the call tracing sender 114 also causes the number to be transmitted back through the special finder switch 113, trunk distributor circuit 129, second incoming selector 132, terminal 131 of the first incoming selector 106 and over trunk 210 and then back through the outgoing repeater 205, the third selector 204, the second selector 203, the first selector 202, line finder 201, line finder terminal 229 and then through the call tracing sender 214 to the call identifying or ticketing sender 221 where the number is registered and then the identifying sender 221 causes the call tracing sender 214 to print this number. Thereafter, the call tracing equipment and automatic ticketing equipment at office X are dismissed and the automatic ticketing sender and identifier at office Y also dismissed. The call tracing sender 214 then again calls in an automatic ticketing sender and identifier just as if a second line or subscriber was to be ticketed or identified and this time directs the identifier to search through the regular thousands number circuit instead of through the trunk thousands number circuit. As a result, the identifier finds the called subscriber's line 200 and registers the identity of this line in the automatic ticketing sender 221 which sender then causes the call tracing sender 214 to print the identity of the called subscriber's station.

The call tracing sender 214 also prints the date and time of the call and such other information as may be desired in the manner set forth in the above-identified Gooderham application. Thereupon, the call tracing sender and the automatic ticketing sender and identifier are restored since all of the information relative to the nuisance call directed to the called subscriber at station 200 has been determined and printed by the call tracing sender.

If the two subscribers had been in the same office the circuits would have operated substantially as described above except that trunk 210 would be an intraoffice trunk instead of an interoffice trunk. Furthermore, the second call tracing sender 114 and automatic ticketing sender 121 would have to be in office Y. Otherwise, these circuits would operate substantially the same as described above.

It is further evident that the route relay may be arranged to transmit any suitable number of digits to extend the call tracing call to office X.

Fig. 31 illustrates the information normally recorded under control of the call identifying and ticketing sender such as disclosed in the Gooderham application identified herein. In the said Gooderham application the ticket or card as shown in Fig. 31 is printed by the call ticketing trunk which trunk circuit includes a ticketing printer together with the necessary control circuits for controlling the printer and cooperating with the call tracing and ticketing sender. The call ticketing trunk includes a knife or cutting arrangement for cutting the tickets under control of the cutting signal received from the call ticketing and identifying sender.

Fig. 32 shows a similar type of ticket or card prepared by the automatic call tracing sender under control of the same call identifying and ticketing sender circuit when this sender circuit cooperates with the various circuits in accordance with the present invention in tracing a call from a called subscriber's line to the calling subscriber's line. It is to be noted in Fig. 32 that the card or ticket is somewhat longer than in Fig. 31 so that it may be necessary to position the cutting knife relative to the printing position of the printer in the call tracing sender somewhat differently from the relative positions of these two devices in the call ticketing trunk circuits.

The manner in which the various information is obtained and recorded upon the card or ticket shown in Fig. 31 is described in detail in the Gooderham application identified herein and referred to briefly herein and the manner in which the information recorded in the ticket in Fig. 32 is obtained is described in detail hereinafter with reference to the operation of the exemplary circuits, apparatus and methods in accordance with the present invention.

Detailed description

Figs. 2 through 15, inclusive, when arranged as shown in Fig. 30 show details of circuits in one step-by-step office for tracing calls through that office. Figs. 16 through 29, inclusive, when arranged as shown in Fig. 30 show detail circuits in another step-by-step switching office for tracing calls through that office. In addition, certain trunk circuits interconnecting the offices are shown connecting the circuits of the above two groups of figures.

While only two offices are shown and only representative circuits in each office are shown, it is to be understood that any number of offices may all be provided with call tracing circuits and equipment and that a suitable plurality of these circuits of the various types will be provided at each office to adequately handle the call tracing demands.

While in the following description it is assumed that it is desired to trace a call originating in one office and terminating in another office the same circuits operating in substantially the same manner may be employed for tracing calls both originating and terminating in the same office.

Assumed path of nuisance call

For purposes of illustration and description, assume that subscriber at station 100 shown in Figs. 1 and 9 desires to make a nuisance call to the subscriber at station 200 shown in Figs. 1 and 23. As shown in the drawing both stations 100 and 200 are provided with special signaling keys 111 and 211, respectively, to initiate the operation of the call tracing equipment at the respective central offices. It is not necessary for the nuisance call to originate at a station so equipped and in the usual case the nuisance call will not originate at such a station. The call tracing circuits nevertheless work substantially as described herein independently of whether or not the station of origin of the nuisance call is so equipped.

The subscriber at station 100 will then initiate a call which closes a line circuit and operates the central office switching equipment in the normal manner. As pointed out above, it is assumed that this switching equipment is step-by-step equipment which operates in the usual manner. Consequently, the detailed circuits of the step-by-step switching apparatus have not been shown in the drawings and the detailed description of the operation of such equipment is not repeated herein. The detailed description of the operation of such equipment may be found in the numerous publications in the prior art such as, for example, Chapter III of "Telephone Theory and Practice"—"Automatic Switching and Auxiliary Equipment," by K. B. Miller, published by McGraw-Hill Book Company, Inc., first edition, 1933.

Briefly, the subscriber in initiating a call closes or completes a circuit over his line which causes the operation of line relay 911 which relay applies ground to a start lead 917 and also conditions other circuits and leads and causes a line finder to hunt for the calling subscriber's line. The line finder is indicated generally at 101 in Figs. 1 and 10. The convention shown for indicating line finders is in common use and it indicates not a single line finder but a large plurality of line finders as normally employed in step-by-step switching systems.

As the result of the initiation of the call the line finder 101 is set into operation and finds the line terminals 130 of the calling subscriber's line and extends a path from these line terminals to the first selector 102 indicated in Figs. 1 and 13. The operation of the line finder 101 also causes the cut-off relay 912 to operate and disconnect the line relay 911 in the usual manner. As a result, the line relay 911 releases removing ground from the start lead 917. Thereafter, other lines may initiate calls and apply ground to a start lead with the result that other line finders are set into operation.

The selector circuits are just indicated without showing their detailed circuits, it being understood that these selectors operate in their usual manner. The first selector supplies dial tone to the subscriber at station 100 and the subscriber will then dial the first digit which actuates the first selector 102 and extends a connection to the second selector 103. The subscriber next dials the second digit and as a result a connection is established to a third selector 104. Upon the dialing of the third digit a connection is established from the selector to an outgoing repeater shown in the lower portion of Fig. 13 and then over a trunk 110 extending to the distant or second switching station. At the second switching station the trunk 110 terminates on an incoming selector 206 which selector follows the next digit dialed by the subscriber and extends the connection to a second incoming selector 207. The next digit dialed by the subscriber controls the selection of a connection to a connector 208 which connector responds to the final two digits dialed by the subscriber and extends a connection to the called subscriber's station 200. In this case the cut-off relay 2312 is operated so that the line relay 2311 does not operate.

The connector 208 in establishing connection to the calling subscriber's line will apply ringing current thereto and cause the subscriber's bell to ring. The subscriber may then answer the call and upon ascertaining that it is a nuisance call he will actuate the call tracing key 211 provided at his station.

*Initiation of operation of call tracing equipment and circuits*

Actuation of the call tracing key 211 applies ground to the tip side of the line at the subscriber's station which unbalances the line circuit so that relay 2313 operates. With the line circuit balanced prior to the operation of key 211 the differential relay 2313 does not operate because the line current flows through its windings in such directions as to produce opposite magnetic fields within the relay core structure so that the relay does not operate. However, upon the operation of key 211, increased current flows through one of the windings of relay 2313 from battery from the connector circuit 208 to ground through the operated key 211.

*Hunting and seizing a call tracing sender*

The operation of relay 2313 at this time connects ground to the start conductor 2318 and the hunting conductor 2319 extending to the finder switch shown in Fig. 24 of the call tracing sender shown in Figs. 24, 25, 26 and 28. The application of ground to the start conductor 2318 completes a circuit for actuating the stepping magnet 2411 of the finder switch which circuit extends from battery through the winding of stepping magnet 2411 and through its break or self-interrupting contacts, the right-hand middle contacts of the start relay 2412, the right-hand inner break contacts of relay 2413, the left-hand break contacts of relay 2414, the lower inner break contacts of relay 2314 to ground through the rectifier or diode 2309 and the operated contacts of relay 2313. The stepping magnet 2411 in operating the above-described circuit interrupts its operating circuit thus permitting this magnet to release.

In accordance with one construction the brush arms 2415, 2417, 2423, 2429, 2430 and 2435 are all advanced upon the release of the stepping magnet 2411. Upon the release of the stepping magnet it again recloses the above-described circuit whereupon this magnet reoperates and again interrupts its circuit, releases and again advances all of the brushes another step. Thus, due to the self-interrupting or buzzing action of this magnet the brush arms of the switch are rapidly advanced over the associated bank terminals.

When the brush arms including brush arm 2415 advance to their No. 4 terminals as shown in Fig. 24, brush arm 2415 will engage the terminal to which ground has been connected in a circuit extending from the lower operated contacts of relay 2313, the lower break contacts of relay 2314 and conductor 2319 to the No. 4 terminal and then through brush arm 2415 to battery through the winding of relay 2414 thus causing the operation of relay 2414. Relay 2414 in operating interrupts the above-described circuit for operating the stepping magnet 2411 with the result that when the brush arm 2415 steps on the No. 4 terminal in its bank, stepping magnet 2411 is not reoperated so that all of the brush arms of the finder switch shown in Fig. 24 remain in contact with the No. 4 terminal of their respective banks.

Assuming now that the remainder of the sender circuit is in its normal condition and that relay 2610 in particular is released, the operation of relay 2414 completes a circuit for the operation of relay 2413 which circuit extends from battery through the winding of relay 2413, the right-hand operated contacts of relay 2414 and over conductor 2416 which conductor extends through Fig. 25 to ground through the inner break contacts of relay 2610. If the remaining part of the call tracing sender is not idle and if relay 2610 is not released at this time the circuits will wait until relay 2610 releases as described hereinafter and then upon the release of relay 2610 with relay 2414 operated the above-described circuit is completed for the operation of relay 2413.

The operation of relay 2413 also interrupts the operating circuit of the stepping magnet 2411 at its right-hand inner break contacts and also completes a circuit for the operation of relay 2314 which circuit extends from battery through the upper winding of relay 2314 over conductor 2321 and then through a No. 4 terminal and brush arm 2417 to ground through the left-hand operated contacts of relay 2413. Relay 2314 in operating completes two circuits for maintaining itself operated; one through its lower winding and lower operated contacts to ground through the rectifier or diode 2309 and the operated contacts of relay 2313; and the other through its upper winding and upper operated contacts to ground on the sleeve conductor from the connector circuit 208, represented in Fig. 19. The operation of relay 2314 removes ground from the start conductor 2318 and the hunting conductor 2319 thus withdrawing the request for a call tracing sender since a call tracing sender has already been connected to this line. The operation of relay 2314 in removing ground from conductor 2319 interrupts the operating circuit of relay 2414 which relay releases and in turn interrupts the operating circuit of relay 2413. Relay 2413, however, is a slow-release relay and maintains itself operated for a sufficiently long interval of time after the circuit through its winding is interrupted to insure that relay 2412 operates and locks as described hereinafter.

The operation of relay 2413 also completes a circuit for the operation of the start relay 2412 which circuit extends from battery through the winding of relay 2412 to ground through the right-hand operated contacts of relay 2413.

Relay 2412 in operating completes a circuit for maintaining itself operated from battery through its winding and left-hand outer operated contacts, the break contacts of relay 2418 over brush arm 2417 and No. 4 bank terminal, and over conductor 2321 and through upper operated contacts of relay 2314 to ground on the sleeve terminal from the connector switch 208 shown in Fig. 19.

The operation of relay 2412 together with the subsequent release of relay 2413 as described above extends the circuit of the start conductor 2318 through the finder and call tracing sender circuit employed in tracing the call described herein to a succeeding sender and finder circuit, not shown herein. This start lead and circuit is similar to the start circuits in step-by-step line finder circuits. When desired, and similar to such step-by-step line finder circuits, relay 2412 may be provided with an additional locking winding and contact for maintaining itself operated so long as ground is applied to this start lead 2318 from any source. These leads may also be provided with the usual alarm and protective circuits and features.

The operation of relay 2412 also completes a circuit for the operation of relay 2419 which circuit extends from battery through the winding of relay 2419, the break contacts of relay 2420 to ground through the right-hand outer operated contacts of relay 2412. The operation of relay 2412 also completes a circuit for the operation of relay 2420 from battery through the winding of relay 2420, the second set of break contacts from the left of relay 2427, break contacts of relays 2513 and 2514, the lower break contacts of relay 2615 to ground through the right-hand operated contacts of relay 2412. Relay 2420 in operating interrupts the above-described operating circuit of relay 2419 and thus permits this relay to release if it had previously operated. The operation of relay 2420 together with the release of relay 2419 if it has previously operated as described above connects the winding of relay 2434 to the tip and ring conductors 2431 on the line finder banks for the purpose of holding the line finder and the first selector connected thereto when the line or call tracing sender is found as described hereinafter.

The operation of relay 2412 also completes a circuit through the windings of relays 2421 and 2422 which circuit extends from ground through the right-hand outer operated contacts of relay 2412, the winding of relay 2422, the winding of relay 2421, brush arm 2423, then over conductor 2424 and then through the lower operated contacts of relay 2314 and through the cross-connection 2316 to battery through either the high resistor 2322 or the low resistor 2323. As shown in the drawing the cross-connection 2316 is connected to the low resistor 2323. Relay 2421 operates in the above-described circuit when the cross-connection 2316 is connected to either the high resistor 2322 or the low resistor 2323. The relay 2422 is a marginal relay and operates only when the cross-connection 2316 is connected to the low resistor 2323 but does not operate when the cross-connection 2316 is connected to the high resistor 2322. The cross-connection 2316 is connected to the low resistor 2323 when the subscriber desiring the call tracing service is the so-called tip subscriber on a party line. For all other subscribers desiring call tracing service the cross-connection 2316 is connected to the high resistor 2322 so that only relay 2421 will operate.

However, as shown in the drawing, the cross-connection 2316 extends to the low resistor 2323 indicating that the tip party on the subscriber's line desires the call tracing service. As a result, both relays 2421 and 2422 operate in the above-described circuit.

The operation of relay 2421 at this time completes a circuit for stepping the switch shown in Fig. 25 from its normal or No. 44 position to its first position. The circuit for so advancing this switch extends from battery through the winding of the stepping magnet 2510 and the interrupting break contacts thereof and then over conductor 2511 extending to the right-hand operated contacts of relay 2421, through these operated contacts and through the No. 44 terminal of the bank associated with the switch arm 2512 and then through switch arm 2512 which is resting upon the No. 44 terminal and then to ground through the right-hand outer operated contacts of relay 2412. The operation of relay 2421 also completes a circuit for the operation of relay 2610 which circuit extends from battery through the upper winding of relay 2610, conductor 2511, the right-hand operated contacts of relay 2421, terminal No. 44 and brush arm 2512 to ground through the right-hand outer operated contacts of relay 2412.

The operation of stepping magnet 2510 causes its interrupting contacts to open, thus releasing the magnet and advancing the switch. The advance of the switch steps the brush arm 2412 off its No. 44 bank terminal and thus interrupts the circuits described above for operating the stepping magnet 2510 and relay 2610 with the result that all of the brush arms of the selector switch shown in Fig. 25 are advanced from their No. 44 to their No. 1 position. Relay 2610 is a slow-release relay and does not open its contacts for a short interval of time after the circuit through its winding is opened.

In advancing to its No. 1 position this switch completes a circuit for the operation of relay 2614 from battery through the winding of relay 2614, the No. 1 bank terminal and brush arm 2517 in contact therewith to ground through the right-hand outer operated contacts of relay 2412.

*Call tracing equipment initiates a call tracing call*

Relay 2412 in operating also connects ground to the start lead 2425 of the line finders 201 with the result that a line finder is set into operation hunting for the terminals 229 from the call tracing sender on the banks of the line finder group 201. The circuit for grounding the start lead 2425 extends from the start lead through the right-hand contacts of relay 2426, the right-hand inner operated contacts of relay 2412 and the left-hand outer break contacts of relay 2427 to ground.

The operation of relay 2412 also connects the winding of relay 2426 through the second set of operated contacts from the left of relay 2412 and the middle set of right-hand break contacts of relay 2427 to the sleeve terminal of the line finder bank terminals 229. Thus, the line finder hunts for these terminals and upon finding the terminals connected to the trunk circuit stops and applies ground to the sleeve conductor which in turn causes relay 2426 to be operated in the above-described circuit path.

The operation of relay 2426 removes ground from the start lead thus withdrawing the request service from the line finder group and in addition completes a circuit for maintaining itself operated from the sleeve conductor through the center set of right-hand break contacts of relay 2427, the left-hand operated contacts of relay 2426 to battery through the winding of relay 2426. When the line finder 201 finds terminals 229, the tip and ring conductors 2431 are extended to a first selector 202. The winding of relay 2434 is also connected between these conductors 2431. Current thus flowing over this circuit holds the first selector 202 and the line finder busy but is in the direction to maintain the contacts of relay 2434 in the position shown in the drawing. The line finder 201 and selector are thus maintained in the described condition until pulses are repeated over conductors 2431 as described hereinafter.

*Seizing call identifying sender and entering a zero therein*

The operation of relay 2412 also completes a circuit for the operation of relay 2611 which circuit extends from battery through the winding of relay 2611, lower break contacts of relays 2515 and 2516 to ground through the right-hand outer operated contacts of relay 2412. The operation of relay 2611 connects the resistor 2612 through its lower operated contacts between the tip and ring conductors extending to the automatic call identifier sender for holding the line finder and sender when this call tracing sender trunk is found.

In addition, the operation of relay 2412 completes a circuit for connecting ground to the start lead for operating the start relay 2210 of the finder switch for connecting the call tracing sender to the automatic call identifier sender. The circuit for operating relay 2210 extends from battery through the winding of relay 2210, the upper inner break contacts of relay 2613 to ground through the right-hand outer operated contacts of relay 2412.

When the line finder equipment associated with the call identifying sender and related equipment finds the terminals of this call tracing sender, ground is connected to the sleeve terminal and relay 2613 operates. Relay 2613 in operating removes ground from the G or start lead and thus withdraws the request for service from the automatic call identifying equipment since a sender has already found the call tracing sender requesting the service.

The operation of relay 2613 at this time completes a circuit for the operation of relay 2515 which circuit extends from battery through the winding of relay 2515, the upper operated contacts of relay 2613, the No. 1 terminal and brush arm 2519 of the stepping switch shown in Fig. 25 and then through the upper outer break contacts of relay 2610 and the third set of unoperated contacts from the right of relay 2428 to ground through the upper outer operated contacts of relay 2614.

Relay 2515 in operating in the above-described circuit transfers the operating path of relay 2611 from the above-described circuit extending through the right-hand outer operated contacts of relay 2412 to a circuit extending to ground through the break contacts of relay 2817. This circuit may now be traced from battery through the winding of relay 2611, the inner set of lower operated contacts of relay 2515 to ground through the break contacts of relay 2817.

In addition, the operation of relay 2515 applies ground to the lower terminal of resistor 2816 and thus causes point 2814 to assume a voltage between battery voltage and ground voltage due to current flowing through the voltage divider resistors 2815 and 2816. In addition, ground is connected to the right-hand terminal of condenser 2811. The circuits for applying these grounds extend from ground through the third set of operated contacts from the top of relay 2515 to the right-hand terminal of condenser 2811 and to the lower terminal of resistor 2816.

With relay 2810 in the position shown in the drawing the application of an intermediate voltage to point 2814 causes relays 2813 and 2812 to be actuated to their left-hand position and causes current to flow through the upper winding of relay 2810 tending to actuate the armature of this relay to its left-hand position. However, the application of ground to the right-hand terminal of condenser 2811 causes this condenser to charge through the lower winding of relay 2810. The charging current of condenser 2811 flows through the lower winding of relay 2810 in such a direction as to maintain the armature of relay 2810 in the position shown in the drawing for a predetermined interval of time depending upon the magnitude of the condenser 2811 and the resistance of the lower winding of relay 2811 and other resistances connected in series therewith. At the end of this predetermined time interval, condenser 2811 becomes sufficiently charged so that the current flowing through the lower winding of relay 2810 is reduced to a sufficiently low value so that the current flowing through the upper winding of this relay, as described above, causes the armature of relay 2810 to be operated to its left-hand position and in operating to its left-hand position the armature closes its contacts and applies ground to the left-hand winding terminals of both the upper and lower windings of relay 2810. As a result, condenser 2811 discharges through the lower winding of relay 2810 which current flows through the lower winding of relay 2810 in such a direction as to maintain relay 2810 operated to its left-hand position for a predetermined interval of time. The application of ground to the left-hand terminal of the upper winding of the relay 2810 reverses the current flowing through the upper winding of this relay as well as the current flowing through the windings of relays 2812 and 2813 with the result that the armatures of relays 2812 and 2813 are actuated to their right-hand positions. When condenser 2811 has become sufficiently discharged the magnetic effect of the reversed current flowing through the upper winding of this relay overcomes the magnetic effect of the condenser discharge current flowing through the lower winding of this relay and causes this relay to be actuated to the position shown in the drawing thus removing ground from the left-hand winding terminals of both windings of this relay. As a result, current flowing through the upper winding of this relay as well as through relays 2812 and 2813 again reverses and actuates the armatures of these relays to their left-hand position. In addition, current flowing through the lower winding of relay 2810 due to the charge of condenser 2811 tends to maintain relay 2810 in the position shown in the drawing. Thereafter, the above-described cycle of operations is repeated. It is thus apparent that relays 2810, 2812 and 2813 operate as a pulse generator. These relays are employed to generate suitable signaling pulses for the further control of circuits in accordance with this invention as will be described hereinafter.

Assuming the armatures of relays 2810, 2812 and 2813 initially to be in the positions shown in the drawing, upon the first operation of the armature of relay 2813 to its right-hand position as described above, a circuit is completed for the operation of relay 2818 from battery through the winding of relay 2818, the right-hand operated contacts of relay 2813 to ground through the lower outer break contacts of relay 2825. Relay 2818 is slow in releasing so that it maintains itself operated during the generation of pulses by relays 2813, 2812 and 2810 as described above.

Upon the return of the armature of relay 2813 to the position shown in the drawing a circuit is completed for the operation of relay 2817 from battery through the winding of relay 2817, the operated contacts of relay 2818, the left-hand contacts and armature of relay 2813 to ground through the outer lower break contacts of relay 2825. Relay 2817 is a slow-release relay so that it maintains its contacts closed or operated during the generation of pulses by relays 2810, 2812 and 2813 as described above. The operation of relay 2817 now extends the control circuit of relay 2611 from the lower break contacts of relay 2817 through the upper break contacts of relay 2819 and through the left-hand contact and armature of relay 2812.

The next time relay 2812 is actuated to its right-hand position it interrupts the circuit through the winding of relay 2611, thus allowing this relay to release and open the tip and ring conductors extending to the call identifying sender. The release of relay 2611 also completes circuits for the operation of relays 2518 and 2824 and also for the operation of the stepping magnet 2820. The circuit for operating relay 2518 extends from battery through the winding of relay 2518 through the second set of operated contacts from the top of relay 2515 to ground through the upper break contacts of relay 2611. The circuits for operating relay 2824 and the stepping magnet 2820 extend from battery through the windings of this relay and magnet in parallel and then through the fourth set of operated contacts from the top of relay 2515 to ground through the upper break contacts of relay 2611.

The operation of the stepping magnet 2820 causes the brush arms 2822 and 2823 to advance one step and engage the No. 1 terminals of their respective banks. At this time these bank terminals are open or disconnected so that no circuits are completed by advancing these brush arms to their No. 1 terminals.

Upon the reclosure of the contacts of relay 2812 a short interval of time later the circuit for operating relay 2611 is again established, thus causing this relay to operate and again connect resistor 2612 between the tip and ring conductors extending to the call identifying sender. In addition, the operation of relay 2611 interrupts the above-described operating circuit for relays 2518 and 2824 and a stepping magnet 2820, thus completing the first pulse which simulates a dial pulse.

The above cycle of operations is repeated each time relay 2812 first opens its contacts and then recloses them. Upon each cycle of the operation an additional pulse is generated and transmitted both to the call identifying sender shown in Figs. 21 and 22 and also to the relays 2518 and 2824 and the stepping magnet 2820. The stepping magnet 2820 in turn causes each of the brush arms 2822 and 2823 to be advanced one step for each pulse transmitted to it. As described above, the exemplary embodiment set forth herein is arranged to transmit ten pulses representing a zero to the call identifying sender.

Upon the transmission of the tenth pulse to the call identifying sender and also to the stepping magnet 2820 the brush arms 2822 and 2823 step on to their respective No. 10 bank terminals. At the termination of this tenth pulse, relay 2812 reoperates and reoperates relay 2611. Relay 2611 in operating recloses the tip and ring conductors to the call identifying sender and in addition causes the stepping magnet 2820 to release and relays 2518 and 2824 to release. Relay 2518 is a slow-release relay and does not release immediately. However, relay 2824 in releasing at this time completes a circuit for the operation of relay 2819 which circuit extends from battery through the winding of relay 2819, the break contacts of relay 2824, the upper inner operated contacts of relay 2515, brush arm 2822 and No. 10 bank terminal in contact therewith at this time to ground through the lower outer operated contacts of relay 2515. Relay 2819 in operating completes a circuit for maintaining itself operated from battery through its winding and lower inner operated contacts, the lower operated off-normal contacts 2826 to ground through the second set of break contacts from the bottom of relay 2513 and also from the lower inner operated contacts of relay 2819 to ground through the lower operated contacts of relay 2817. The operation of relay 2819 also completes circuits through both the upper and lower windings of relay 2610. Since the current through these windings flows in opposite directions around the core, relay 2610 does not operate at this time. The circuit through the upper winding of relay 2610 extends from battery through the upper winding of relay 2610, break contacts of stepping magnet 2510, to ground through the second set of operated contacts from the bottom of relay 1820. The circuit of the lower winding of relay 2610 extends from the battery through the lower winding of relay 2610, and the upper outer operated contacts of relay 2819 to ground through the lower break contacts of relay 2513. The operation of relay 2819 completes a circuit for the operation of the stepping magnet 2510 from battery through the winding of the stepping magnet 2510 to ground through the second set of operated contacts from the bottom of relay 2819. The operation of relay 2819 also applies ground to the winding of relay 2611 in a circuit extending from battery through the winding of relay 2611, the lower inner operated contacts of relays 2515 and 2817, the upper inner operated contacts of relay 2819 to ground through the lower break contacts of relay 2514, thus maintaining relay 2611 operated even though the contacts of relay 2812 are again opened before this circuit is advanced and relay 2515 released as described hereinafter.

The operation of the stepping magnet 2510 interrupts the above described circuit through the upper winding of relay 2610, thus causing relay 2610 to operate due to the current flowing through its lower winding in the circuit described above. Relay 2610 in operating interrupts the above-described circuit for operating relay 2515, thus permitting this relay to release and transfer the operating circuit of relay 2611 back to the ground connected to the right-hand outer operated contacts of relay 2412. In addition, the release of relay 2515 interrupts the operating circuit of the above-described pulse generating relays 2810, 2812 and 2813 which relays then remain with their armatures in the positions to which they were last operated. As a result, after a short interval of time relays 2817 and 2818 also release. In addition, the release of relay 2515 interrupts other control circuits described above and restores these circuits to their normal or idle condition.

The operation of relay 2819 together with the release of relay 2518 after the final pulse has been generated and transmitted as described above completes a circuit for operating the release magnet 2821 from battery through the winding of the release magnet 2821, the upper set of operated off-normal contacts 2826, the lower operated contacts of relay 2819 and the break contacts of relay 2518 to ground through the break contacts of the second set of contacts from the bottom of relay 2513.

The operation of the release magnet 2821 releases the stepping switch and allows this switch to return to normal. When the brush arms and other elements of the switch have been returned to normal, the off-normal contacts 2826 open and in turn interrupt one of the locking circuits of relay 2819. The release of relay 2817 described above interrupts the other locking circuit of relay 2819 so relay 2819 thereupon releases.

The release of relay 2819 interrupts the operating circuit of relay 2610, thus permitting relay 2610 to release. In addition, the release of relay 2819 interrupts the operating circuit of the stepping magnet 2510, thus permitting this magnet to release. The release of the stepping magnet 2510 causes the brush arms of the stepping switch shown in Fig. 25 to advance from the No. 1 to the No. 2 position at this time.

*Identifying the trunk circuit employed for the nuisance call*

Meantime, the call identifying sender, shown in Figs. 21 and 22, after having had a zero dialed into it as a first digit makes a party test over the incoming tip and ring conductors 2616 and 2617. Inasmuch as the tip party identifying resistance 2618 is not connected, the sender identifies the call as a "ring" party call. The sender in advancing and becoming connected to the call tracing sender as described herein also operates relay 2619 over the fundamental tip and ring conductors 2620 and 2621 and in addition causes circuits of the type described in the above-identified Gooderham patent to function which circuits in turn cause the call identifying sender of Figs. 21 and 22 first to be connected to an identifier circuit by the operation of relay 2113. In turn the call identifying sender causes connecting relay 2910 to operate and connect the call identifying sender with the call tracing sender and also causes relay 2010 to operate and connect the call tracing sender with the same identifier as the call identifying sender shown in Figs. 21 and 22 is connected to.

The call identifying sender advances and conditions its circuits and the circuits of the identifier to search for the line or in this case the trunk to be identified. When the circuits are conditioned for searching the sender applies potential to the conductor 2622 of the proper polarity, i.e., ground potential in the exemplary embodiment of this invention described herein in detail, to actuate the polarized relay 2623 to close its lower group of four contacts.

Relay 2623 is a polarized relay as indicated on the drawings and is arranged to close its lower four make contacts when the current flows through its winding in one direction but does not close its upper set of make contacts at this time. When current flows through the winding of this relay in the reverse direction then the upper set of contacts close while the lower four make contacts remain open. The circuit for operating the lower four sets of make contacts of relay 2623 at this time extends from Fig. 22 of the call identifying sender over conductor 2622, the windings of relay 2623 and through the left-hand two inner sets of operated contacts of relay 2412 to the mid-point between the voltage divider resistances 2432 and 2433.

Relay 2623 in operating at this time completes a circuit for operating relay 1910 which circuit extends from battery to the winding of relay 1910 through the second set of operated contacts from the top of relay 2010 and through the operated contacts of relay 2422, which relay is operated as described above due to the cross-connection 2613 being connected to the low resistance 2323, through the inner set of lower operated contacts with relay 2623 to ground through the lower break contacts of relay 2615 and the right-hand outer operated contacts of relay 2412.

The operation of relay 1910 indicates to the identifier that the identifier should search in the trunk group for the line or trunk to be identified instead of among the subscribers' lines. Consequently, when the call identifier sender operates the start relay 1911, the contacts of this relay are shifted from the control circuits for searching in subscribers' lines to the control circuits for searching in trunk groups. As a result, with relay 1910 operated, relay 1811 is operated instead of 1810. The operation of relay 1811 by means of contacts and cross-connections as shown extends connections from the thousands control circuit 2011 of the call identifier through lock-out relays of the various identifiers for operating the various thousands group relays associated with the trunk circuits. Two of such thousands group relays are shown in Fig. 17. Thus, relay 1710 represents a thousands relay of the identifier assumed to be employed in identifying the trunk circuit over which the call arrived. Relay 1711 and a similar thousands relay are employed by another identifier to search in the same thousands trunk group.

Returning now for a moment to the operation of relay 2623 as described above, the operation of this relay in addition to completing a circuit for the operation of relay 1910 which conditions the identifier for searching in the trunk thousands group instead of in the subscriber's line groups, completes a path from the source of alternating current or tone 2012 in the identifier, through circuits and contacts of the identifier and through the inner operated contacts of relay 2010 and the center set of lower operated contacts of relay 2623 and through the center set of left-hand break contacts of relay 2428, the left-hand break contacts of relay 2413 through the brush arm 2417 which is resting on terminal No. 4 at this time as described above and then over conductor 2321 which extends through the upper operated contacts of relay 2314 to the sleeve circuit of the called subscriber 200. It may be recalled that subscriber 200 is the subscriber who received the nuisance call and is attempting to trace the origin of this call. Consequently, this subscriber's line is now connected through the switches to the incoming trunk over which the nuisance call arrived. As a result, this tone from source 2012 is applied over the above-described circuit to the sleeve of the subscriber's line. From the sleeve of this line the tone extends to the subscriber's line terminal in the identifier but as pointed out above, the identifier has been conditioned to not search for the tone in the subscriber's line fields but rather in the trunk fields. Consequently, the tone from the sleeve of the subscriber's line in addition to extending to the searching fields in the identifier individual to this subscriber's line also extends through the incoming connector circuit 208, the second selector 207 and the first incoming selector 206 to the sleeve terminal of trunk 110. From the sleeve terminal of the trunk 110 the tone extends to the corresponding terminal in the trunk field of the identifier where the identifier is attempting to locate and identify this particular trunk. The circuits of the connectors are arranged to apply ground to the respective sleeve conductors through a low resistance or impedance so that the tone or alternating-current potential from source 2012 is not unduly attenuated by the sleeve ground connection.

When the above-described circuits have functioned in the manner set forth herein and in the above-identified application of Gooderham and the start relay 1911 is operated, a circuit is completed from battery through the operated contacts of relay 1911, the inner operated contacts of relay 1910 and then through the upper inner break contacts of relay 1812 and then through interconnecting relay 1814 to the winding of the trunk relay 1610.

The interconnecting relay 1814 is operated in the same manner as described in the above-identified Gooderham patent and is employed to operate the corresponding relays 1610, 1611, 1612, etc. associated with the various thousands relays. These relays are employed to extend the test conductors of cable 2013 of the call identifier to the thousands test leads of the identifier in the various identifier fields. Under the assumed conditions with relay 1610 operated the test conductors from the identifier extend to a thousands group of test conductors in the trunk field.

It is to be understood that each of the so-called searching fields comprises a large plurality of conductors or terminals each identified with a particular subscriber's line or trunk. Thus, each incoming trunk will have a terminal or set of conductors in the trunk searching field to which tone will be applied when it is desired to find or identify that particular trunk. Likewise, each subscriber's line has one or two terminals in similar identifying fields. If the subscriber's line is an individual line then its terminal will appear only in the so-called "ring" field. If, however, the subscriber's line is a party line, then it will have terminals appearing both in the "ring" field and in the "tip" field, the terminals in the "ring" field serving to identify a call originated by the "ring" party and the terminals in the "tip" field serving to identify a call originated by the 'tip" party on the line.

Inasmuch as the operation of the identifier and call identifying sender when cooperating with call tracing equipment described herein is substantially identical with corresponding operations of this equipment when employed to identify calling subscriber's lines as set forth in the above-identified patent of Gooderham, only representative lines and trunk circuits are shown herein and the operation of this equipment as described is in sufficient detail to permit an understanding of the operation of the exemplary call tracing equipment embodying this invention and described herein. For a more complete description of the operation of this equipment reference is made to the above-identified Gooderham patent.

Relay 1610 in operating extends a group of connections from the trunk field to the identifier circuit shown in Fig. 20, it being understood, of course, that the thousands relays in the call identifier, namely, relays 2014 and 2015 have been operated. If the trunk to be identified is not located in the group to which relay 1610 extends connections, then the searching circuits of the identifier will be actuated and cause relay 1812 to be operated which relay will then cause other relays similar to relays 1811 and 1610 to be operated for extending another group of trunk terminals to the call identifier detecting circuits through the thousands relay 2014. If the trunk to be identified is not found in the second group of trunks, then a succeeding relay such as relay 1813 will be operated to search an additional group of trunks. This searching process is continued until the tone transmitted from the sleeve of the called subscriber's line, i.e., the line of subscriber 200, to the sleeve of an incoming trunk circuit over which the call arrived at office Y is located and actuates one of the detector circuits 2020 through 2029. When the tone is located and connected to the detector circuits, it will cause one of the detectors to be actuated which in turn causes one of the thousands relays to be actuated in response thereto. As assumed and shown in the drawing, the trunk terminal was located within the first group to be tested by the operations of relays 1811, 1914 and 1610. Consequently, when these relays are operated, one of the detector circuits 2020 to 2029 through the thousands control circuit 2011 actuates the thousands relay, which is shown in Fig. 17 as relay 1710. This relay causes the proper thousands number corresponding to this relay to be registered in the calling number thousands register circuit 2016 and causes the identifier to advance and in turn search within the hundreds groups within the thousands groups selector relay 1710. When the terminal is found in this hundreds group, the corresponding hundreds number is entered into the hundreds register 2017. In a similar manner, the call identifier searches in the tens groups and the units groups and has these numbers registered in the corresponding registers 2018 and 2019.

In searching through the various number fields for the terminals having the desired tone applied to them and causing the numbers to be registered in the appropriate registers, the circuits operate in the same manner as described in the above-identified Gooderham application except that the searching under the assumed conditions is done in the number field assigned to incoming trunk circuits.

As explained in the above-identified Gooderham patent in addition to identifying a calling line, the identifier and call identifying sender perform several other functions. In the first place, the calling office is identified. In addition, the called office code is reconstructed and a route relay selected for selecting the route for the transmission of a message, then suitable selecting pulses are transmitted for selecting this route and finally the pulses registered in the sender identifying the called party are transmitted. The sender in addition to transmitting these pulses substantially independent of the pulse transmitting operations also prints the calling office code, the calling subscriber's number, the date, the time, the call identifying sender number, the identifier number employed in making the call, the calling office code as reconstructed, the calling number, the calling class of service, the initial period rate and then the trunk causes the conversation time to be printed. The ticket is also cut at the proper time. Such a ticket is represented in Fig. 31. These various functions are controlled by the code reconstructing circuits and apparatus and by cross-connections within the identifier so that the proper information is registered in the desired places in the call identifying sender.

When the call identifying equipment including the identifier and call identifying sender are employed in combinations with the call tracing equipment described herein, the code reconstructing portion of the identifier is not employed. Instead, different cross-connections are made so that suitable information is recorded in the call identifying sender in the appropriate places therein. For example, the trunk thousands group relay identifying a group of trunks in which the particular trunk is located is employed to select a route relay. Thus, as shown in the drawing, relay 1710 completes a circuit for the operation of route relay 2030, from battery through the winding of relay 2030 to ground through the second set of operated contacts from the bottom of relay 1710. Inasmuch as the trunk groups are individual to the office of origin of the call this route relay is then cross-connected to the appropriate digit relays which in turn cause the proper called office code to be recorded in registers 2110, 2111 and 2112. Likewise, since this is a call tracing service the operation of the start relay for searching in the trunk group is employed to designate the calling office in the call identifying sender. Since it is assumed that the same calling office code will be used at all times for call tracing service, the start relay will be employed as described herein. It is assumed herein that this code will be 990. Of course, any suitable code may be employed and in addition it may be desirable on occasion to employ different codes in which case the particular thousands relay individual to the specific trunk groups will be employed to select different calling office codes merely by properly cross-connecting contacts with said thousands relay to the appropriate relays in the calling office register and identifier. This information is then passed to the call identifying sender in the normal manner. The trunk number in the group of trunks is then registered in the calling number registers in the call identifying sender.

During the time the identifier and call tracing sender are operating in the manner described in the above-identified Gooderham patent and outlined above, the circuits of the call tracing sender are also advanced. Thus, the operation of relay 2623 as described above, in addition to applying tone to the proper sleeve conductor and conditioning the identifier to search among the trunk lines, also causes the stepping switch shown in Fig. 25 to advance from its No. 2 position to its No. 3 position. The operation of relay 2623 at this time completes a circuit for the operation of relay 2819 which circuit extends from battery through the winding of relay 2819, the upper break contacts of relay 2824, through the second set of operated contacts from the bottom of relay 2623, the upper inner operated contacts of relay 2614 (it being recalled that relay 2614 operates in position No. 1 of the switch and remains operated through position No. 17), the No. 2 terminal of the No. 1 bank and brush arm 2519, the upper break contact of relay 2610, the third set of break contacts from the right on relay 2428 to ground through the upper outer contacts of relay 2614. The operation of relay 2819 also completes the above-described circuits through the upper and lower windings of relay 2610. Relay 2819 in operating completes a circuit described above for the operation of the stepping magnet 2510 of the stepping switch shown in Fig. 25.

The operation of magnet 2510 interrupts the circuit through the upper winding of relay 2610 which relay then operates due to current flowing through its lower winding. The operation of relay 2610 interrupts the operating circuit of relay 2819 and since its locking circuit is open at this time relay 2819 releases and releases switch magnet 2510 and relay 2610. As a result, the brush arms 2519, 2520, etc. of the stepping switch shown in Fig. 25 are advanced to the No. 3 position.

*Selecting and seizing a trunk circuit extending to the office of origin of the nuisance call*

When brush arm 2519 engages its No. 3 terminal and relay 2610 releases, a circuit is completed for the operation of relay 2514 which circuit extends from battery through the winding of relay 2514 to the No. 3 terminal and brush arm 2519, the upper break contacts of relay 2610, the third set of unoperated contacts from the right of relay 2428 to ground through the upper outer operated contacts of relay 2614.

The operation of relay 2514 conditions the call tracing sender circuits to respond to signals transmitted from the call identifying sender.

Relay 2514 in operating transfers the operating circuit of relay 2420 from the right-hand operated contacts of relay 2412 as described above to the ground on the operated contacts of relay 2619. The circuit for operating relay 2420 thus now extends from battery through the winding of relay 2420, the second set of break contacts from the left of relay 2427, the lower inner break contacts of relay 2513, the lower outer operated contacts of relay 2514 to ground through the upper operated contacts of relay 2619. Thus, when the call identifying sender starts to pulse out the called office code as selected by the route relay as described above which route relay now identifies the office of origin of the nuisance call due to the cross-connections described above, relay 2619 will follow these pulses because the call identifying sender sends these pulses out over the fundamental tip and ring conductors 2620 and 2621. As a result, relay 2420 also follows these pulses and opens its contacts in response to each of the open pulses received over the fundamental tip and ring conductors from the call identifying sender.

Each release of the relay 2420 completes a circuit for operating both relays 2419 and 2518. Both of these relays are slow-release relays and maintain their contacts in the operated condition during the transmission of pulses representing each digit or symbol but release during the pause between each series of pulses representing these symbols. The circuit for operating relay 2419 at this time extends from battery through the winding of relay 2419 and the lower break contacts of relay 2420 to ground through the right-hand outer operated contacts of relay 2412. The circuit for operating relay 2518 at this time extends from battery through the winding of relay 2518, the second set of operated contacts from the top of relay 2514, the right-hand inner break contacts of relay 2427 and the lower break contacts of relay 2420 to ground through the right-hand outer operated contacts of relay 2412. The operation of relay 2518 on the first series of pulses completes a circuit for the operation of relay 2824 and stepping magnet 2820 of the stepping switch shown in Fig. 28. The circuits for operating this relay and stepping magnet extend from battery through the respective windings and then through the upper inner operated contacts of relay 2514 and the operated contacts of relay 2518 to ground through the lower outer break contacts of relay 2513. The operation of the stepping magnet 2820 at this time advances the brush arms 2822 and 2823 to the No. 1 terminals. Inasmuch as these terminals are now open the circuits do not respond to such operation.

The operation of relay 2419 at this time removes the winding of relay 2434 from across the contacts of relay 2420 and substitutes aiding battery and ground. The aiding battery and ground aids the battery supplied from the first selector 202. Thus, the first digit transmitted from the call identifying sender is repeated by the relays 2619 and 2420. Relay 2420 causes corresponding pulses to be transmitted through the line finder terminals 229 of the line finder group 201 to the first selector 202. This selector responds to the first series of pulses and in response thereto selects a second selector such as 203. At the end of the first group of pulses, relays 2419 and 2518 release. Relay 2419 in releasing substitutes the winding of relay 2434 across the tip and ring conductors 2431, thus maintaining the line finder 201 and the first selector 202 in their selected positions. The release of relay 2518 at this time causes the stepping magnet 2820 and relay 2824 to release. Upon the reception of the first pulse of the second digit, relays 2419, 2518 and 2824 reoperate and the stepping magnet 2820 also reoperates and advances the brush arms 2822 and 2823 to their No. 2 positions. In addition, relay 2420 again repeats the pulses and causes the second selector 203 to respond to these pulses and select a third selector 204. At the end of this series of pulses, relays 2419, 2518 and 2824 as well as the stepping magnet 2820 again release. At the beginning of the third series of pulses, that is, the third digit of the numbers controlled by the route relay in the call identifier, the above-described relays 2419, 2518, 2824 and the stepping magnet 2820 reoperate. At this time, the stepping magnet 2820 advances the brush arms 2822 and 2823 to the No. 3 terminals. Likewise, relay 2420 repeats this third series of pulses and actuates the third selector 204. The third selector responds to this third series of pulses and selects an outgoing repeater shown in the lower portion of Fig. 27. The outgoing repeater is connected to trunk 210 extending to the office of origin of the nuisance call from subscriber 100 to the subscriber 200.

After the third digit has been dialed by the call identifying sender, relays 2419 and 2518 release. The release of relay 2419 reconnects the winding of relay 2434 across the tip and ring conductors 2431 and thus maintains the connection from the call tracing sender to the outgoing repeater individual to the outgoing trunk 210.

Release of relay 2518 interrupts the operating circuit of the stepping magnet 2820 and the operating circuit of relay 2824 which magnet and relay release.

Relay 2824 in releasing completes a circuit for the operation of relay 2819 which circuit now extends from battery through the winding of relay 2819, the break contacts of relay 2824, the third set of operated contacts from the top of relay 2514, switch arm 2822 and the third contact of the associated bank to ground through the lower inner operated contacts of relay 2514. Relay 2819 in operating first locks operated in the above-described circuit under control of the lower contacts of the off-normal contacts 2826. The operation of relay 2819 also completes a circuit for the operation of release magnet 2821 described above from battery through the winding of this magnet 2821, the upper contacts of the off-normal contacts 2826 of the stepping switch, the lowermost operated contacts of relay 2819 through the break contacts of relay 2518 to ground through the lowermost break contacts of relay 2513. The operation of release magnet 2821 restores the brush arms 2822 and 2823 of the stepping switch shown in Fig. 28 to normal which in turn causes the off-normal contacts 2826 to be opened and interrupt the locking circuit of relay 2819.

The operation of relay 2819 described above also completes the above-described circuits through both the upper and lower windings of relay 2610. The operation of relay 2819 also completes the above-described circuit for the operation of magnet 2510 and magnet 2510 in operating interrupts the circuit through the upper winding of relay 2610. Relay 2610 then operates due to current flowing through its lower winding.

Relay 2610 in operating interrupts the operating circuit of relay 2514 which relay releases and restores the circuits controlled by it to their initial condition. In particular, the circuit for maintaining relay 2420 operated is transferred back to the ground connected to the right-hand outer operated contacts of relay 2412 instead of contacts of relay 2619. As a result, relay 2420 does not follow any more signals transmitted from the call identifying sender over the fundamental tip and ring conductors. In other words, relay 2420 does not repeat any more signals which may be repeated by relay 2619. Also the circuit for the above described circuit for operating relay 2518 is interrupted as are the other circuits extending through contacts of relay 2514 including the above-described circuit for operating relay 2819. Consequently since both its operating circuit and its locking circuit are interrupted as described above, relay 2819 also releases.

The release of relay 2819 interrupts the operating circuit of stepping magnet 2510 allowing this magnet to release and in releasing advances the brush arms 2519, 2520, etc. to the No. 4 position. The release of relay 2819 also interrupts the above-described operating circuit extending through the lower winding of relay 2610, thus permitting relay 2610 to again release.

The advance of the brush arm 2519 and the subsequent release of relay 2610 completes a circuit for the operation of relay 2521 which circuit extends from battery through the winding of relay 2521, the No. 4 contact of the No. 1 bank and switch arm 2519, the upper break contact of relay 2610, the third set of unoperated contacts from the right of relay 2428 to ground through the upper operated contacts of relay 2614.

The operation of relay 2521 connects ground through its second set of upper operated contacts to the right-hand terminal of condenser 2811 and the lower terminal resistor 2816, thus setting these pulse-generating relays 2810, 2812, and 2813 into operation. The operation of relay 2521 together with the operation of relays 2817 and 2818 in response to the first operations of relay 2813 extends a circuit from the pulsing relay 2812 to the winding of relay 2518 and also to the winding of the stepping magnet 2820 and relay 2824. The circuit for operating relay 2518 at this time extends from battery through the winding of relay 2518, the third set of operated contacts from the top of relay 2521, through the lower inner operated contacts of relay 2817, the inner set of upper normal contacts of relay 2819 to the contacts of relay 2812. As described hereinbefore, relays 2817, 2818 and 2518 are all slow-release relays and maintain their contacts closed over the open intervals of the dial pulses transmitted to their windings from the contacts of relay 2812.

The circuit for operating relay 2824 and stepping magnet 2820 extends from battery through the winding of this relay and magnet in parallel and then through the fourth set of upper operated contacts of relay 2521 and then through the inner operated contacts of relay 2817 and the upper break contacts of relay 2819 to the pulsing contacts of relay 2812. The stepping magnet 2820 and relay 2824 follow the closures of the pulsing contacts and cause the brush arms 2822 and 2823 to take a step for each pulse generated by the pulse-generating relays. In other words, these brush arms take one step each time the contacts of relay 2812 close.

When the contacts of relay 2812 open after the brush arm 2822 steps on to the sixth contacts and stepping magnet 2820 and relay 2824 release, a circuit is completed for the operation of relay 2819 which circuit extends from battery through the winding of relay 2819, the upper break contacts of relay 2824, the upper inner operated contacts of relay 2521 through the brush arm 2822 and the sixth bank terminal to ground through the lower operated contacts of relay 2521. Relay 2819 in operating opens the pulsing circuit extending through the lower operated contacts of relay 2817 and disconnects the contacts of the pulsing relay 2812. Thus, no further pulses are transmitted to the stepping magnet of relay 2824 or relay 2518. The operation of relay 2819 completes the above-described circuit for maintaining itself operated under control of the off-normal contacts 2826. The operation of relay 2819 also completes the circuits through both windings of relay 2610. Relay 2819 in operating also completes the operating circuit of the stepping magnet 2510 and magnet 2510 in operating interrupts the circuit through the upper winding of relay 2610. As a result, relay 2610 operates due to current flowing through its lower winding. The operation of relay 2610 in turn interrupts the operating circuit of relay 2521 and permits relay 2521 to release and restore the circuits through its contacts to their initial condition. The operation of relay 2819 also completes the above-described circuit for operating the release magnet 2821 of the stepping switches which in turn releases the brush arms 2822 and 2823 and allows them to return to their normal position.

The release of relay 2521 together with the release of the stepping switch shown in Fig. 28 interrupts the operating and locking circuits of relay 2819, thus permitting this relay to release. The release of relay 2819 causes the stepping magnet 2510 to release and advance the brush arms 2519, 2520, etc. to the No. 5 position.

During the time these brush arms are in the No. 4 position, relay 2420 is maintained operated so that a circuit over the tip and ring conductors 2431 extending to the outgoing repeater of trunk 210 is maintained operated. The time of six pulses generated by the pulse generating relays 2810 to 2812, 2813 is deemed sufficiently long to comprise an interdigital time interval and allow sufficient time for the first incoming selector 106 at the office X to be seized.

The release of relay 2819 interrupts the abovedescribed operating circuit through the lower winding of relay 2610, thus permitting relay 2610 to release.

The release of relay 2610 together with the advance of brush arm 2519 to the No. 5 position complete a circuit for the operation of relay 2513 from battery through the winding of relay 2513, the No. 5 contact and brush arm 2519, the upper break contacts of relay 2610, the third set of contacts from the left of relay 2428 to ground through the upper outer operated contacts of relay 2614.

The operation of relay 2513 prepares numerous circuits for printing and pulsing as will be described herein. The call identifying sender after it has received the information from the identifier through the cross-connections as described above, performs two substantially independent series of functions. The first is to pulse out the called office code as determined by the route relay and thereafter to pulse out the called thousands numeral, hundreds numeral, tens numeral and units numeral of the called number as described in the above-identified Gooderham patent. The second series of functions is to cause both the called office and number and calling office number as well as other information such as time and date of call, etc. to be printed as illustrated in Fig. 31. The pulsing and printing functions are performed substantially independent of each other except that the numerals pulsed and printed are controlled by the information recorded in the sender from the identifier. When the identifier identifies the trunk as described above, the trunk thousands relay is cross-connected to an appropriate route relay which relay controls the first three digits pulsed out by the sender. Inasmuch as no further pulses except the zero are pulsed into the sender and this zero is discarded due to other cross-connections from the route relay, it is unable to pulse out the called subscriber's number.

Selecting and seizing call tracing apparatus at the office of origin of the nuisance call and starting printing of call tracing ticket at terminal office of nuisance call As described in the above-identified Gooderham patent and illustrated in Fig. 31, the call identifying sender first prints two asterisks followed by the calling office code and then the calling number. As explained above, when the identifier identifies the trunk the cross-connections are such that the trunk start relay 1910 has cross-connections extending to the identifier circuits such that the operation of this relay causes a predetermined office code to be entered in the called office code registers in the call identifying sender. In the exemplary embodiment set forth herein it is assumed that this code will be 990. However, as pointed out above, any suitable code may be employed and where it is desired to enter different codes for different trunk groups, the trunk thousands relay which identifies the trunk group may be employed to enter the desired code in the called office registers in the call identifying sender instead of the trunk start relay 1910 as shown in the drawing and described herein. Thus, when these numbers are entered in the appropriate registers as described above, the call identifying sender attempts to print the information recorded in it as well as pulse out the necessary information. In order to do this a sender trunk connector is energized which extends a group of leads from a call identifying sender to a trunk circuit. In the present exemplary embodiment of the call tracing equipment the call tracing sender occupies an analogous place to the call identifying trunk in the above-identified Gooderham patent. Consequently, a call tracing sender trunk connector relay is energized through the sender and connecting circuits for extending connections from the call identifying sender to the printing and other portions of the call identifying sender. Thus, relay 2910 is operated under the joint control of the call identifying sender and the operation of relay 2412 in a circuit extending from ground through the right-hand outer operated contacts of relay 2412, through the winding of relay 2910 and then through terminals of the trunk and call tracing sender finder to the call identifying sender. Thereafter, the sender will apply ground to the conductor extending through contacts of relay 2910 through the winding of the motor control relay 2827. Relay 2827 operates and applies power to motor 2831 which motor is set into operation and drives the brush arm 2832 of the distributor mechanism associated with the printer. The motor 2831 continuously drives the brush arm 2832 and a type wheel mounted upon the same shaft as brush arm 2832. Both the type wheel and brush arm 2832 are rotated in a fixed relationship with one another at all times so that the various numerals are in the printing position when the brush arm is passing over the correspondingly designated segment of the distributor shown in Fig. 28. The distributor brush arm 2832 and the type wheel not shown in the drawing but carried on the same shaft as brush arm 2832 are coupled to motor 2831 through a friction clutch not shown but provided in the printing mechanism which printing mechanism is substantially the same as employed in the call identifying trunk circuits disclosed and described in detail in the above-identified Gooderham patent.

In addition to starting motor 2831 into operation the sender will ground one of the leads to the distributor which lead corresponds to the symbol which it is desired to print. As shown in Fig. 32 the first symbol printed by the call identifying sender will be an asterisk. Consequently, the call identifying sender will apply ground to the asterisk conductor extending to the asterisk segment of the distributor 2835 when the portion of the sender circuit controlling printing has been advanced to the printing stage in a manner similar to that described in the above-identified patent of Gooderham.

The application of ground to the asterisk conductor with relay 2827 operated and the motor 2831 continuously rotating brush arm 2832 causes relay 2838 to operate which relay in turn connects the winding of the print magnet 2828 through the inner operated contacts of relay 2838 to the continuous segment 2837 of the distributor 2835. Consequently, the next time the brush arm 2832 passes over the asterisk segment a circuit is completed for the operation of the print magnet 2828 from battery through the winding of the print magnet 2828 and the inner operated contacts of relay 2838, segment 2837, brush arm 2832 to ground from the call identifying sender connected to the asterisk conductor and segment. The operation of the print magnet 2828 at this time stops the rotation of the brush arm 2832 and the print wheel and causes an asterisk to be printed on the ticket as shown in Fig. 32.

In addition, the operation of the print magnet 2828 applies ground to conductor 2833 extending to the call identifying sender and also applies ground through the outer operated contacts of relay 2838 to the conductor 2834 extending to the call identifying sender through the contacts of the connecting relay 2910. As a result, the call identifying sender advances and removes ground from the asterisk conductor and segment which in turn permits relay 2838 to release and also releases the print magnet 2828, thus removing ground from the conductors 2833 and 2834. As a result, the call advancing sender advances further and applies ground to one of the printing conductors in accordance with the next symbol to be printed. As shown in Fig. 32, the next symbol to be printed is another asterisk so that the above-described cycle of operations is repeated. Upon the completion of the printing of the second asterisk the call identifying sender advances and applies ground to one of the printing conductors in accordance with the first numeral of the calling office code to be printed by the call tracing sender. As described above, it is assumed that this numeral will be a 9 as shown in Fig. 32.

The sender thereafter awaits signals on conductors 2833 and 2834 nevertheless maintaining the circuit of the magnet 2827 operated and ground upon one of the conductors extending to the segments of the distributor 2835. Under the assumed conditions wherein the 990 is entered into the calling office register the sender will apply ground to the No. 9 conductor extending to the No. 9 segment 2836 and thereafter maintain ground on these conductors until signals are received over the conductors 2833 and 2834.

The printing portion of the call identifying sender is thus prevented from further advancing until the call tracing sender described herein advances as will now be described.

Upon the operation of relay 2513 as described above, a circuit is prepared for the operation of the print magnet 2828 which circuit extends from battery through the winding of the print magnet 2828 through the upper outer operated contacts of relay 2513 to the continuous segment 2837 and distributor 2835. Then as brush arm 2832 is rotated over segment No. 9 the brush arm joins said segment No. 9 designated 2836 and segment 2837 and completes a circuit for the operation of the print magnet 2828 since under the assumed conditions the sender has applied ground to the No. 9 segment 2836.

The operation of the print magnet 2828 causes the platen to press the ticket against the type wheel with the result that the numeral 9 will be printed upon the ticket since the type wheel has the No. 9 in the printing position when the brush arm 2832 passes over segment No. 9, 2836. In addition, the operation of the print magnet 2828 causes its armature to engage a centering or star wheel mounted upon the same shaft as the type wheel and brush arm 2832 with the result that the numeral 9 on the type wheel is accurately positioned when the platen causes the card or ticket to engage the type wheel. Thereafter, so long as the print magnet 2828 is operated the brush arm 2832 and the type wheel, mounted on the same shaft, are maintained in their No. 9 position.

The operation of the print magnet 2828 in addition completes a circuit for the operation of relay 2522 which circuit extends from battery through the winding of relay 2522, the third set of operated contacts from the bottom of relay 2513 to ground through the upper outer break contacts of relay 2838 and the operated contacts of the print magnet 2828.

The operation of the print magnet 2828 also applies ground to conductor 2833 extending to the call identifying sender circuit. However, since ground is not applied to conductor 2834 at this time the call identifying sender circuit does not advance at this time.

The operation of relay 2513 as described above transfers the operating circuit of relay 2420 from the above-described circuit extending to ground through the right-hand outer break contacts of relay 2412 to a circuit extending to ground through the break contacts of relay 2817 which circuit now extends from battery through the winding of relay 2420, the center set of left-hand break contacts of relay 2427, the lower inner operated contacts of relay 2513 to ground through the lower break contacts of relay 2817.

The operation of relay 2513 also applies ground through its second set of operated contacts from the top to the right-hand terminal of condenser 2811 and the lower terminal of resistor 2816 of the pulsing relay circuit comprising relays 2810, 2813 and 2814 with the result that these relays are again set into operation as described above. When relay 2813 is either in its right-hand position or operated thereto, relay 2818 is operated and then when relay 2813 is operated to its left-hand position relay 2817 is operated. As described above, relays 2818 and 2817 are slow-release relays and maintain their contacts closed during the generation of pulses by the pulsing relays. The operation of relay 2817 extends the above-described operating circuit of relay 2420 to the pulsing contacts of relay 2812 instead of to ground through the lower break contacts of relay 2817. Consequently, the next time relay 2812 is operated to its right-hand position and then later to its left-hand position, a pulse is transmitted to the winding of relay 2420 which allows relay 2420 to release and then reoperate and repeat a pulse over conductors 2431.

The transmission of a pulse by relay 2420 over conductors 2431 also causes a pulse to be repeated through the lower break contacts of relay 2420. During the time relay 2420 is released a circuit extends through the lower break contacts of relay 2420 for the operation of relay 2419 from battery through the winding of relay 2419, the lower break contacts of relay 2420 to ground through the right-hand outer operated contacts of relay 2412. In addition, an additional circuit extends from ground through the right-hand outer operated contacts of relay 2412, the lower break contacts of relay 2420 and then through the right-hand inner break contacts of relay 2427 and the third set of operated contacts from the top of relay 2513 to battery through the winding of relay 2518. Another circuit also extends through the fourth set of operated contacts from the top of relay 2513 to battery through the winding of relay 2824 and the stepping magnet 2820.

Relays 2419 and 2518 are slow-release relays and maintain their contacts closed during pulses representing a digit or numeral. Relay 2824 and stepping magnet 2820, however, follow the pulses transmitted by the lower contact of relay 2420 and the stepping magnet 2820 causes the brush arms 2822 and 2823 to be advanced one step for each pulse transmitted by the pulsing relay 2420.

Thus pulsing relay 2812 transmits pulses through the repeating relay 2420 to conductors 2431 and these pulses cause relays 2419 and 2518 to be operated and the brush arms 2822 and 2823 to be advanced one step for each pulse.

Under the assumed conditions upon the transmission of the ninth pulse, brush arm 2823 will step on its No. 9 terminal and upon the termination of this ninth pulse relay 2824 releases and completes a circuit for the operation of relay 2819, which circuit extends from battery through the winding of relay 2819, the upper break contacts of relay 2824 through the inner upper operated contacts of relay 2513, brush arm 2823 and the No. 9 terminal of the associated bank contacts to ground in the call identifying sender through contacts of connector relay 2910. Relay 2819 in operating connects ground from the lower break contacts of relay 2521 to the operating circuit of relay 2420 and thus prevents this relay from repeating any further pulses. Thereafter, relay 2420 maintains the circuit over line conductors 2431 closed and its lower break contact open. As a result, relay 2419 releases as does relay 2518 after the release time interval determined by these relays. Relay 2419 reconnects the winding of relay 2434 across the tip and ring conductors 2431.

Relay 2819 in operating completes a circuit for maintaining itself operated which circuit now extends from battery through its winding and its lower inner operated contacts, the lower operated contacts of the off-normal contacts 2826 to ground through the second set of operated contacts from the bottom of relay 2513 and the lower operated contacts of relay 2522. A second locking circuit for maintaining relay 2819 operated is also completed from battery through the winding of relay 2819, the lower inner operated contacts of relay 2819 to ground through the lower operated contacts of relay 2817.

The operation of relay 2819 applies ground to the conductor 2834 extending to the call identifying sender through the connector relay 2910 in a circuit from ground through the second operated contacts from the top of relay 2819, the lower outer operated contacts of relay 2513, the upper operated contacts of relay 2522 and the upper break contacts of relays 2514, 2521, and 2515 to conductor 2834 extending from contacts of relay 2910 to the call identifying sender. The call identifying sender will thereupon advance and remove ground from the No. 9 terminal of the distributor 2835, thus interrupting the circuit of the print magnet 2828 which magnet in turn releases and removes ground from conductor 2833. The release of the print magnet 2828 also causes relay 2522 to release. The release of relay 2522 removes ground from lead 2834 which in turn causes the call identifying sender to advance and ground another print lead as will be described hereinafter.

Meantime, the operation of relay 2819 completes the above-described circuit through the upper winding of relay 2610 and also completes a circuit through the lower winding of relay 2610 from battery through the lower winding of relay 2610, the upper outer operated contacts of relay 2819 to ground through the second set of operated contacts from the bottom of relay 2513 and the lower operated contacts of relay 2522. Relay 2819 in operating also completes the above-described circuit for operating the stepping magnet 2510 which magnet in turn interrupts the circuit through the upper winding of relay 2610 and permits relay 2610 to operate due to current flowing through its lower winding. Relay 2610 in operating interrupts the above-described circuit for operating relay 2513 which relay then releases.

The operation of relay 2819 together with the release of relay 2518 complete a circuit for the operation of the release magnet 2821 which circuit extends from battery through the winding of release magnet 2821, the upper operated contacts and the off-normal contacts 2826 of the stepping switch, the lower operated contacts of relay 2819, the break contacts of relay 2518 to ground through the second set of break contacts from the bottom of relay 2513. The operation of the release magnet allows the brush arms 2822 and 2823 to be restored to their original position and in addition causes the off-normal contacts 2826 to be opened with the result that the release magnet 2821 is interrupting and one of the locking circuits of relay 2819 is also interrupting.

The release of relay 2513 also interrupts the operating circuit for the pulsing relays 2810, 2812 and 2813, thus allowing these relays to remain in the position in which they were last operated. As a result relays 2818 and 2817 or 2818 release and interrupt the second above when it described locking circuit for relay 2819. Consequently, relay 2819 releases and interrupts the above-described circuit for operating relay 2610 which relay thereupon releases. The release of relay 2513 also interrupts the above-described circuit to the pulsing windings of relays 2518, 2824 and the stepping magnet 2820.

The release of relay 2819 as described above also interrupts the operating circuit of stepping magnet 2510 which magnet releases and advances brush arms including 2519 and 2520 of the stepping switch to their No. 6 position. The call identifying sender in advancing as described above applies ground to one of the segments of the distributor 2853 for causing the printing of the next digit under control of the second digit stored in the calling office register B.

The application of ground to conductor 2834 prepares the circuits for printing and pulsing out under control of the second digit entered into the calling office register. However, this digit is not immediately printed nor are the corresponding pulses immediately transmitted because relay 2513 is now released and the advance of brush arm 2519 from its No. 5 position to its No. 6 position and the release of relay 2610 again completes a circuit for the operation of relay 2521 which relay in operating controls the circuits as described above and causes an interdigital pause to be transmitted which pause is timed by the time required by the pulsing relays 2810 through 2812 and 2813 to generate six pulses in the manner described above. At the end of this time, brush arm 2519 is advanced to the No. 7 position in the manner similar to that described above when it is advanced from the No. 4 to the No. 5 position. When brush arm 2519 advances to its No. 7 position, the above-described circuits are again completed for the operation of relay 2513 which relay causes the printing of the next digit in the manner described above and also causes pulses to be transmitted by relay 2420 over the tip and ring conductors 2431 in the same manner as described above.

Under the assumed conditions, nine pulses will be again transmitted over these conductors and the numeral 9 printed on the card or ticket of the recording medium employed by the printing mechanism. At the end of this time, the brush arm 2519 will be advanced to its No. 8 position and the circuits in the sender are also advanced in the manner described above so that ground will again be applied to the same or another distributor segment. In this case, however, relay 2523 is operated instead of relays 2521 and 2513. As a result, the zero assumed in the exemplary embodiment described herein is printed but no corresponding pulses are transmitted.

Of course, if it is desired to transmit the additional pulses the connections to terminal 8 of the stepping switch shown in Fig. 25 will be changed so that relay 2521 operates to time an interdigital interval after which relay 2513 operates with the result that the same zero digit will be printing and ten pulses representing this digit will be transmitted.

Alternatively, if it is desired to only transmit pulses representing one digit, then the connections to terminal 7 of the first bank of the stepping switch shown in Fig. 25 will be altered to cause the operation of relay 2523 instead of relay 2513 when brush arm 2519 is in its No. 7 position. The number of digits required to be transmitted at this time is determined by the switching equipment at the distant central office, i.e., the office of the origin of the nuisance call.

It will be recalled that the first three series of pulses transmitted from the call identifying sender will be repeated by relay 2420 to the tip and ring conductors 2431 and cause the selectors 202, 203 and 204, respectively, to respond to these series of pulses and select an outgoing repeater shown in the lower portion of Fig. 27 which repeater terminates the trunk 210 extending to the central office X. The next two series of pulses representing the numerals 9—9 under the assumed conditions transmitted over the tip and ring conductors 2431 are repeated by the repeating relay 2711 to the trunk circuit 210. The trunk circuit 210 extends to office X and terminates in the first incoming selector 106 shown in Figs. 1 and 5. This trunk circuit may terminate in an incoming repeater or it may terminate in a first selector as shown in Fig. 5. If the trunk is longer than a specified length or resistance an incoming repeater will be interposed between the termination of the trunk and the selector 106 but where the trunk circuit is of less length the trunk will terminate in an incoming selector shown in Fig. 5. Both types of trunk terminations are known and operate in the usual manner in cooperating with the various circuits described herein of an exemplary embodiment of this invention.

As described hereinbefore the first numeral 9 transmitted by relay 2420 actuates the first incoming selector 106 and causes it to select a group of terminals 131 extending to a second selector 132. The second numeral 9 transmitted by relay 2420 causes the second selector to advance to its No. 9 level and select an idle trunk circuit 129 which is represented in Fig. 1 and shown in greater detail in Fig. 9. As pointed out herein it requires only two selectors to select an idle trunk circuit 129. If at office X the switching arrangement had been arranged to require only one digit then only one digit of the called office code recorded in the call tracing sender at office Y would have been transmitted. Alternatively, had the switching arrangement at office X required three digits to select the trunk 129 in accordance with the present invention then three digits of the calling office code entered into the call tracing sender at office Y would be transmitted. However, under the assumed conditions the two nines are transmitted and cause the trunk circuit 129 shown in detail in Fig. 9 to be seized. As a result, relay 924 is operated over the tip and ring conductors extending through the second selector 132, terminals 131 of the first selector 106 and the tip and ring conductors of trunk 210 and through the contacts of repeating relay 2711 to battery and ground. Relay 924 in operating completes an obvious circuit for the operation of the slow-release relay 925 which relay operates and applies ground to the sleeve terminal of the trunk circuit and thus maintains the incoming selectors and the repeater which may be connected thereto in an operated condition. Relay 925 in addition prepares additional pulsing circuits as will be described hereinafter.

*Selecting and seizing trunk employed in establishing nuisance call at the originating office and holding connection between originating line and said trunk circuit*

Returning now to the operation of the equipment of office Y as shown in detail in Figs. 16 through 29, inclusive, the circuit for the operation of relay 2523, which operates when the stepping switch shown in Fig. 25 is advanced to its No. 8 position as described above, extends from battery through the winding of relay 2523 through the break contacts of the fourth set of contacts from the top of relay 2830, the No. 8 terminal of the first bank and brush arm 2519 of the stepping switch shown in Fig. 25, the upper break contacts of relay 2610, the break contacts of the third set of contacts from the right of relay 2428 to ground through the upper outer operated contacts of relay 2614.

Relay 2523 in operating connects the winding of the print magnet 2828 to the solid distributor segment 2837 in a circuit extending to battery through the winding of the print magnet 2828, the upper outer operated contacts of relay 2523 to the solid segment 2837 with the distributor arrangement 2835. At this time as pointed out above, the call identifying sender has placed ground on the zero segment inasmuch as it is assumed that the third digit of the calling office code is a zero. Consequently, when the brush arm 2832 passes over the zero segment a circuit is completed for the operation of the print magnet 2828 which magnet causes a zero to be printed on the tape and stops the operation of the type wheel and brush arm 2832.

In addition to causing the printing of the zero the operation of the print magnet connects ground to the conductor 2833 extending to the call identifying sender through the connecting relay 2910 and also completes a circuit for the operation of relay 2518 which circuit extends from battery through the winding of relay 2518, the second set of operated contacts from the top of relay 2523 to ground through upper break contacts of relay 2838 and the operated contacts of the print magnet 2828. Relay 2518 in operating completes a circuit for the operation of relay 2522 which circuit extends from battery through the winding of relay 2522, the second set of operated contacts from the bottom of relay 2523, the operated contacts of relay 2518 to ground through the break contacts of the second set of contacts from the bottom of relay 2513.

The operation of relay 2522 applies ground to the conductor 2834 extending to the call identifying sender which circuit extends from ground through the lowermost operated contacts of relay 2523, the upper operated contacts of relay 2522 and the upper break contacts of relays 2514, 2521, and 2515 to conductor 2834.

The application of ground to the conductors 2833 and 2834 indicates that the zero has been properly printed by the printing equipment and in turn causes the call identifying sender to advance and remove ground from the zero lead connected to the zero segment of the distributor 2535. As a result, the print magnet 2828 releases and removes ground from the conductor 2833. The release of the print magnet 2828 also interrupts the above-described operating circuit of relay 2518 and this relay in turn interrupts the operating circuit of relay 2522 which relay releases and removes ground from the conductor 2834 extending to the call identifying sender.

As a result, the identifying sender advances and applies ground to another segment of the distributor 2835 through the connecting relay 2910. At this time the call identifying sender has caused the printing equipment in the call tracing sender to print all of the numerals in the calling office code which have been assumed to be 990 as shown in Fig. 32. In addition, the call tracing sender in addition to printing these numerals has transmitted pulses representing the desired number of these numerals which in the exemplary embodiment described herein is two, namely, 99. The call identifying sender having completed this portion of the printing of the calling stations identification connects ground to the dash conductor and segment in order to print this symbol to separate the numerals in the office code from the numerals identifying the particular calling subscriber's station. When the call identifying sender is employed to trace a call as described herein, the second set of numerals entered in the calling subscribers' registers in the call identifying senders actually identifies the number of the trunk in the trunk group.

When the call identifying sender applies ground to the dash conductor and segment of distributor 2835 and thereafter when the brush arm 2832 passes over this segment, the above-described circuit for operating the print magnet 2828 is completed causing this magnet to operate and print a dash following the 990 previously printed by the printer. In addition, the application of ground to the conductor extending to the dash segment also completes a circuit for operating relay 2825. The operation of relay 2825 also applies ground to the conductor 2833 extending to the call identifying sender. The operation of the print magnet 2828 as described above also applies ground to conductor 2833 extending to the call identifying sender through the operated contacts of the connecting relay 2910.

The operation of relay 2825 also completes a circuit for the operation of relay 2830 which circuit extends from ground supplied by the call identifying sender over the dash conductor through the lower inner operated contacts of relay 2825, the lower inner break contacts of relay 2830, through the winding of relay 2830, the third set of operated contacts from tthe top of relay 2523 to battery. Relay 2830 in operating locks operated in a circuit extending from battery through the third set of operated contacts from the top of relay 2523, the winding of relay 2830 and its lower inner operated contacts to ground through the break contacts of the second set of contacts from the bottom of relay 2819.

Relay 2830 in operating completes a holding circuit for maintaining relay 2523 operated which circuit extends from battery through the winding of relay 2523 to ground through thet second set of operated contacts from the top of relay 2830.

With print magnet 2828 operated and relay 2830 operated a circuit is completed for the operation of the stepping magnet 2820 and relay 2824 which circuit extends from battery through the windings of this relay and magnet in parallel and then through the upper outer operated contacts of relays 2830 and 2825 and through the lower inner operated contacts of relay 2523 to ground through break contacts of relay 2838 and the operated contacts of the print magnet 2828. The operation of the stepping magnet 2820 causes brush arms 2822 and 2823 to advance to their No. 1 position.

The operation of the print magnet 2828 also completes the above-described circuit for the operation of relay 2518. Relay 2518 in turn completes the above-described circuit for operating relay 2522 which relay in turn applies ground to the conductor 2834 extending to the call identifying sender shown in Figs. 21 and 22. As a result, this sender circuit advances and removes ground from the dash lead which permits the print magnet 2828 and relay 2825 to release. The release of the print magnet interrupts the operating circuit of relay 2518 and this relay in turn interrupts the operating circuit of relay 2522. The release of relay 2522 and the release of the print magnet 2828 and the release of relay 2825 remove ground from the leads 2833 and 2834 extending to the call identifying sender and cause this sender circuit to advance.

The release of the print magnet 2828 also interrupts the operating circuit of the stepping magnet 2820 and relay 2824. Upon release of relay 2824 a circuit is completed for the operation of relay 2819 which circuit extends from battery through the winding of relay 2819, the break contacts of relay 2824, the upper inner operated contacts of relay 2523, the upper break contacts of relay 2825, the brush arm 2822 and No. 1 terminal of its associated bank, the operated contacts of the fourth set of contacts from the top of relay 2830 through the No. 8 terminal of bank 1 and brush arm 2519, the upper break contacts of relay 2610, the break contacts of the third set of contacts from the right of relay 2428 to ground through the upper outer operated contacts of relay 2614.

Relay 2819 in operating locks operated under control of the off-normal contacts of the stepping switch shown in Fig. 28 in the circuit described hereinbefore. Relay 2819 in operating also completes circuits through both the upper and the lower windings of relay 2610 as described hereinbefore. Relay 2819 in operating also completes the circuit traced hereinbefore for operating magnet 2510. Magnet 2510 in operating interrupts the circuit through the upper winding of relay 2610 thus permitting this relay to operate due to current flowing through its lower winding. The operation of relay 2610 in turn interrupts the above-described operating circuit for relay 2819.

The operation of relay 2819 interrupts the operating circuit of relay 2830, thus permitting this relay to release and, in turn, the release of relay 2830 together with the operation of relay 2610 interrupt the operating and holding circuits described above for relay 2523, thus permitting relay 2523 to release. The above-described release of relay 2518 together with the operation of relay 2819 complete a circuit described above for operating the release magnet 2821 which in turn causes the stepping switch to restore to normal and open the off-normal contacts 2826 which in turn interrupt the operating circuit of the release magnet 2821 and also interrupt the locking circuit of relay 2819 which relay thereupon releases.

The release of relay 2819 in turn releases the stepping magnet 2510 of the stepping switch of Fig. 25 to advance the brush arms to their No. 9 position.

When the brush arm 2519 advances from its No. 8 to its No. 9 terminal, the above-described circuit for operating relay 2521 is again completed which relay causes the pulsing relays and the stepping switch controlling them to generate six pulses for an interdigital pause between the last digit of the calling office code transmitted over trunk 210 and the first digit of the trunk number to be transmitted next over this trunk. The interdigital pause is in this case lengthened by the time required to print the zero and the dash as described above. The pause, however, is required to insure that adequate time is allowed to find an idle trunk distributor circuit and to prepare the subsequent trunk distributor switches 130 and 131 shown in greater detail in Fig. 9 for following the subsequent pulses transmitted as will be described. At the end of the interdigital pause the switch arms 2519, 2520, etc. are again advanced from their No. 9 to their No. 10 position where relay 2513 is again operated. At this time the call identifying sender circuit has likewise advanced and has applied ground to one of the segments 1 through 0 of the distributor 2835 in accordance with the first digit identifying the trunk 110 over which the nuisance call arrived at office Y.

When the brush arm 2832 passes over this segment the print magnet 2828 is operated and stops the rotation of the brush arm 2832 of the type wheel and causes the corresponding numeral to be printed on the card or ticket. In addition, the pulse transmitting circuits transmit pulses under control of relays 2810, 2812 and 2813 in the manner described above over the tip and ring conductors 2431. The number of pulses transmitted is controlled by the particular numeral of the first digit identifying the trunk. (As shown in Fig. 32 the first numeral is 6.) After the required number of pulses have been transmitted, the brush arm 2823 will be advanced to the segment grounded by the sender and cause relay 2819 to operate in the manner described above and advance the circuit.

In so advancing, relay 2513 is released and the stepping switch advanced from its No. 10 to its No. 11 position. When brush arm 2519 is advanced to its No. 11 position and relay 2610 released, a circuit is completed for the operation of relay 2521 which relay operates and advances the circuits in the manner described above. Briefly, this relay in operating causes the pulse generating relays 2810, 2812 and 2813 to be set in operation and the switch shown in Fig. 28 advanced through six steps and then relay 2521 is released and the circuits advanced. In so advancing, the stepping switch of Fig. 25 advances from its No. 11 to its No. 12 position when relay 2513 is again operated. The operation of relay 2513 causes the second numeral identifying the trunk to be printed and the corresponding number of pulses transmitted over the tip and ring conductors 2431. At the end of this series of pulses the circuits are again advanced from the No. 12 to the No. 13 position where the relay 2521 operates and times the interdigital interval in the manner described above. The switch of Fig. 25 then advances to the No. 14 position and causes the third numeral of the identified trunk to be printed and the corresponding pulses transmitted over the tip and ring conductors 2431. At the end of this time the switch of Fig. 25 is advanced from the No. 14 to the No. 15 position where relay 2521 is again operated and times another interdigital interval. Thereafter, the switch of Fig. 25 is advanced from the No. 15 to the No. 16 position at which time the circuits cause the last numeral of the trunk identifying number to be printed by the printing mechanism in the call tracing sender and the corresponding number of pulses transmitted over the tip and ring conductors 2431. After these pulses have all been transmitted, relay 2819 is operated in the manner described above and in turn causes relay 2513 to release. The operation and release of relay 2819 in the manner described above cause the stepping switch of Fig. 25 to advance to its No. 17 position where a circuit is completed for the operation of relay 2516 from battery through the winding of relay 2516 through the No. 17 bank terminal and brush arm 2519, the upper break contacts of relay 2610, the break contacts of the third set of contacts from the right of relay 2428 to ground through the upper outer operated contacts of relay 2614. The operation of relay 2516 causes the circuits to advance and function as will be described hereinafter.

Meantime, however, the pulses transmitted over the conductors 2431 representing the numerals of the number identifying the trunk 210 are transmitted through the selectors 202, 203 and 204 to the outgoing repeater shown in the lower portion of Fig. 27. This repeater repeats the pulses over trunk 210 which trunk extends to the X central office and terminates in an incoming selector 106. As described above, this trunk circuit is extended through the first and second incoming selectors in response to the first two series of pulses representing the first two numerals of the calling office identification code as recorded in the call identifying sender at office Y which is described above and assumed to be 99. The repeating relay 924 in the trunk distributor circuit 129 shown in Figs. 1 and 9 repeats the pulses of the four series of pulses representing the four numerals identifying trunk 110.

As assumed herein each of the trunks is identified by four numerals but any suitable number of numerals may be employed to identify the trunk. The call tracing sender may send any corresponding number or series of pulses and the equipment at the distant office may likewise be arranged to respond to any number or series of pulses as may be required or desired in any particular case. As shown in Fig. 9 two double-acting Strowger or step-by-step switches are provided. The first switch has banks of three terminals and corresponding brushes 941 while the final switch has a single terminal bank and corresponding brush 942. These switches are arranged first to step up under control of the pulses of one series of pulses and then step around under control of a succeeding series of pulses.

Thus, with relays 924 and 925 operated upon the seizure of the trunk 129 as described above, the circuits of the first double-acting switch are prepared to follow the next series of pulses which pulses as described above represent the first numeral identifying trunk 110. Consequently, upon the release of relay 924 in response to the first pulse of this series, a circuit will be completed for the operation of the slow-release relay 944 and the vertical stepping magnet 926. The operation of the vertical stepping magnet 926 at this time lifts the brush arms 941 up to the level of the first row of contacts in the banks associated with this switch and actuates the vertical off-normal contacts 929. The circuit for operating the relay 944 and the vertical magnet 926 extends from battery through the winding of the vertical magnet 926, the winding of relay 944, the break contacts of the vertical off-normal contacts 929, the upper outer break contacts of relay 943, and the upper outer operated contacts of relay 925 to ground through the break contacts of relay 924. At the termination of this pulse, the vertical magnet releases but the slow-release relays 925 and 944 remain operated during these series of pulses. The operation of the vertical off-normal contacts 929 transfers the operating circuit for relay 944 and the vertical magnet 926 so that after the first step the circuit for operating relay 944 and magnet 926 extends from ground through the break contacts of relay 924, the upper outer operated contacts of relay 925, the upper outer break contacts of relay 943, the middle set of operated contacts of the vertical off-normal contacts 929, the operated contacts of relay 944 to battery through the windings of relay 944 and the vertical magnet 926. Thereafter, the vertical magnet 926 steps brushes 941 up one step in response to each succeeding pulse of the series representing the first digit of the numeral identifying trunk 110. During the succeeding interdigital interval during which relay 924 is maintained operated, relay 925 is likewise maintained operated but relay 944 releases. Consequently, upon the reception of the first pulse of the second series of pulses, a circuit will be completed for the operation of the rotary stepping magnet 928 and the slow-release relay 927 which circuit extends from battery through the winding of the rotary magnet 928 and relay 927, the break contacts of the rotary off-normal contacts 930, the lower break contacts of relay 944, the upper operated contacts of the vertical off-normal contacts 929, the upper outer break contacts of relay 943 and upper outer operated contacts of relay 925 to ground through the break contacts of relay 924. The operation of the rotary magnet 928 rotates the brush arms 941 onto the first set of terminals of the particular level which they were in front of and actuates the rotary off-normal contacts 930. The operation of the rotary off-normal contacts 930 transfers the operating circuit of the rotary magnet 928 and the slow-release relay 927 to the circuit path in series with the upper operated contacts of relay 927. Thereafter, the rotary magnet steps for each pulse of the second series and relays 925 and 927 remain operated. Upon the termination of the second series of pulses and during the succeeding interdigital interval, relay 927 releases and extends pulse circuit through the vertical off-normal contacts 933, the slow-release relay 931 and the vertical stepping magnet 932 of the second trunk distributor switch. Thereafter, this switch responds to succeeding two series of pulses in a manner similar to that described above with respect to the first two series of pulses.

After all four series of pulses identifying trunk 110 have been received, the brush arm 942 engages the sleeve circuit at office X of the trunk 110 extending to office Y over which the nuisance call was extended from office X to office Y.

At the end of a short interval of time after the final pulse representing the final digit, relay 934 releases and completes a circuit for the operation of relay 937 which circuit extends from battery through the winding of relay 937, the lower break contacts of relay 934, the upper operated contacts of the rotary off-normal contacts 936 to ground. Relay 937 in operating extends a circuit path from the brush 942 and thus from the sleeve of the outgoing repeater 105 connected to the outgoing trunk 110 for the operation of relay 945. The circuit for the operation of relay 945 extends from battery to the winding of relay 945, the inner lower break contacts of relay 943, the lower brush 941, contacts of relay 937, brush 942, sleeve conductor of the outgoing trunk circuit to ground through the lower operated contacts of relay 1310.

Relay 945 in operating interconnects the sleeve conductor extending to the outgoing repeater 105 shown in Figs. 1 and 13 and the sleeve circuit of the first, second, and third selectors 102, 103, and 104 and line finder 101. Previously, relay 925 applied ground to the sleeve conductor extending to the selectors 106 and 132 as described above for maintaining these selectors in their energized or actuated position wherein they extend the conductors from the incoming trunk 210 to the trunk circuit 129 from Figs. 1 and 9. The interconnection of these sleeve circuits of the outgoing repeater to the ground connected to the sleeve by relay 925 through the coil 946, left-hand operated contacts of relay 945 will hold all of these selectors 104, 103 and 102 as well as the line finder 101 up on the selected terminals even if the subscriber at station 100 who initiated the nuisance call attempts to disconnect. In other words, these connections are maintained established until sufficient time has been provided to identify the subscriber's station originating the nuisance call as described herein.

The operation of relay 945 connects ground to the marking conductor 950 extending to a contact of the stepping switch shown in Fig. 10 assigned to the trunk distributor circuit 129 shown in Figs. 1 and 9.

The operation of relay 945 in addition connects ground to the start lead 918 and a circuit extending from ground through the second set of break contacts from the top of relay 943, the lower inner operated contacts of relay 925 and the middle set of right-hand operated contacts of relay 945. The circuit of this ground lead also extends through the winding of the stepping magnet 1011 which circuit may be traced from lead 918, the left-hand break contacts of relay 1014, the right-hand inner break contacts of relay 1013, the middle set of break contacts of relay 1024, self-interrupting contacts of magnet 1011 to battery through the winding of the stepping magnet 1011.

The stepping switch shown in Fig. 10 is of the type which may be actuated by means of its own self-interrupting contacts. The operation of the magnet advances a pawl on a ratchet and in addition interrupts its own operating circuit after the pawl has advanced one tooth on the ratchet. Consequently, the magnet will then release and advance the brush arms 1015, 1017, 1023, 1029, 1030 and 1035 one step. In addition, in releasing the magnet 1011 again completes its operating circuit and reoperates and the above cycle of operation is repeated. In this manner the brush arms are advanced step by step over their respective terminals. When brush arm 1015 engages the terminal to which conductor 950 is connected, a circuit will be completed from battery through the winding of relay 1014, brush arm 1015, conductor 950 and the right-hand outer operated contacts of relay 945, the lower outer break contacts of relay 943 and the lower outer operated contacts of relay 925 to ground. The operation of relay 1014 at this time interrupts the above-described path for actuating the stepping magnet 1011 with the result that the magnet will not reoperate. As a result, brush arms of the switch controlled by this magnet remain on the terminals assigned to the trunk distributing circuit 129 shown in Figs. 1 and 9.

In addition, the operation of relay 1014 completes a circuit for the operation of relay 1013, assuming that the associated call tracing sender at office X is also idle so that relay 1210 is released. The circuit for so operating relay 1013 extends from battery through the winding of relay 1013, the right-hand operated contacts of relay 1014 to ground through the inner break contacts of relay 1210. If the associated sender has not returned to normal at this time then the circuits remain in their previous condition until this relay releases and permits relay 1013 to operate.

Relay 1013 in operating completes circuits for the operation of relays 1024 and 943. The circuit for the operation of relay 943 extends from battery through the right-hand inner operated contacts of relay 945, the winding of relay 943, conductor 951, the bank terminal and brush arm 1017 to ground through the left-hand operated contacts of relay 1013.

The operation of relay 943 first completes a locking circuit for maintaining itself operated independently of relay 945 from battery through the third set of operated contacts from the top of relay 943 to the winding of relay 943 and then over the above-described circuit to ground through the left-hand operated contacts of relay 1013.

In addition, relay 943 in operating interrupts the above-described circuit for operating relay 945 and thus permits this relay to release. The operation of relay 943 together with the release of relay 945 still maintains the connection between the sleeve circuits of the switches 106 and 132 and switches 104, 103 and 102 and line finder 101. The circuit for applying ground to the sleeve circuit of the repeater 105 which ground maintains the switches 104, 103, 102 and line finder 101 operated now extends from ground through the second set of contacts from the top of relay 925, the left-hand break contacts of relay 945, the lower inner operated contacts of relay 943 and then through the lower brush arm 941, the operated contacts of relay 934, brush arm 942 to the sleeve terminal of the outgoing repeater 105 shown in Figs. 1 and 13.

The operation of relay 943 removes ground from the start conductor 918 and marking conductor 950, thus permitting another trunk distributing circuit or call tracing subscriber's line circuit to seize another call tracing sender at office X should a demand for one of these circuits exist. Removal of the marking ground from conductor 950 interrupts the above-described circuit for operating relay 1014 which relay releases and interrupts the operating circuit of relay 1013. Relay 1013 is a slow-release relay and does not immediately release. Instead, it maintains its contacts closed until relay 1027 operates as described hereinafter for maintaining relays 1024 and 943 operated.

The operation of relay 943 also completes a circuit for maintaining relay 925 operated which circuit extends from battery through the winding of relay 925, the lower operated contacts of relay 943 to ground through the lower operated contacts of relay 925, thus maintaining ground connected to the sleeve terminals as described above.

The operation of relay 943 also transfers the incoming line conductors of trunk 210 from the windings of relay 924 to the windings of relay 1037. The tip and ring conductors from this trunk now extend through the upper inner two sets of operated contacts of relay 943 and through the respective bank terminals and brushes 1030 and 1035 and then through the outer break contacts of relay 1036 to battery and ground through the windings of relay 1037. As a result, relay 924 releases and relay 1037 operates. The release of relay 924 at this time performs no useful function. The operation of relay 1037, however, completes an obvious circuit for operating relay 1027. Relay 1027 in operating connects ground through its right-hand outer operated contacts to the brush arm 1017 and thus maintains relay 943 operated. The operation of relay 1027 also completes a circuit for maintaining relay 1024 operated which relay was operated in response to the operation of relay 1013 as described herein.

The operation of relay 1027 also completes a circuit for the operation of relay 1028 which circuit extends from battery through the left-hand inner operated contacts of relay 1027 through the winding of relay 1028, the left-hand inner break contacts of relay 1028, brush arm 1029 and related bank terminal to ground on the combined sleeve circuits through the upper inner operated contacts of relay 925 through the induction coil 946. Relay 1028 in operating completes a circuit for maintaining itself operated from ground through its left-hand inner operated contacts and winding to battery through the left-hand inner operated contacts of relay 1027. The operation of relays 1027 and 1024 complete a circuit for the operation of relay 1038 from battery through the winding of relay 1038, the center set of operated contacts of relay 1027, the lower inner break contacts of relay 1113, the lower outer break contacts of relay 1114, the lower outer break contacts of relay 1215 to ground through the right-hand outer operated contacts of relay 1024. Relay 1038 in operating completes an obvious circuit for the operation of relay 1039.

Returning now to the operation of relay 1024 as described above, the operation of relay 1013 completes a circuit for the operation of relay 1024 from battery through the winding of relay 1024, the outer right-hand operated contacts of relay 1013 to ground. Relay 1024 completes a circuit for maintaining itself operated through its outer left-hand operated contacts and the break contacts of relay 1018 first to ground through the left-hand operated contacts of relay 1013 and then later to ground through the right-hand outer operated contacts of relay 1027 as described above. In addition, the operation of relay 1027 completes an additional holding circuit for relay 1024 described above. The operation of relay 1024 also interrupts the operating circuit of the stepping magnet 1101 and connects the start lead through to a succeeding finder associated with a succeeding call tracing sender at office X. Consequently, upon the release of both relays 1014 and 1013 the above-described circuit of stepping magnet 1011 is not completed. Instead, any additional ground applied to the start lead 918 is connected to a succeeding finder and call identifying sender. In addition, the operation of relay 1024 at this time completes a circuit for the operation of relay 1019 but the operation of relay 1019 performs no useful function.

The operation of relay 1024 completes a circuit for operating relay 1211 from battery through the winding of relay 1211, the lower inner break contacts of relays 1115 and 1116 to ground through the outer operated contacts of relay 1024. Relay 1211 in operating connects resistor 1212 between the tip and ring conductors 1216 and 1217 extending to the finder terminal of a finder associated with a call identifying sender. This resistor is connected between these conductors to maintain the connection between a call identifying sender and the call tracing sender through the finder once the connection is established.

The operation of relay 1024 also applies ground to the start lead extending to the finder circuit for establishing connections between the call identifying sender and the call tracing sender. Thus, a circuit is completed for the operation of relay 810 which circuit extends from battery through the winding of relay 810 through the upper break contacts of relay 1213 to ground through the right-hand outer operated contacts of relay 1024.

With the selector sequence switch of Fig. 11 in its normal or No. 44 position as shown in Fig. 11, the operation of both relays 1028 and 1024 completes a circuit for the operation of the stepping magnet 1110 which circuit extends from battery through the winding and stepping magnet 1110 of the stepping switch of Fig. 11, its self-interrupting or break contacts, the left-hand outer operated contacts of relay 1028, bank terminal No. 44 and brush 1112 to ground through the outer right-hand operated contacts of relay 1024. Magnet 1110 in operating interrupts its operating circuit by means of its break contacts and in addition advances the pawl so that upon the release of the magnet the brush arms are advanced to the No. 1 position, thus interrupting the above-described operating circuit of stepping magnet 1110.

In the No. 1 position a circuit is completed for the operation of relay 1214 which circuit extends from battery through the winding of relay 1214, the No. 1 bank terminal and brush arm 1117 to ground through the right-hand operated contacts of relay 1024. As seen from the bank wiring associated with brush arm 1117 the above-described circuit for the operation of relay 1214 is completed through the first eighteen positions of the stepping switch of Fig. 11.

The operation of relay 1214 together with the operation of relay 1028 completes a circuit for the operation of the stepping magnet 1110 which circuit extends from battery through the winding of the stepping magnet 1110, its break contacts, the second set of contacts from the right of relay 1028 to ground through the upper outer operated contacts of relay 1214. Magnet 1110 in operating interrupts its operating circuit which thereupon releases and advances the brush arms 1119, 1120, 1117, 1112, 1124 and 1125 one step. In position No. 2 the above-described operating circuit for relay 1110 is again complete and thereupon the above cycle of operations is repeated. This cycle of operations is repeated again and causes the brush arms to avance step by step over the first seventeen bank terminals into position No. 18 and thus in contact with the bank terminals No. 18. When brush arm 1117 avances from position No. 18 to position No. 19 the above-described operating circuit for relay 1214 is interrupted, thus permitting this relay to release. Meantime, in response to the operation of relay 810 as described above, the finder equipment and circuits between the call tracing sender and the call identifying sender function to establish a connection between an idle call identifying sender and the call tracing sender. Upon the establishment of such a connection relay 1213 operates. Relay 1213 in operating interrupts the operating circuit of relay 810 which relay releases and thus releases the finder equipment for use in establishing other calls or in tracing other calls in the manner described herein. The particular finder switch which established the connection, however, remains busy and maintains the connection between the two sender circuits.

Assume first that the above-described connections between the call tracing sender and the call identifying sender are established and relay 1213 operated before the stepping switch of Fig. 11 reaches position 19. The operation of relay 1213 together with the release of relay 1214 in position 19 completes a circuit for advancing the stepping switch of Fig. 11 from position 19 to position 20. At this time, a circuit extends from battery through the winding of the stepping magnet 1110 and its break contacts, the lower outer operated contacts of relay 1213, the right-hand outer operated contacts of relay 1027, the second set of unoperated contacts of relay 1214, terminal No. 19 and brush arm 1117 to ground through the right-hand outer operated contacts of relay 1024. Relay 1210 also operates due to current flowing through its upper winding at this time. The operation of the stepping magnet 1110 at this time interrupts the circuit through its own winding by its own break contacts, thus permitting this magnet to release and advance the brush arms 1119, 1120, 1117, 1112, 1124 and 1125 from position 19 to position 20. The above-described circuit for operating the stepping magnet 1110 and relay 1210 is interrupted in position 20. Consequently, relay 1210 releases and magnet 1110 operates in other circuits as will be described.

Assume now that the stepping switch of Fig. 11 reaches position 19 before an idle call identifying sender is interconnected with the call tracing sender. Consequently, relay 1213 is not operated when the stepping switch of Fig. 11 reaches position 19. Under these circumstances, a circuit is completed upon the release of relay 1214 when the stepping switch of Fig. 11 reaches position 19 for the operation of relay 1419 which circuit extends from battery through the winding of relay 1419, the break contacts of relay 1424, the lower upper break contacts of relay 1210, the lower inner break contacts of relay 1213, the break contacts of relay 1214, terminal No. 19 and brush arm 1117 to ground through the right-hand outer operated contacts of relay 1024.

Relay 1419 in operating completes circuits through the upper and lower windings of relay 1210 as described hereinbefore and also completes a circuit for the operation of the stepping magnet 1110. A circuit is also completed through the winding of relay 1224 and diode 1230 at this time. However, relay 1224 does not operate because diode 1230 opposes the flow of current through it in this direction so that relay 1224 does not operate. The operation of stepping magnet 1110 interrupts the circuit through the upper winding of relay 1210, thus permitting this relay to operate due to the current flowing through its lower winding. Relay 1210 in operating interrupts the operating circuit of relay 1419, thus permitting this relay to release and in turn release the stepping magnet 1110 and relay 1210. The release of the stepping magnet 1110 advances the stepping switch of Fig. 11 from position 19 to position 20.

With brush arm 1117 in positions 20, 21 and 22 or with brush arm 1112 in position 23 a circuit is completed for the operation of relay 1215 from battery through the windings of relay 1215, the respective bank terminals and brush arms 1117 or 1112 to ground through the right-hand outer operated contacts of relay 1024.

With relays 1028 and 1215 operated a circuit is completed for the operation of the stepping magnet 1110 which circuit extends from battery through the winding of the stepping magnet 1110, its own break contacts, the second set of operated contacts from the right of relay 1028 to ground through the upper outer operated contacts of relay 1215. Inasmuch as relay 1215 is maintained operated in positions 20, 21, 22 and 23 the stepping switch advances through these positions. In advancing from position 23 to position 24 the above-described circuit for operating relay 1215 is interrupted so the above-described circuit for the operation of the stepping magnet 1110 is also interrupted. However, a different operating circuit is established for the operation of the stepping magnet 1110 which circuit extends from battery through the winding of stepping magnet 1110 and its break contacts and then through the right-hand outer operated contacts of relay 1028, the No. 24 bank terminal from brush arm 1112 to ground through the right-hand outer operated contacts of relay 1024. As a result, the stepping switch advances from position No. 24 to position No. 25. With brush arm 1112 in the No. 25 position a circuit is completed for the operation of relay 1225 which circuit extends from battery through the winding of relay 1225 and the bank terminals Nos. 25 through 34 and brush arm 1112 of the stepping switch of Fig. 11 to ground through the right-hand outer operated contacts of relay 1024.

During the above-described advance of the brush arms from position No. 44 through positions Nos. 1 to 24 relay 1210 is maintained operated due to current flowing in circuits from battery through its upper winding and the break contact of stepping magnet 1110 and then to ground over the above-described circuits. Relay 1210 in remaining operated at this time holds its contacts open so that the circuits of the various relays 1115, 1121, 1114, 1113, 1116 and others are held open and these relays thus prevented from operating.

The advancing of the progress control switch of Fig. 11 to its No. 25 position together with the operation of relays 1213 and 1225 and the release of relay 1210 completes a circuit for the operation of relay 1115 which circuit extends from battery through the winding of relay 1115, the upper outer operated contacts of relay 1213, the No. 25 bank terminal and brush arm 1120, the upper outer break contacts of relay 1210, the second set of operated contacts from the right of relay 1028 to ground through the upper operated contacts of relay 1225. Relay 1115 in operation causes a 0 to be dialed into the call identifying sender in a manner similar to that described above at office Y when relay 2515 operated.

Briefly, the operation of relay 1115 connects ground to the right-hand terminal of condenser 1411 and the lower terminal of resistor 1416, thus cconditioning the pulse generating relay 1410, 1412 and 1413 for operation to generate dialing pulses. The circuit for thus conditioning these relays extends through the third set of operated contacts from the top of relay 1115. The first operation of relay 1413 to its right-hand position completes a circuit for the operation of relay 1418 from battery through the winding of relay 1418, the right-hand operated contacts of relay 1413 to ground through the lower break contacts of relay 1425. The succeeding operation of relay 1413 to its left-hand position completes a circuit for the operation of relay 1417 which circuit extends from battery through the winding of relay 1417, the upper operated ccontacts of relay 1418, the left-hand contacts and armature of relay 1413 to ground through the lower break contacts of relay 1425. The combined operation of relays 1415 and 1417 transfers the operating circuit of relay 1211 to the contacts of the pulse generating relay 1412. At this time the circuit of relay 1211 extends from battery through the winding of relay 1211, the lower inner operated contacts of relay 1115, the inner operated contacts of relay 1417, the upper inner break contacts of relay 1419 to ground through the operated contacts of relay 1412.

Thus, each time relay 1412 opens its contacts, relay 1211 also releases and opens its lower contacts and sends a pulse to the call identifying sender. Each time relay 1211 releases it also closes its upper contacts. The closure of the upper contacts of relay 1211 completes a circuit for the operation of the slow-release relay 1118, which circuit extends from battery through the winding of relay 1118, the second set of operated contacts from the top of relay 1115 to ground through the upper contacts of relay 1211. In addition, a circuit is also completed for the operation of the stepping magnet 1420 and relay 1424 which circuit extends from the battery through the winding of the magnet 1420 and also in parallel therewith through the winding of relay 1424 and then through the fourth set of operated contacts from the top of relay 1115 to ground through the upper contacts of relay 1211.

The operation of the stepping magnet 1420 at this time causes the brush arms 1422 and 1423 to be advanced to their No. 1 terminal or position.

The subsequent reclosing of the pulsing contacts of relay 1412 causes relay 1211 to reoperate and reclose a circuit to the sender between conductors 1216 and 1217. In addition, relay 1211 opens its upper contacts and allows the stepping magnet 1420 and relay 1424 to release. Relay 1118, however, does not release at this time because it is a slow-reslease relay and maintains its contacts closed during each series of pulses. Likewise, relays 1417 and 1418 maintain their contacts closed during each series of pulses even though their winding is only closed for a part of each pulse interval. The above-described operation is repeated then until ten pulses have been transmitted to the call identifying sender over conductors 1216 and 1217. It should be noted that during all the pulses including the pulsing of this tenth pulse over conductors 1216 and 1217 the right-hand terminal of resistor 1218 is open because relay 1215 is released. Consequently, when the call identifying sender by means of the party test circuit 710 tests for ring and tip party, the sender will register a ring party call.

At the end of the tenth pulse, brush arms 1422 and 1423 have been advanced to their No. 10 position so that upon the release of relay 1424 at the termination of the tenth pulse when the left-hand contacts of relay 1412 reclose and relay 1211 reoperates, a circuit will be completed for the operation of relay 1419 which circuit extends from battery through the winding of relay 1419, the break contacts of relay 1424, the upper inner operated contacts of relay 1115, the brush arm 1422 and the No. 10 bank terminal upon which this brush arm was resting to ground through the lower outer operated contacts of relay 1115. Relay 1419 in operating completes a circuit for maintaining itself operated under control of the off-normal contacts 1426 of the stepping switch which circuit extends from battery through the winding of relay 1419 and its lower inner operated contacts, the lower operated contacts of the off-normal contacts 1426 to ground through the second set of normal contacts from the bottom of relay 1113. A second locking circuit for relay 1419 extends from its lower inner operated contacts to ground through the lower operated contacts of relay 1417.

The operation of relay 1419 transfers the operating circuit of relay 1211 frcm the pulsing contacts of relay 1412, to ground through the lower break contacts of relay 1121 thus preventing relay 1211 from repeating further pulses at this time. Thereafter, upon the release of relay 1118, a circuit is completed for the operation of the release magnet 1421 which circuit extends from battery through the winding of magnet 1421, the upper operated off-normal contacts 1426, the lower operated contacts of relay 1419, the break contacts of relay 1118 to ground through the second set of unoperated contacts from the bottom of relay 1113. The operation of the release magnet 1421 releases the brush arms 1422 and 1423 and thus restores the stepping switch of Fig. 14 to its normal or initial condition. Meantime, however, the operation of relay 1419 completes circuits through both the upper and lower windings of relay 1210. The circuit through the lower winding extends from battery through the lower winding of relay 1210, the upper outer operated contacts of relay 1419 to ground through the second set of unoperated contacts from the bottom of relay 1113. The circuit through the upper winding extends from battery through the upper winding of relay 1210, the break contacts of magnet 1110 to ground through the middle set of lower operated contacts of relay 1419. The currents through the upper and lower windings of relay 1210 are opposed so this relay does not operate at this time. The operation of relay 1419 completes a circuit through its second set of operated contacts from the bottom for operating the stepping magnet 1110 of the stepping switch shown in Fig. 11. The operation of stepping magnet 1110 interrupts the above-described circuit of the upper winding of relay 1210, thus permitting relay 1210 to operate due to current flowing through its lower winding. Relay 1210 in operating interrupts the above-described operating circuit of relay 1115 thus releasing this relay. The release of relay 1115 interrupts the operating circuit of the pulsing relays 1410, 1412 and 1413, thus preventing further operation of these relays. In addition, these relays remaining in one position, either relays 1418 and 1417 or relay 1417 releases. In addition, the operating circuit of relay 1211 is transferred to ground through the right-hand outer operated contacts of relay 1024 in a circuit described above. The above described circuits for operating relays 1118, 1424 and the stepping magnet 1420 are interrupted. Upon the restoration of the stepping switch of Fig. 14 to normal and the opening of the off-normal contacts 1426 as described above together with the release of relays 1417 and 1115, both the operating and locking circuits of relay 1419 are interrupted thus permitting this relay to release and interrupt the above-described operating circuit of relay 1210. Relay 1210, however, does not immediately release because it is a slow-release relay. Likewise, the release of relay 1419 interrupts the above-described operating circuit for stepping magnet 1110, thus permitting this magnet to release and advance its associated brush arms 1119, 1120, 1117, 1112, 1124 and 1125 from their No. 25 position to position No. 26.

Identifying the calling subscriber's line

When a digit is dialed into the call identifying sender shown in Figs. 7 and 8, which digit is a zero, as described above under the assumed conditions, the call identifying sender advances and seeks an idle identifier circuit and when an idle identifier is found an identifier connector relay such as relay 713 is operated. This relay extends connections between an identifier circuit and the call identifying sender. Upon the establishment of a connection between the call identifying sender and the identifier a circuit is completed for the operation of relay 1223 by the application of the proper potential to lead 1222 in the sender circuit. The potential applied to this lead is in such a direction as to cause relay 1223 to operate in a negative direction, i.e., to close its lower contacts. The circuit for actuating relay 1223 extends from conductor 1222 through the windings of relay 1223 and then through the left-hand two sets of inner operated contacts of relay 1024. These contacts extend through resistors 1032 and 1033 to ground and battery and thus complete the circuit for the operation of relay 1223. At this time, relay 1223 closes the four lower sets of lower make contacts but does not close its upper set of make contact since this relay is a polar relay and has the current flowing through in the direction to close only the lower set of contacts at this time.

The operation of relay 713 in extending connections between the call identifying sender and the identifier in addition to causing the operation of relay 1223 also causes the operation of a connecting relay 1510 which relay extends connections between the call identifying sender and particularly the printer control circuit 714 and the call tracing sender. The call tracing sender and more particularly the printing portions thereof are similar to the printing equipment in the automatic ticketing trunk which cooperates with the call identifying sender as described in the above-identified patent of Gooderham. In addition, a connector relay is operated for extending connections between the identifying circuit and the call tracing sender. This relay is represented by relay 610. The circuits for operating relays 610 and 1510 are substantially the same as those described in the above-identified Gooderham patent. Consequently, circuits for operating these relays are not shown herein. It is to be understood, of course, that they are provided and that they operate in substantially the same manner as do the corresponding relays in said Gooderham patent.

The operation of the connecting relay 610 and relay 1223 completes three circuits between the call tracing sender and the identifier. The first of these circuits causes the operation of relay 631 in a circuit extending from battery through the winding of relay 631, the upper operated contacts of relay 610, the lower operated contacts of relay 1223 to ground through the upper inner operated contacts of relay 1225.

The operation of the route relay 631 in the identifier circuit designates the office X or any other suitable office as the calling office to the call identifying sender. Inasmuch as the call identifying sender and the call tracing sender at office Y have already identified the calling office X, it is unnecessary to make use of the designation of any particular office by the route relay 631. However, it is necessary to operate this relay and to convey route information to the sender circuit as well as complete checking and other circuits to insure the proper operation both of the identifier circuit and the sender circuit. The cross-connections from the contacts of the route relay 631 will be transferred to the calling code registers 715, 716 and 717 and to other circuits and registers as described in the above-identified Gooderham patent. This information is then used to control a printer control circuit and the printing as will be described hereinafter.

The operation of relay 631 together with the operation of relay 1223 in addition complete a circuit for the operation of relay 513 which circuit extends from battery through the winding of relay 513, a third set of operated contacts from the top of relay 610, the right-hand inner operated contacts of relay 1028, the lower inner operated contacts of relay 1223 to ground through lower break contacts of relay 1215 and the right-hand outer operated contacts of relay 1024.

As described above, the party test circuit 710 makes a ring party identification immediately after the zero is dialed into the call identifying sender because the circuit through resistance 1218 is open at the contacts of relay 1215 at this time. Consequently, the call identifying sender will normally cause the identifier to search through the ring party field at this time. However, due to the operation of relay 513 the circuit for the operation of relay 511 extends from the call identifying sender and more particularly from the party test circuit 710 through contacts of the connecting relay 713, the lower outer operated contacts of relay 513, the lower break contacts of relays 515 and 514 to battery through the winding of relay 511. Relay 511 operates and applies ground to a circuit for the operation of relay 211 which causes the identifier to start searching through the ring field of cross-connections.

The operation of relays 610 and 1223 also completes a circuit for applying a source of tone 612 from the identifier through the lower inner operated contacts of relay 610, the third set of operated contacts from the bottom of relay 1223, the middle set of left-hand operated contacts of relay 1028, brush arm 1029 and the terminal on which this brush arm is resting and then through the lower inner operated contacts of relay 943, the lower brush arm 941, the operated contacts of relay 937, the brush arm 942 and then over the sleeve conductor which extends through the outgoing repeater 105 shown in Fig. 1 and Fig. 13 and then over the sleeve conductors of the selector switches 104, 103, 102 and the line finder switch 101 to the sleeve terminal of the subscriber's line 100 upon which the nuisance call originated. From the subscriber's line terminal cross-connections extend to the thousands number circuit 127 of Fig. 1 which is shown in greater detail in Fig. 2. Thus, the identifier starts searching for the tone on a subscriber's sleeve conductor which is cross-connected to the ring search field of the identifier.

If the identifier does not find the tone during the time the relay 211 is operated, then relay 412 operates and a search is made through another group of connections in the ring field extending to the subscriber's line. In this manner, all the subscribers' lines having connections extending to the ring field are searched. The search, of course, is initiated by the operation of relay 511 which completes circuits in addition to those shown herein in a manner described in the above-identified Gooderham patent. Since this operation is described in detail in said Gooderham patent, the circuits and their operation have not been repeated herein.

These circuits, however, are provided and operate in their normal manner in cooperating with the various circuits described herein.

Since it is not known whether the nuisance call originated on the subscriber's line having connections extending to the ring field or the tip field, it is necessary to search through both of these fields should the line not be identified in the search through the ring field. Consequently, if the line has not been identified by the time all of the subscribers' lines connected to the ring field have been searched, a circuit will be completed for the operation of relay 514 which circuit extends from ground through resistor 516, the winding of relay 514 and its upper break contacts, the inner operated contacts of relay 513, the upper operated contacts of relay 415 and then through the middle set of upper operated contacts of relays 414, 413 and 412, the lower inner break contacts of relay 509 and the operated contacts of relay 511 to battery. The above-described circuits extend through operated contacts of relays 412, 413, 414 and 415. These relays as well as any intermediate relays in the searching progress chain in the identifier are all operated in the process of searching through the terminals in the ring field in the manner described in the above-identified Gooderham patent. Consequently, it is not necessary to complicate the present disclosure by copying these control circuits and repeating the description of their operation.

The operation of relay 514 interrupts the above-described operating circuit of relay 511 which relay releases and in turn causes the identifier circuit to release the searching relays 412 through 415. The release of relay 511 as well as the release of the searching relays 412 through 415, inclusive, removes the shunt circuit from around the winding of relay 515, thus permitting relay 515 to operate in a circuit extending from battery through the upper operated contacts of relay 514, the winding of relay 515 and resistor 517 to ground. The operation of relay 515 at this time transfers the circuit of the conductor from the party test circuit 710 directing a search in the ring field to the winding of relay 512 which directs a search in the tip field. The circuit for operating relay 512 at this time extends to battery through the winding of relay 512, the lower outer operated contacts of relay 515, the lower operated contacts of relay 513 to the sender circuit through the operated contacts of the identifier connector relay 713. Relay 512 in operating causes the identifier to now search in the tip field and operate relay 212 instead of relay 211 and the corresponding other relays directing a search in the tip field. If no cross-connections are found in the tip field, then a circuit is completed for the operation of relay 416 which relay then operates to cause the circuits to operate as described in the above-identified Gooderham patent to bring in an alarm or a second identifier in any other desired way. The operation of this relay indicates that it is impossible to identify the line. The circuit for the operation of relay 416 at this time extends from ground through the winding of relay 416, the middle set of lower operated contacts of relay 515, the upper inner operated contacts of relay 513 through the upper operated contacts of relays 415, 414, 413 and 412, the lower inner operated contacts of relay 512 to battery.

Thus, by operating relay 513 the circuits of the identifier are modified so that the identifier first searches through all the conductors in the ring field and then through all the conductors in the tip field so that the subscriber who initiated the nuisance call will be identified independently of whether or not he is a tip or ring party subscriber and independently of whether or not the cross-connections extend from his line to either or both of the tip and ring fields in the identifier.

Except for searching in both fields, the operation of the identifier circuit is substantially the same as described in the above-identified Gooderham patent with the result that the detector circuits in the sender are operated and cause a number identifying the calling subscriber's line to be entered into the registers 718, 719, 720 and 721. Likewise, the calling code registers 722, 723, 724 are also set in accordance with the office code of the calling subscriber's station in the manner analogous to that described in the above-identified Gooderham patent. Normally, these registers are set under control of the thousands group relay in which connections extend to the calling subscriber.

Assuming now that the subscriber's line 100 has been identified during the search either through the tip field or the ring field and that the registers 715 through 724 in the call identifying sender have the proper numbers entered in them as a result. The sender will then start and control circuits to cause the outpulsing circuit 729 to control the outpulsing and the printer control circuit to control the printing, both under control of the numerals entered into the registers 715 through 724. In addition, the zero dialed into the sender will be registered in the sender as described herein. The outpulsing circuit 729 thereupon proceeds to send out pulses representing the called code under control of the registers 715, 716 and 717. These pulses are transmitted to relay 1219 which relay follows its pulses. However, since relay 1114 is released at this time no use is made of the pulses sent out by the call identifying sender at this time. The sender will send out pulses in accordance with the registers 715 through 717 in the manner similar to that described in the above-identified Gooderham patent. Thereafter the outpulsing circuit will await the reception of additional digits.

Substantially simultaneously with the operation of the outpulsing circuit 729 the call identifying sender through its printer control circuit 714 attempts to cause the numerals entered into the various registers in the sender to be printed by a printing mechanism in the call tracing sender at station X.

*Transmitting the identification of the nuisance call from the subscriber to office Y*

As described above, the stepping switch in Fig. 11 was advanced to position 25 where it caused call tracing sender to dial a 0 into the call identifying sender. At the end of the 0 the stepping switch of Fig. 11 was advanced from position 25 to position 26 in the manner described above. With the stepping switch in position 26 and relay 1223 operated as described above, the stepping switch of Fig. 11 is advanced to position 27. The operation of relay 1223 completes a circuit for the operation of relay 1419 in a circuit extending from battery to the winding of relay 1419, the break contacts of relay 1424, the second set of operated contacts from the bottom of relay 1223, the lower operated contacts of relay 1225, terminal No. 26 and brush arm 1120 through the upper break contacts of relay 1210, through the third set of operated contacts from the right of relay 1028 to ground through the upper operated contacts of relay 1225. Relay 1419 in operating completes the above-described circuits through the upper and lower windings of relay 1210. Relay 1419 in operating also completes a circuit for the operation of stepping magnet 1110 from battery to the winding of this magnet to ground through the middle set of lower operated contacts of relay 1419. Magnet 1110 in operating interrupts the above-described circuit through the upper winding of relay 1210 and thus permits this relay to operate due to current flowing through its lower winding of this relay. Relay 1210 in operating interrupts the above-described circuit for operating relay 1419 which relay releases and in turn opens the operating circuit of relay 1210 and the stepping magnet 1110. The release of the stepping magnet 1110 advances the brush arms from position 26 to position 27. Relay 1210 is sufficiently slow in releasing so that it does not close its contacts until after the stepping switch of Fig. 11 has advanced to its No. 27 position.

Upon the stepping switch of Fig. 11 to position No. 27 and the subsequent release of relay 1210 a circuit is completed for the operation of relay 1123 which circuit extends from battery through the winding of relay 1123, the second set of break contacts from the bottom of relay 1430, terminal No. 27 and brush arm 1120, the upper break contacts of relay 1210, the second set of operated contacts from the right of relay 1028 to ground through the upper operated contacts of relay 1225.

The operation of relay 1123 prepares the circuits of the printing mechanism of the call tracing sender for printing. Thus, when the call identifying sender is ready to print it will apply ground to the conductor extending through the multicontact connecting relay 1510 for operating the motor control relay 1427. Relay 1427 operates and applies power to the motor 1431 which motor drives the printing mechanism. In addition, the sender will apply ground to one of the printing leads extending to the distributor mechanism 1435 of the printer.

As shown in Figs. 31 and 32 the first symbol to be printed under control of the call identifying sender is an asterisk. Consequently, when the call identifying sender advances to the stage for controlling printing and after the motor control relay 1427 has been operated as described above, the call identifying sender applies ground to the asterisk lead extending through the multicontact relay 1510 to the printing mechanism of Fig. 14 in the call tracing sender. The application of ground to this lead causes relay 1438 to operate and connect the winding of the print magnet 1428 through the inner operated contacts of relay 1438 to the continuous segment 1437 of the distributor 1435. As a result, when the brush arm 1432 comes in contact with the asterisk segment, a circuit is completed for the operation of the print magnet 1428 from battery through the winding of the print magnet 1428, the inner operated contacts of relay 1438, segment 1437, brush arm 1432 and the asterisk segment to ground over the asterisk lead extending to the call identifying sender. The operation of the print magnet causes an asterisk to be printed and applied ground to both leads 1433 and 1434. The circuit for applying ground to the conductor 1433 is obvious and the circuit for applying ground to conductor 1434 extends from ground through the operated contacts of the print magnet 1428 and the outer operated contacts of relay 1438 to conductor 1434 extending to the call identifying sender.

The application of ground to these two leads causes the call identifying sender to advance and remove ground from the asterisk lead with the result that the print magnet 1428 and relay 1438 both release. The release of the print magnet 1428 removes ground from the leads 1433 and 1434 extending to the call identifying sender whereupon this sender advances and again applies ground to the asterisk lead to cause a second asterisk to be printed in the manner similar to that described above. After the printing of the second asterisk the call identifying sender again advances and applies ground to one of the print leads to print the next symbol. As illustrated in both Figs. 31 and 32 the next symbol will be a numeral representing the code of the calling office. Under the conditions assumed above this will be a code representing office X. Inasmuch as this code is already known at office Y it is not necessary to transmit signals to office Y representing this code. Instead, the code will merely be printed by the printing mechanism in office X in order to properly advance the call identifying sender. Under the assumed conditions as shown in Fig. 32 this first code will represent the numeral 6. Consequently, the call identifying sender will then ground the No. 6 printing conductor. The call identifying sender will then maintain ground on this conductor for the brush arm 1432 will continue to rotate until relay 1123 operates as described above.

The operation of relay 1123 and the application of ground to one of the numeral printing leads as described above will cause the printing mechanism to print the corresponding numeral. Thus, the operation of relay 1123 at this time extends a circuit of the print magnet 1428 from battery through the winding of the magnet 1428 and then through the upper outer operated contacts of relay 1123 to the continuous segment 1437 of the printing distributor. Consequently, when the brush arm 1432 engages the No. 6 segment under the assumed conditions, a circuit is completed for operating the print magnet 1428 over the ground supplied over the No. 6 lead from the call identifying sender. The operation of the print magnet 1428 causes the brush arm 1432 to stop and a corresponding number to be printed on the ticket or card and in addition the print magnet grounds lead 1432 extending to the call identifying sender to contacts of the multicontact connecting relay 1510. In addition, the operation of the print magnet 1428 completes a circuit for the operation of relay 1118 which circuit extends from battery through the winding of relay 1118, the second set of operated contacts from the top of relay 1123, the break contacts of relay 1438, to ground through the operated contacts of the print magnet 1428. Relay 1118 in operating completes a circuit for the operation of relay 1122 which circuit extends from battery through the winding of relay 1122, the second set of lower operated contacts of relay 1123, the operated contacts of relay 1118 to ground through the second set of normal contacts from the bottom of relay 1113. The operation of relay 1122 connects ground to the conductor 1434 extending to the call identifying sender in a circuit extending from conductor 1434 through the upper operated contacts of relay 1122 to ground through the lower outer operated contacts of relay 1123.

The application of ground to the conductor 1434 extending to the call identifying sender causes this sender to advance and to remove ground from the printing lead extending to the printing distributor 1435 with the result that the print magnet 1428 releases and in turn releases relays 1118 and 1122. The release of relay 1122 removes ground from the conductor 1434 and the release of the print magnet 1428 removes ground from conductor 1433 with the result that the call identifying sender will advance and apply ground to the same or another one of the printing conductors extending to the printing mechanism through contacts of relay 1510. As a result, the above-described cycle of operations is repeated and the second numeral or digit of the calling office identification will be printed and the circuits controlled in the above-described manner. Likewise, under the assumed conditions the third numeral of the office code will be printed. Next, the call identifying sender will ground the dash conductor to cause a dash to be printed.

When ground is applied to the dash conductor of the printer from a call identifying sender a circuit is also completed for operating relay 1425 from battery through its lower winding from the ground connected to the dash conductor or segment. Relay 1425 operates and completes a circuit for the operation of relay 1430 from battery through the third set of operated contacts from the top of relay 1123, the winding of relay 1430, the lower inner break contacts of this relay and the lower inner operated contacts of this relay 1425 to ground on the dash lead supplied from the call identifying sender. Relay 1125 in operating also grounds conductor 1433. Relay 1430 in operating completes a circuit for maintaining itself operated from battery through the third set of operated contacts from the top of relay 1123, winding of relay 1430, lower inner operated contacts of relay 1430 to ground through the second set from the bottom of normal contacts of relay 1419. In addition, relay 1430 in operating transfers the holding circuit of relay 1123 to ground through its second set of operated contacts from the top.

When the brush arm 1423 passes over the dash segment the above-described circuit will be completed for the operation of the print magnet 1428 which stops the operation of the brush arm and causes the dash to be printed. The print magnet in addition grounds conductor 1433 extending to the call identifying sender and in addition completes the above-described circuit for the operation of relay 1118 which relay in turn causes relay 1122 to operate as described above and apply ground to the conductor 1434. Conductor 1434 extends to the call identifying sender and causes this sender to advance and remove ground from the dash conductor whereupon relay 1425 and print magnet 1428 release.

The release of relay 1425 completes a circuit for the operation of relay 1419 which circuit extends from battery through the winding of relay 1419 and through break contacts of relay 1424, the upper inner operated contacts of relay 1123, the upper break contacts of relay 1425, the second set of operated contacts from the bottom of relay 1430, terminal No. 27, brush arm 1120, the upper break contacts of relay 1210, the third set of operated contacts from the right of relay 1028 to ground through the upper operated contacts of relay 1225. The operation of relay 1419 interrupts the above-described operating circuit of relay 1430, thus permitting this relay to release. In addition, the operation of relay 1419 completes the circuits described above through the upper and through the lower windings of relay 1210. Relay 1419 in operating completes a circuit for the operation of the stepping magnet 1110 described hereinbefore and magnet 1110 in operating interrupts the circuit of the upper winding of relay 1210; permitting relay 1210 to operate due to current flowing through its lower winding. Relay 1210 in operating interrupts the operating circuit for both relays 1123 and 1419 described hereinbefore, thus permitting these relays to release. Relay 1419, in releasing interrupts the circuit of the stepping magnet 1110 causing this magnet to release and the brush arms 1119, 1120, 1117, 1112, 1124 and 1125 to advance from their No. 27 terminals to their No. 28 terminals.

The release of relay 1419 also interrupts the above-described operating circuit of relay 1210, thus permitting this relay to release. Relay 1210, however, is a slow-release relay and does not release until after the brush arm of the stepping switch in Fig. 11 has advanced from the No. 27 to the No. 28 position or terminals.

The release of relay 1210 with brush arm 1120 in its No. 28 position, completes a circuit for the operation of relay 1113 from battery through the winding of relay 1113, the No. 28 bank terminal and brush arm 1120, the upper break contacts of relay 1210, the third set of operated contacts from the right of relay 1028 to ground through the upper operated contacts of relay 1225.

The operation of relay 1113 prepares circuits for both printing and transmitting signals. For example, the operation of relay 1113 connects ground through its second set of operated contacts from the top to the lower terminal of resistor 1416 and the left-hand terminal from condenser 1411, thus causing the pulse generating relays 1410, 1412 and 1413 to be set into operation to generate pulses. As a result, relays 1418 and 1417 are operated in the manner similar to the manner that relays 2810, 2812 and 2813 are operated as described hereinbefore. Meantime, the release of the printing magnet 1428 after the dash has been printed, interrupts the operating circuit of relay 1118 which in turn releases relay 1122, thus removing ground from the conductor 1434 extending to the call identifying sender. As a result, the call identifying sender advances and applies ground to one of the other print leads identifying the thousands numeral of the subscriber initiating the nuisance call. The application of ground to this lead causes the brush arm 1432 to stop on the corresponding segment and complete a circuit for operating the print magnet 1428 from battery through the winding of the print magnet 1428, the upper outer operated contacts of relay 1113 and then to segment 1437 and brush arm 1432 to ground on the printing conductor in the call identifying sender. The application of ground to the particular printing segment also applies ground to the corresponding segment of the stepping switch shown in Fig. 14. For example, assume that the calling subscriber's line number or identification begins with the numeral as shown in Fig. 32, then the No. 8 segment cooperating with brush arm 1423 is grounded in addition to the No. 8 segment on the printer distributor 1435.

The operation of relay 1113 together with the operation of relays 1417 and 1418 under control of the pulse relays transfers the operating circuit of the pulsing relay 1038 from the above-described outer right-hand operated contacts of relay 1024 to the pulsing contacts of relay 1412. The circuit of relay 1038 now extends from battery through the winding of relay 1038, the middle left-hand set of operated contacts of relay 1027, the lower inner operated contacts of relay 1311, the inner operated contacts of relay 1417 and the upper inner break contacts of relay 1419 to ground through the pulsing contacts of relay 1412. As a result, when the contacts of relay 1412 open, the above-described operating circuit of relay 1038 is interrupted, thus permitting this relay to release and complete a circuit for the operation of relay 1036 which circuit extends from battery through the winding of relay 1036, the outer break contacts of relay 1038 to ground through the operated contacts of relay 1039. The release of relay 1038 also interrupts the operating circuit of relay 1039 at this time. Relay 1039, however, is a slow-release relay and does not open its contacts during the dialing of the digit. Instead, it maintains its contacts closed at this time due to the pulses or spurts of current applied to its winding during the time relay 1038 is operated.

The release of relay 1038 also completes a circuit for the operation of relay 1118 from battery through the winding of relay 1118, the third set of operated contacts from the top of relay 1113, the right-hand inner operated contacts of relay 1027, the outer break contacts of relay 1038 to ground through the operating contacts of relay 1039. Relay 1118 is also a slow-acting relay and once operated maintains its contacts closed during each train of dial pulses representing a numeral or symbol identifying the line over which the nuisance call originates.

The release of relay 1038 at this time also completes circuits for the operation of relay 1424 and the stepping magnet 1420 which circuit extends from battery through the winding of relay 1424 and from battery through the winding of stepping magnet 1420 in parallel and then through the fourth set of operated contacts from the top of relay 1113 and the right-hand inner operated contacts of relay 1027 to ground through the outer break contacts of relay 1038 and the operated contacts of relay 1039. The operation of the stepping magnet 1420 causes the brush arms 1422 and 1423 to advance to their No. 1 position.

At the termination of this first open or pulse, the contacts of relay 1412 again close and complete the above-described circuit for the operation of relay 1038 with the result that relays 1036 and 1424 and the stepping magnet 1420 all release. The above cycle of operations is then repeated for each pulse transmitted, relay 1036 operating when the contacts of relay 1412 open and releasing when these contacts close. Likewise, the stepping magnet 1420 operates and advances the brush arms 1422 and 1423 one step for each pulse generated by the pulse generating relay 1412. Under the assumed condition, where the first numeral to be transmitted identifying the calling subscriber's line over which the nuisance call originated is made, eight pulses will be transmitted and cause the brush arm 1423 to be advanced to its No. 8 position. In the No. 8 position the brush arm 1423 together with the release of relay 1424 at the termination of the eighth pulse, a circuit will be completed for the operation of the advancing relay 1419. The circuit for operating relay 1419 at this time extends from battery through the winding of relay 1419, the upper break contacts of relay 1424, the upper inner operated contacts of relay 1113, brush arm 1423, the No. 8 terminal of the bank associated therewith to ground over the No. 8 printing conductor from the call identifying sender. The operation of relay 1419 completes a circuit for maintaining relay 1038 operated which relay in turn maintains relay 1039 operated and relay 1036 released and thus prevents the further transmission of pulses of reversed polarity at this time. As a result, relay 1118 also releases after a short interval of time determined by the release time of this slow-acting relay.

The operation of relay 1419 also completes a circuit through the lower winding of relay 1210, assuming that the print magnet 1428 and relay 1122 are previously operated. The circuit through the lower winding of relay 1210 extends from battery through the lower winding of relay 1210, the upper outer operated contacts of relay 1419, the second set of operated contacts from the bottom of relay 1113 to ground through the lower operated contacts of relay 1122. The operation of relay 1419 also completes the above-described circuit through the upper winding of relay 1210. The operation of relay 1419 also completes the above-described circuit for operating the stepping magnet 1110. The operation of magnet 1110 interrupts the circuit of the upper winding of relay 1210, permitting this relay to operate due to the current flowing through its lower winding. The operation of relay 1210 interrupts the operating circuit of relay 1113 and permits relay 1113 to release. Likewise, the release of relay 1113 interrupts the operating circuit for the pulse generating relays 1410, 1412 and 1413 with the result that these relays cease to generate pulses so relays 1417 and 1418 or 1417 release.

The above-described release of relay 1118 completes a circuit for operating the release magnet 1421 which in turn restores the brush arms 1422 and 1423 to their normal or initial position and opens the off-normal contacts 1426. As a result of the release of relays 1113 and 1417 and contacts 1426, the operating and the locking circuits of relay 1419 are interrupted thus permitting relay 1419 to release. The release of relay 1419 interrupts the operating circuit of the stepping magnet 1110, permitting this magnet to release and advancing the brush arms of the stepping switch shown in Fig. 11. These brush arms are thus advanced from their 28th to the 29th position.

Upon the subsequent release of the slow-release relay 1210, a circuit is completed for the operation of the interdigital timing relay 1121 which circuit extends from battery through the winding of relay 1121, the No. 29 bank terminal and brush arm 1120, the upper break contacts of relay 1210, the third set of operated contact from the right of relay 1028 to ground through the upper outer operated contacts of relay 1225.

The operation of relay 1121 again applies ground to the operating circuit of the pulse generating relays 1410, 1412 and 1413, thus causing these relays to again be set into operation and generate pulses. These pulses are employed to step the stepping switch of Fig. 14 to the No. 6 position whereupon relay 1121 is restored to its normal position and the stepping switch of Fig. 11 advanced from its 29th to its 30th position. The dialed circuits controlled by relay 1121 are substantially identical with the circuits described above when the corresponding relay 2521 was operated at office Y, the only difference being that now the stepping switch of Fig. 11 is in its No. 29 position instead of its 4th, 6th, 9th, 11th, 13th or 15th position as described at office Y. The number of pulses counted by the pulse generating circuit at this time may be any suitable number by suitably interconnecting a contact of the bank cooperating with brush arm 1422 with the lower contact of relay 1121. It is assumed herein that the time required for the operation of the pulse generating relays 1410, 1412 and 1413 and related circuits as described above provides an ample interdigital time interval. By causing more or less pulses to be counted, a longer or shorter interdigital time interval may be readily provided.

The advance of the stepping switch of Fig. 11 from its No. 29 to its No. 30 position again completes the above-described circuit for the operation of relay 1113 with the result that the second digit of the calling subscriber's number is printed and in addition a second series of dial pulses representing this number are generated in the manner described hereinbefore. Likewise, the reversing relay 1036 follows this series of pulses and transmits reversals as will be described hereinafter. At the end of the transmission of this series of pulses relay 1113 is again released and the stepping switch of Fig. 11 advanced from its No. 30 to its No. 31 position where relay 1121 is again operated for timing another interdigital time interval. The above cycle of operation is repeated for each of the succeeding digits identifying the call subscriber's line or station 100 where the nuisance call originated. At the end of the transmission of the late series of pulses representing the final digit of the identifying called subscriber's number and the printing of this digit by the printing circuits and mechanisms of Fig. 14 as described herein, the stepping switch of Fig. 11 is advanced from its No. 34 to its No. 35 position.

As described above, relay 1036 follows the pulses transmitted representing the called subscriber's line and reverses the polarity applied to the tip and ring conductors through the brush arms 1030 and 1035. The tip and ring conductors from the brush arms 1030 and 1035 extend through the upper inner operated contacts of relay 943 and then through the incoming selector switches 132 and 106 to the trunk circuit 210. The trunk circuit 210 extends to office Y where it is terminated in the outgoing repeater 205 shown in Figs. 1 and 27.

The tip and ring conductors from the trunk circuit 210 are connected to the lower winding of relay 2712. Relay 2712 is a polarized relay wherein the biasing current flowing through the upper winding thereof is insufficient to operate the relay and is in such a direction that its magnetic effect opposes the magnetic effect and the current flowing through the lower winding of this relay so long as relay 1036 at station X is released. As a result, relay 2712 does not operate so long as relay 1036 is released. However, upon the operation of relay 1036 at station X the polarity of current flowing through the lower winding of relay 2712 is reversed due to the reversal of polarity applied to the tip and ring conductors by the operation of relay 1036. As a result, the magnetic effects of the currents in the upper and lower windings of relay 2712 now aid so that relay 2712 operates. Upon the subsequent release of relay 1036, relay 2712 will release because the magnetic effects of the currents flowing through the windings are opposing with the result that they substantially cancel each other thus allowing the relay to release. In other words, relay 2712 follows and repeats the pulses representing the number or identity of the subscriber's line upon which the nuisance call originated.

Each operation of relay 2712 reverses the polarity of the battery and ground through the windings of relay 2711 applied to the tip and ring conductors extending through the selector switches 204, 203, 202 and line finder 201 and then through the operated contacts of relay 2420 and the normal contacts of relay 2419 to the winding of relay 2434.

Relay 2434 is also a polarized relay and has its winding connected to the tip and ring conductors in such a direction that this relay maintains its contacts closed so long as relays 2712 and 1036 are released. Upon the operation of relays 1036 and 2712, relay 2434 opens its contacts. This relay thus repeats the pulses transmitted from the equipment at office X as described above representing the number of the calling subscriber's line upon which the nuisance call originated.

At this time, as described, hereinbefore, the selector switch of Fig. 25 is in position 17 with relay 2516 operated. As a result, the operating circuit of relay 2611 is transferred to the contacts of relay 2434. At this time the operating circuit of relay 2611 extends from battery through the winding of relay 2611, the lower inner break contacts of relay 2515, the lower inner operated contacts of relay 2516 to ground through the contacts of relay 2434. Thus, relay 2434 repeats the pulses received from the distant central office to relay 2611 which relay in turn repeats these pulses over the tip and ring conductors 2616 and 2617 to the call identifying sender at office Y. These pulses are received in the dial pulse receiving circuit 2129 and registered in the called number registers 2125 through 2128 as the last part of the number dialed into the sender.

Relay 2611 in following these dial pulses transmitted from office X representing the line upon which the nuisance call originated also repeats these pulses to relay 2518 over a circuit extending from battery through the winding of relay 2518, the upper outer operated contacts of relay 2516 to ground through the upper contacts of relay 2611. So long as relay 2611 is operated in response to the unoperated condition of relay 1036 and the corresponding positions of the other repeating relays between these relays as described above, the circuit of relay 2518 is open. However, each pulse of reversed polarity transmitted from contacts of relay 1036 applies a pulse of current to the winding of relay 2518. Relay 2518 operates in response to these pulses of the current and maintains its contacts closed between the pulses of the current of each series of pulses. Relay 2518, however, releases during the interdigital time interval during which no pulses are transmitted. This interdigital time interval is controlled by the operation of relay 1121 in the manner described above.

The operation of relay 2518 at this time completes a circuit for the operation of relay 2824 and the stepping magnet 2820 of the stepping switch shown in Fig. 28. A circuit for operating this relay and stepping magnet extends from the battery through the winding of relay 2824 and from battery through the winding of stepping magnet 2820 in parallel and then through the lower outer operated contacts of relay 2516, the operated contacts of relay 2518 to ground through the second set of normal contacts from the bottom of relay 2513. As a result, the brush arms 2823 are advanced one step for each of the digits representing the identity of the line upon which the nuisance call originated.

Under the assumed conditions, four digits are transmitted so that in response to the fourth series of pulses representing these four digits, the brush arms 2822 and 2823 are advanced to the No. 4 position. Consequently, upon the release of relay 2518, a short interval of time after the fourth series of pulses, the operating circuits of relay 2824 and stepping magnet 2822 are interrupted. As a result, the release of relay 2824 completes a circuit for the operation of relay 2819 which circuit extends from battery through the winding of relay 2819, the break contacts of relay 2824, the upper inner operated contacts of relay 2516, brush arm 2822 and the No. 4 bank terminal to ground through the second set of operated contacts from the bottom of relay 2516. Relay 2819 in operating completes the above-described circuits through the upper and through the lower winding of relay 2610. The operation of relay 2819 also completes the circuit described above for operating the stepping magnet 2510. Stepping magnet 2510 in operating interrupts the circuit of the upper winding of relay 2610 and permits relay 2610 to operate due to current flowing through its lower winding. Relay 2610 in operating interrupts the operating circuit of relay 2516, thus permitting relay 2516 to release. The operation of relay 2819 also completes the above-described circuit for operating release magnet 2821 which magnet causes the brush arms 2822 and 2823 to be restored to their normal position and the off-normal contacts 2826 to release with the result that relay 2819 also releases and interrupts the operating circuit of stepping magnet 2510. Consequently, this magnet releases and advances the brush arms 2519, 2520, 2517, 2512, 2524 and 2525 from the No. 17 position to the No. 18 position. The release of relay 2819 also interrupts the lower circuit of relay 2610 which relay releases after a time interval determined by its slow-release characteristics.

Upon the advance of the switch of Fig. 25 into position No. 18 and the release of relay 2610 at the end of the slow-release interval time of this relay, a circuit is completed for the operation of relay 2523 which circuit extends from battery through the winding of relay 2523, the innermost upper break contacts of relay 2830, bank terminal 18 and brush arm 2519, the upper break contacts of relay 2610, the third set of break contacts from the right of relay 2428 to ground through the upper outer operated contacts of relay 2614.

Relay 2523 in operating prepares circuits for printing information received from the call identifying sender in the manner described hereinbefore.

It will be recalled that in position No. 16 the units digit of the identification of the trunk over which the nuisance call arrived at office Y was printed. This information was received from the call identifying sender at office Y and printed in the call tracing sender and transmitted to office X as described above. This number is illustrated in Fig. 32 showing the information printed on the ticket by the call tracing sender. As shown in Fig. 32 this trunk number has been substituted by crossconnections described above for the calling number and is regarded as the calling number by the call identifying sender. As shown in Fig. 32 the next symbol to be printed by the call identifying sender in office Y is a dash. Thus, when the sender is advanced by the application of ground to conductor 2834 just prior to the advance of switch of Fig. 25 from position No. 16 the sender thereafter applies ground to the dash lead. However, since neither relay 2523 nor relay 2513 is operated at this time, the dash symbol is not printed. The application of ground to the dash lead at this time causes relay 2825 to operate and remain operated so long as ground is applied to the dash lead by the call identifying sender. Consquently, upon the operation of relay 2523 in position No. 18 as described above, ground is still applied to the dash lead and relay 2825 still operated. As a result, the circuit of the print magnet 2828 is now extended to segment 2837 of the printer distributor 2835. Consequently, when the brush arm 2832 thereafter passes over the dash segment the print magnet operates and prints the dash symbol. The operation of relay 2523 completes a circuit for the operation of relay 2830 which circuit extends from battery through the third set of operated contacts from the top of relay 2523, the winding of relay 2830 and its lower inner break contacts to ground through the lower inner operated contacts of relay 2825 which ground is received over the dash lead from the call identifying sender. Relay 2830 in operating transfers its operating circuit to ground through its lower operated set of continuity contacts to ground through the lower break contacts of relay 2819. Relay 2830 in addition in operating completes a circuit for maintaining relay 2523 operated through its second set of operated contacts from the top and transfers the ground from contact 18 of the switch of Fig. 25 to the No. 7 terminal of the switch of Fig. 28 associated with brush arm 2822. The operation of relay 2830 at this time together with the operation of the printing magnet 2828 also completes a circuit for the operation of relay 2824 and the stepping magnet 2820 whose circuit extends from battery through the winding of relay 2824 and from battery through the winding of stepping magnet 2820 in parallel and then through the upper outer operated contacts of relays 2830 and 2825, the lower inner operated contacts of relay 2523 to ground through the break contacts of relay 2833 and the operated contacts of the print magnet 2820. Print magnet 2829 is operated at this time as described above due to the application of ground to the dash lead by the call identifying sender and the operation of relay 2523 and it is maintained operated until the sender advances as will be described. Magnet 2820 in operating advances brush arms 2822 and 2823 to their respective No. 1 terminals.

The operation of relay 2523 in the manner described above by the switch of Fig. 25 advancing to position No. 18 together with the operation of the print magnet 2828 also completes a circuit for the operation of relay 2518 which circuit extends from battery through the winding of relay 2518, the second set of operated contacts from the top of relay 2523 to ground through the break contacts of relay 2838 and the operated contacts of the print magnet 2828. Relay 2518 in operating completes a circuit for the operation of relay 2522 from battery through the winding of relay 2522, the second set of operated contacts from the bottom of relay 2523, the operated contacts of relay 2518 to ground through the break contacts of the second set of contacts from the bottom of relay 2513. As a result, ground from the lower operated contacts of relay 2523 extends in a circuit through the upper operated contacts of relay 2522 and the upper outer break contacts of relays 2514, 2521 and 2515 to conductor 2834 which ground causes the sender to advance and remove ground from the dash lead. As a result, relay 2825 and the print magnet 2828 both release and interrupt the above-described operating circuit for the stepping magnet 2820 and relay 2824 which magnet and relay release. The release of the stepping magnet 2828 also interrupts the above-described operating circuit of relay 2518 and this relay in turn releases and interrupts the operatnig circuit of relay 2522 which relay then releases and removes ground from the conductor 2834 extending to the call identifying sender. As a result, the sender advances and applies ground to another one of the print conductors for printing symbols representing the month as shown in Figs. 31 and 32. This symbol is printed when the brush arm 2832 arrives over the grounded segment and causes the print magnet 2828 to operate in a circuit extending from battery through the winding of print magnet 2828, the upper outer operated contacts of relay 2523 to ground through segment 2837, brush arm 2832 and the grounded segment of the printing distributor. The operation of the print magnet 2828 causes relay 2518 to operate and this relay in turn causes relay 2522 to operate which relay grounds the conductor 2834 extending to the call identifying sender which sender then advances and removes ground from the print lead thus releasing the print magnet 2828 which magnet in turn releases relays 2518 and 2522. The removal of ground from the conductor 2834 by the release of relay 2522 advances the sender and causes it to ground another print conductor. It should be noted that when print conductors other than the dash print conductor are grounded the stepping magnet 2820 of the stepping switch of Fig. 28 is not actuated. However, each time the sender grounds a dash conductor relay 2825 is also operated with the result that the above-described circuits for operating relay 2824 and magnet 2820 are completed. The stepping magnet 2820 operates in this manner for each dash printed by the call tracing sender. Each operation of the stepping magnet 2820 causes the brush arms 2822 and 2823 to be advanced one step thus counting the number of dashes printed. The above cycle of operations then continues and the information normally printed by the call identifying sender is printed as illustrated in Fig. 31. This information includes the month, the day of the month, hour of the day, tenth of hours, the sender number, the identifier number and then numbers representing the called office and the called number in the usual case as described in the above-identified Gooderham patent. The cut magnet 2829 is also operated under control of the call identifying sender and cuts the tickets as described hereinafter. As pointed out hereinbefore and as shown in Fig. 32 these numbers represent the number of the calling station originating the nuisance call.

The code of office X which is the office of the subscriber originating nuisance call is printed from the call identifying sender at office Y and obtained from the trunk relay which was operated and directed the checking call to office X. The line number of the subscriber originating the nuisance call is obtained by the operations described above at office X and transmitted to office Y and stored in the call identifying sender at office Y. This number is dialed into the sender and in place of the usual called number. As a result, this number is printed as the called number from the sender as shown in Figs. 31 and 32.

It should be noted that the zero dialed into this sender has been discarded due to cross-connections from the route relay which indicated that the zero was part of the office code and superseded by the code set up by the route relay. In addition, this called number is pulsed out by the call identifying sender over conductors 2621 and 2620 with the result that relay 2619 follows pulses representing this number. However, since the contacts of this relay are not connected at this time, no use is made of these pulses because it is not necessary or desirable to set up any connections under control of these pulses when the call identifying sender is used in combination with the call tracing sender as described herein.

Following the number of the line upon which the nuisance call is originated the sender will print designations indicating the calling class i.e., call tracing service, and such other information as may be desired. The last thing printed by the sender will be another dash. In all, as shown in Figs. 31 and 32 seven dashes are printed by the sender while the switch of Fig. 25 is in position No. 18. In response to each of these dashes the brush arms 2822 and 2823 advance one step. As a result, when the seventh dash is printed the brush arm 2822 advances to its No. 7 terminal. When the sender advances and removes ground from the dash lead after this seventh dash is printed, relay 2824 releases and stepping magnet 2820 also releases in the manner described above. At this time, a circuit is completed for the operation of relay 2819 which circuit extends from the battery through the winding of relay 2819, the break contacts of relay 2824, the upper inner operated contacts of relay 2523, the upper break contacts of relay 2825, brush arm 2823 and the No. 7 terminal of the associated bank, the upper inner operated contacts of relay 2830, terminal No. 18 and brush arm 2519 of the switch of Fig. 25, the upper break contacts of relay 2610, the third set of break contacts from the right of relay 2428 to ground through the upper outer operated contacts of relay 2614. As a result, relay 2819 operates and completes its locking circuit and interrupts the locking circuit of relay 2830 which relay in turn releases and interrupts the circuit of relay 2523. Relay 2819 in operating also completes a circuit through the upper winding of relay 2610 and also a circuit through the lower winding of relay 2610 as described hereinbefore. Relay 2819 in operating also completes a circuit for operating the stepping magnet 2510 as described hereinbefore. Magnet 2510 in operating interrupts the circuit through the upper winding of relay 2610 and as a result relay 2610 operates due to current flowing through its lower winding. Relay 2610 in operating removes ground from brush 2519, thus releasing and preventing the operating of relay 2523 at this time.

The operation of relay 2819 completes a circuit for operating the release magnet 2821 which magnet releases the stepping switch of Fig. 28 and in turn interrupts the locking circuit of relay 2819. Relay 2819 in turn releases.

The release of relay 2819 causes stepping magnet 2510 to release and upon the release of this magnet the brush arms 2519, 2520, 2517, 2512, 2524 and 2525 advance from the No. 18 position to the No. 19 position.

In advancing from the No. 18 position to the No. 19 position the brush arm 2517 interrupts the above-described operating circuit for relay 2614 which relay thereupon releases.

As described above, the identity or number of the calling subscriber's station or line upon which the nuisance call originated is transmitted to the call identifying sender at office Y and recorded in this sender. As described above, upon receiving this information the sender records this information both for causing pulses representing this information to be transmitted from the sender over conductors 2621 and 2620 to relay 2619 and also to control printing as described herein. Relay 2619 follows the various pulses transmitted by the call identifying sender which pulses are similar to those received from office Y by this sender over the trunk circuit in the manner described above. While relay 2619 follows these signals or pulses it does not repeat them to any other circuits or apparatus because the circuit of its contacts is opened at the contacts of relay 2514. The above-described operation of the call identifying sender at office Y takes place with the switch of Fig. 25 in any of the positions 17, 18 and 19. Usually, the outpulsing of this information by the call identifying sender will take place shortly after the information is received by the sender and thus during the time the switch of Fig. 25 is in positions 17 and 18. As described above, the printing of this information together with other information takes place with the switch in position 18. Consequently, when the switch of Fig. 18 arrives in position 19 both the outpulsing of the information by the sender and thus by relay 2619 and also the printing of this information has been completed. Upon the completion of the outpulsing of the information by the call identifying sender, this sender applies ground to conductor 2622 which in turn causes relay 2623 to release its lower set of contacts and operate the upper set of contacts. This ground extends from conductor 2622 through both windings of relay 2623 and then through the left-hand two inner sets of operated contacts of relay 2412 to the middle point of the voltage divider comprising resistors 2432 and 2433 which resistors are in turn connected to ground and battery, respectively.

Consequently, when the switch of Fig. 25 advances to position 19 and with the upper contacts of relay 2623 closed, a circuit is completed for the operation of relay 2624 which circuit extends from battery through the winding of relay 2624, the upper operated contacts of relay 2623, the lower inner operated contacts of relay 2613, the middle set of released contacts of relay 2614, terminal No. 19 and brush arm 2517 to ground through the right-hand outer operated contacts of relay 2412. Relay 2624 in operating interrupts the bridge or path between conductors 2616 and 2617 extending to the sender of Fig. 22 with the result that the sender circuits will advance. When the sender has printed out all the information as in the assumed conditions when the switch of Fig. 25 stepped from position 18 to position 19, the sender circuit in advancing removes ground from the sleeve conductor 2626, thus indicating that the sender has been dismissed and restored to normal. Removal of ground from the sleeve conductor 2626 interrupts the circuit through the winding of relay 2613, thus permitting relay 2613 to release. The release of relay 2613 at this time again applies start ground to conductor 2627 in a circuit extending from ground through the right-hand outer operated contacts of relay 2412 and the upper inner break contacts of relay 2613 to the conductor 2627 extending through the winding of relay 2210 to battery. The start relay 2210 again starts the trunk and call identifying sender finder into operation and in effect indicates to the senders and finder equipment that it is desired to use the sender of another call. In the call identifying equipment, as set forth herein, however, the second use of the sender is for the same call.

The release of relays 2613 and 2614 completes a circuit for the operation of relay 2819 and relay 2819 in operating causes the switch of Fig. 25 to advance from position 19 to position 20.

The circuit for operating relay 2819 at this time extends from battery through the winding of relay 2819, the break contacts of relay 2824, the lower break contacts of relay 2610, the lower inner break contacts of relay 2613, the center set of unoperated contacts of relay 2614, terminal No. 19 and brush 2517 to ground through the right-hand outer operated contacts of relay 2412. Relay 2819 in operating completes circuits through both of the upper and lower windings of relay 2610 described hereinbefore. In addition, the operation of relay 2819 completes a circuit for the operation of the stepping magnet 2510 which magnet in operating interrupts the circuit through the upper winding of relay 2610. It should be noted that the completion of the circuit through the upper winding of relay 2610 does not cause the operation of relay 2614 because of the high resistance of the diode or rectifier 2630 which is poled to be non-conducting or interpose its high or back resistance in series with relay 2624 at this time. The interruption of the circuit through the upper winding of relay 2610 permits relay 2610 to operate and interrupt the circuit of relay 2819 which relay in turn interrupts the circuit of the stepping magnet 2510 and thus allows this magnet to release and advance the brush arms of the switch of Fig. 25 from position 19 to position 20.

The advance of the switch of Fig. 25 from position 19 to position 20 completes a circuit for the operation of relay 2615 which circuit extends from battery through the winding of relay 2615, terminal No. 20 and brush arm 2517 to ground through the right-hand outer operated contacts of relay 2412.

Relay 2615 in operating interrupts the above-described path for operating relay 2420 with the result that the relay 2420 releases and interrupts the connection between the tip and ring conductors of the line or path 2431. Consequently, the above-described path for operating relay 2711 through the line finder 201 and switches 202, 203 and 204 is also interrupted. Relay 2711 thereupon releases and interrupts the connection through the lower winding of relay 2712 between the tip and ring conductors of the trunk 210 extending to office X. In addition, the release of relay 2711 interrupts the operating circuit for the slow-release relay 2713. At the end of the release time of the slow-release relay 2713, this relay releases and removes ground from the sleeve conductor extending through the switches 204, 203, 202 and the line finder 201 with the result that all of these switches and the line finder release and restore to normal, thus interrupting the previously established path from the call tracing sender circuit to the trunk 210.

The release of relay 2711 as described above in removing the bridge or circuit path between the tip and ring conductors of trunk 210 interrupts the above-described circuit path which previously maintained relay 1037 operated. The release of relay 1037 in response to the release of relay 2711 interrupts the operating circuit of relay 1027. Relay 1027 is a slow-release relay and at the end of the release period of this relay, relay 1027 releases and in releasing releases the holding circuits of relays 1024, 1028 and 943.

The release of relay 943 interrupts the above-described locking circuit of relay 925. At the end of the release interval of relay 925, relay 925 releases and completes circuits for releasing the trunk distributor switches 130 and 131. A circuit extends from battery through the winding of the release magnet 940 of trunk distributor switch 131 through the lower set of operated off-normal contacts 933 of switch 131 and then through the second set of brushes of switch 130 through a release relay 938 of switch 130 to ground through the break contacts of relays 925 and 924. Another circuit extends through the winding of the release magnet 939 and the break contacts of relay 938 to ground through lower off-normal contacts 929 and the break contacts of relays 924 and 925. Relay 938 is a fast-operate relay and operates before the release magnet 939 has time to operate, as a result the release magnet 939 does not operate at this time. The release magnet 940, however, of switch 131 does operate and causes the switch 131 to release and restore to normal. At this time, the off-normal contacts 933 are also restored to normal and interrupt the abovedescribed circuit of release magnet 940 and the release of relay 938. As a result, both the release magnet 940 and relay 938 release. The release of relay 938 thereupon again completes the above-described circuit of the release magnet 939 which magnet thereupon releases and restores the switch 130 to its normal or unoperated condition. The off-normal contacts 929 then release and interrupt the circuit of magnet 939 with the result that this magnet also returns to its unoperated condition.

The release of relay 925 described above also removes ground from the sleeve conductor extending through the second and first incoming selector switches 132 and 133 with the result that these switches are restored to their normal unoperated condition thus interrupting the connection between the trunk 210 and the trunk distributing circuit 129 shown in Fig. 9.

The release of the switches 130, 131 and also the release of relay 925 interrupts the ground applied to the sleeve conductor of the outgoing repeater circuit 105 shown in Fig. 13. The removal of this ground will permit the release of the selector switches 104, 103, 102 and line finder 101 employed by the subscriber at station 100 in establishing the nuisance call to release when and if the subscriber at station 100 terminates the nuisance call. If the subscriber had previously terminated this nuisance call, then upon the release of relay 925 the above-described switches employed by the subscriber in making the nuisance call will also release.

The release of relay 1024 interrupts the holding circuit of relay 1211 described hereinbefore, thus permitting relay 1211 to release. Relay 1211 in releasing interrupts the conducting path between conductors 1216 and 1217 extending to the call identifying sender at office X, thus permitting this sender to release. The sender previous to the release of relay 1211 had had a zero dialed into it and was awaiting further dialing. The release of relay 1211 interrupts the circuit which was holding the sender so that the sender releases as on an abandoned call and in turn removes ground from the sleeve conductor which permits relay 1213 to release. The sender will also release relay 1219 at this time since the finder circuit is then released and the various circuits extending through the call tracing sender shown in Figs. 10, 11 and 12 and the call tracing or identifying sender are interrupted.

The stepping switch of Fig. 11 had previously been operated to position 35, as described hereinbefore. The release of relay 1024 at this time applies ground through the outer right-hand break contacts of relay 1024, brush arm 1125 and the associated No. 35 terminal and the break contacts of the stepping magnet 1110 to battery through the winding of the stepping magnet 1110. As a result, the stepping magnet 1110 operates and interrupts its operating circuit whereupon it releases and advances the brush arms. Upon the release of the stepping magnet and the advance of the brush arms to position 36 the above-described circuit for operating the stepping magnet 1110 is again completed and the above cycle of operations repeated until the brush arm steps into position 44 where the above-described operating circuit of the stepping magnet 1110 is interrupted with the switch in its normal position.

The release of the call tracing or call identifying sender in relays 1027, 1028 and 1024 cause the respective circuits controlled thereby to be restored to their initial and normal condition. Relay 1024 in releasing interrupts the operating circuit for the multicontact connector relay 1510 and permits this relay to release and interrupt the connections between the call identifying sender and the call tracing sender and in particular the connections between these circuits employed for printing. As described above, the call identifying sender has caused the office code of office X to be printed by the printer forming a part of the call tracing sender. This identification is followed by a dash which in turn is followed by four numerals representing the identity of the subscriber's line or station at which the nuisance call originated. Upon the restoration of the circuits to normal as described above and the release of relay 1510, the operation of the printing mechanism is stopped and no further information relative to the initial call is printed by the call tracing sender at office X.

Of course, when the particular call tracing sender at office X is again used to trace a nuisance call either when the call originates in office X or terminates in office X, two asterisks will be printed followed by information relative to that succeeding the nuisance call. Thus, the asterisks will clearly separate the information of the different calls so that the printing merely of the office and subscriber's identification under the conditions assumed above may be clearly recognized and distinguished from information printed relative to other nuisance calls.

Returning now to office Y the trunk and call tracing sender finder in response to ground applied to conductor 2627 as described above, finds the call tracing sender shown in Figs. 24, 25 and 26 a second time. This time the selector switch is set in position 20. It may be the same sender and trunk and call tracing sender-finder switch or it may be a different call identifier sender and call and trunk tracing sender finder. When the sender finds this call tracing sender, ground will again be applied to conductor 2626 and cause the reoperation of relay 2613. The reoperation of relay 2613 at this time completes a circuit for the operation of relay 2515 from battery through the winding of relay 2515, the upper outer operated contacts of relay 2613, terminal No. 20 and brush arm 2519 of the switch of Fig. 25, the upper break contacts of relay 2610, a third set of unoperated contacts from the right of relay 2428 to ground through the upper outer operated contacts of relay 2615.

It will be recalled that when the switch advanced from position 19 to position 20, relay 2610 was operated and was then released and upon the release of this relay and the operation of relay 2613 described above, the above-described circuit for operating relay 2515 is again completed.

The operation of relay 2515 causes a zero to be dialed into the call identifying sender with the switch of Fig. 25 in position 20 in the same manner as the zero was initially dialed into the call identifying sender when the switch shown in Fig. 25 was in position 1 as described above. As previously described, the operation of relay 2515 applies ground to the lower terminal of resistor 2816 and the right-hand terminal of condenser 2811 and thus sets the pulse generating relays 2810, 2812 and 2813 into operation. These relays generate the dialing pulse in the manner described above which pulses are transmitted to relay 2611 and relay 2611 repeats the pulses over the tip and ring conductors 2616 and 2617 to the call identifying sender. In addition, brush arms 2822 and 2823 of the stepping switch of Fig. 28 are caused to step one step for each pulse transmitted. When ten pulses have been transmitted, the brush arm 2822 will be resting in the contact of the No. 10 bank terminal and as a result at the termination of this pulse relay 2819 is operated in a manner similar to that described above after the tenth pulse has been transmitted with the switch of Fig. 25 in position 1. As a result, the switch of Fig. 28 is restored to normal and relay 2819 also released. In addition, the stepping magnet 2510 is caused to advance the brush arms of this switch from position 20 to position 21.

At the completion of the dialing of a zero into the call identifying sender the circuits of the call identifying sender advance and perform two different functions, namely, (1) the test for tip and ring party and (2) the sender calls an identifier, that is, it seeks an identifier and ultimately becomes connected to an idle identifier.

When, as assumed herein, the party seeking to have a call traced is a tip party on a party line, a cross-connection 2316 is made to a low resistor 2323 in the manner described above. As a result, with the switch of Fig. 25 in positions 20 through 24 wherein relay 2615 is operated, the tip resistor 2618 is connected to the tip conductor extending to the call identifying sender in a circuit from conductor 2616, resistor 2618, the third set of operated contacts from the top of relay 2615 to ground through the operated contacts of relay 2422. It will be recalled that both relays 2422 and 2421 are operated at this time due to the cross-connection 2316 extending to the low resistor 2323 instead of to the high resistor 2322. A circuit for operating these relays extends from battery through resistor 2323, cross-connection 2316, bank terminal and brush arm 2423, windings of relays 2421 and 2422 in series to ground through the right-hand outer operated contacts of relay 2412.

In other words, the above relays cause a circuit to be completed through resistor 2618 from the tip conductor extending to the call identifying sender to ground. Resistor 2618 imposes the same electrical conditions on the signaling conductors 2616 and 2617 as are imposed by the tip party on a two-party line. Consequently, at the completion of the dialing of the zero into the call identifying sender, the party test circuit 2114 is set into operation and indicates that the identifier is to search in the tip party field.

The call identifier sender in addition to making a party line test at this time calls in an identifier, that is, it applies an electrical condition of a lead or groups of leads which cause the identifier to be properly connected and operatively associated with the particular sender connected to the call tracing sender under the conditions assumed above.

When an identifier is fully connected, the sender will apply battery to conductor 2622 and cause relay 2623 to again close its bottom group of contacts. The top contacts of this relay are not closed at this time because the current flows through both windings in the direction to operate the lower set of contacts but leave the upper set of contacts unoperated.

The operation of relay 2623 at this time together with the operation of relay 2615 applies ground to conductor 2628 extending to the multicontact identifier trunk connector relay 2010 to cause the operation of a route relay 2031.

Normally, as described in the above Gooderham patent, when the trunk becomes connected to the identifying sender, cross-connections extend from the switches employed to extend a connection to the trunk and also from the sender to the identifier circuit for reconstructing the called office code dialed by the subscriber and employed in the switching office to reach the call ticketing trunk and identifying sender. This information is normally employed to cause the operation of a route relay which either reconstructs the office code or informs the sender as to the particular office code to be transmitted by the sender in order to reach the desired called party. However, when the sender is called in a second time at a terminating office of a nuisance call the various cross-connections normally employed to operate a relay are not provided. Instead, the above-described circuit is provided for operating the special route relay 2031 which relay will inform the call identifying sender the code of the office Y at which the route relay 2031 is located. In addition, the operation of relay 2326 at this time completes a path for applying a source of alternating current or tone 2012 from the identifier through the identifier trunk connector relay 2010 and then through the third set of operated contacts from the bottom of relay 2623 through the middle set of right-hand contacts of relay 2428, the left-hand break contacts of relay 2413, brush arm 2417 and corresponding terminal and then through the upper operated contacts of relay 2314 to the sleeve of the subscriber's line 200. The subscriber at station 200 is a subscriber to whom the nuisance call was directed and the subscriber requesting the tracing of this nuisance call. From the sleeve terminal of this subscriber's line the sleeve then extends to the terminals in the searching field of the identifier. Since this is a tip party, a cross-connection between this sleeve will be made to a particular terminal in the tip field of the identifier.

At this time the circuit for operating relay 1910 described above is open at the contacts of relay 2615 which is operated at this time. Consequently, relay 1910 does not operate at this time. As a result, the call identifying sender in response to the party test circuit 2114 after determining that the subscriber requesting the identification was a tip party grounds the STT lead which is the start lead informing the identifier to search in the tip field. As a result, relay 1912 is operated which sets the identifier circuits into operation in the manner described in the above-identified Gooderham patent. Thereupon, the identifier searches for the tone on the sleeve of the subscriber's line in a circuit described above and informs the sender of the identity of this subscriber's line. The identifier and call identifying sender operate at this time in the normal manner described in the said Gooderham application in determining the directory number of the called subscriber's line and then conveying this information to the call identifying sender.

It will be recalled that the stepping switch of Fig. 25 had previously advanced from position 20 to position 21 and that in response to the call identifying sender becoming connected to an identifier, relay 2623 was operated in the manner to close its lower sets of contacts. These contacts in closing in addition to operating the route relay 2031 and applying tone to the sleeve of the subscriber's line as described above also complete a circuit for the operation of relay 2819 which circuit extends from battery through the winding of relay 2819, the break contacts of relay 2824, the second set of operated contacts from the bottom of relay 2623, the upper inner operated contacts of relay 2615, terminal 21, brush arm 2519, the upper break contacts of relay 2610, the third set of break contacts from the right of relay 2428 to ground through the upper outer operated contacts of relay 2615. Relay 2819 in operating completes the circuits through the upper and lower windings of relay 2610 and completes a circuit for the operation of magnet 2510. As a result relay 2610 operates and interrupts the above-described operating path with the result that relay 2819 again releases. The release of relay 2819 causes the stepping magnet 2510 to be released which in turn causes the brush arms 2519, 2520, 2517, 2512, 2524 and 2525 to be advanced from position 21 to position 22. In position 22 a circuit is completed for the operation of relay 2523 which circuit extends from battery through the winding of relay 2523 through the third set of normal contacts from the top of relay 2830, terminal No. 22 and brush arm 2519 to the upper break contacts of relay 2610. When this relay releases in response to the release of relay 2819 described above and then through the third set of break contacts from the right of relay 2428 to ground through the upper outer operated contacts of relay 2615. The operation of relay 2523 prepares the circuits of the call tracing sender for printing in the manner described hereinbefore.

Thus, when the identifier has informed the sender of the identity of the called party and the sender has recorded this information in the position normally recording the identity of the calling party and the identifier has informed the sender of the route to be employed in extending the call, the sender advances and pulses out over conductors 2621 and 2620 pulses controlled by the route relay which was operated which pulses identify the station Y under the assumed conditions. Inasmuch as the contacts of relay 2619 which follow these pulses are not connected at this time, these pulses are not employed to control any circuits or apparatus at this time.

In addition, the identifying sender prepares to control the printing of a ticket. In printing the ticket, the sender grounds the various print leads in the manner described hereinbefore. As described above, the sender will first print two asterisks by grounding the asterisk conductor after relay 2827 has been operated as described hereinbefore. Ground applied to this conductor causes relay 2838 to operate and connect the printing magnet to segment 2837 of the distributor of the printer and also connects the operated contact of the printing magnet 2828 to conductor 2834 extending to the sender so that the sender will be advanced after the printing of each of the asterisks has been completed. Thus, the two asterisks are printed and then the sender grounds the appropriate conductors causing the printing of the office code of office Y which is controlled by the operation of the route relay 2031.

Next, as shown in Figs. 31 and 32 a dash is printed. Thus, ground is applied to the dash lead which causes relay 2825 to operate and the operation of this relay completes a circuit for the operation of relay 2830 which circuit extends from battery through the third set of operated contacts from the top of relay 2523, the winding of relay 2830, the lower inner break contacts of relay 2830 and then through the lower inner operated contacts of relay 2825 to ground on the dash lead from the call identifying sender. Relay 2830 completes a locking circuit and interrupts its operating circuit by actuation of the make-before-break contacts so that relay 2830 is then maintained operated under control of relays 2523 and 2819 as described above. In addition, relay 2830 in operating completes a circuit for maintaining relay 2523 operated and transfers the ground from terminal 22 of the switch of Fig. 25 to the second terminal of the stepping switch of Fig. 28. In addition, the operation of relay 2830 extends a circuit from the contacts of the print magnet 2828 to the windings of relay 2824 and stepping magnet 2820 of the stepping switch 2822 which circuit had been described hereinbefore and extends through the upper outer operated contacts of relay 2825. Consequently, when the print magnet 2828 operates to print the dash the circuits of the stepping magnet 2820 and relay 2824 are completed with the result that the brush arms 2822 and 2823 advance to their No. 1 terminal. Thereafter, the sender is advanced again and the sender will then ground the various conductors which are in normal operation of the call identifying sender as described in the above-identified Gooderham patent to identify the calling subscriber's number. In the present instance, however, these numbers are printed on the ticket card in the call tracing sender and they identify the called party which is the party requesting the tracing of the call. After these numbers have been printed, the sender will again print a dash which in turn causes the stepping switch of brush arms 2822 and 2823 to advance to their No. 2 terminals and at the completion of the printing of this dash when the call identifying sender advances and removes ground from the dash lead, the print magnet 2828 releases and permits the stepping magnet 2820 to release and relay 2824 to release. The release of relay 2824 at this time again completes a circuit for the operation of relay 2819 which circuit now extends from battery through the winding of relay 2819, the upper break contacts of relay 2824, the upper inner operated contacts of relay 2523, the upper inner break contacts of relay 2825, brush arm 2822, the No. 2 terminal, the third set of operated contacts from the bottom of relay 2830, terminal 22 and brush arm 2519, the upper break contacts of relay 2610, the third set of normal contacts from the right of relay 2428 to ground through the upper outer operated contacts of relay 2615. Relay 2819 in operating completes a circuit for operating the stepping magnet 2510 and relay 2610. Relay 2610 in operating interrupts the operating circuit of relay 2819 which relay thereupon releases and releases the circuit of the stepping magnet 2510 which magnet releases and advances the brush arms of Fig. 25 from position 22 to position 23.

In position 23 a circuit is completed for the operation of relay 2624 which circuit extends from battery through the winding of relay 2624, the No. 23 terminal and brush arm 2520 and then through the upper outer break contacts of relay 2610, when this relay releases, through the third set of normal contacts from the right of relay 2428 to ground through the upper outer operated contacts of relay 2615.

The operation of relay 2624 interrupts the circuit path between conductors 2616 and 2617 extending to the call identifying sender. As a result, the call identifying sender will advance and release the various circuits since removing the circuit path between these conductors at this time signals the call identifying sender that the call has been abandoned. When the sender is restored to normal, ground is removed from conductor 2626 with the result that relay 2613 releases and completes a circuit for the operation of magnet 2510 which circuit extends from battery through the winding of magnet 2510, its break contacts, the lower outer break contacts of relay 2613, diode or rectifier 2630 which is connected so as to present low impedance at this time, terminal No. 23 and brush arm 2520, the upper break contacts of relay 2610, the third set of contacts from the right of relay 2428 to ground through the upper outer operated contacts of relay 2615. The stepping magnet 2510 and relay 2610 operate as a result, and the operation of the stepping magnet 2510 interrupts its operating circuit so it releases and advances the brush arms from position 23 to position 24. Relay 2610 also releases.

In position 24 a circuit is completed for the operation of relay 2418 in a circuit which extends from battery through the winding of relay 2418, the right-hand outer break contacts of relay 2428, terminal No. 24 and brush arm 2512 to ground through the right-hand operated contacts of relay 2412. The operation of relay 2418 at this time interrupts the operating and locking circuit of relay 2412 with the result that relay 2412 releases and completes a circuit for operating the stepping magnet 2510 through the break contacts of the stepping magnet 2510 with the result that the brush arms of this switch are restored to their normal or No. 44 position. Circuits for stepping the stepping magnet 2510 extend from ground through the right-hand outer break contacts of relay 2412, brush arm 2525 and the corresponding terminals and then through the break contacts of the stepping magnet 2510 to battery through the winding of the stepping magnet 2510. When the brush arms reach position 44 this circuit is interrupted and the operation of the stepping magnet is also interrupted. The advance of the brush arm 2512 from position 23 interrupts the circuit of relay 2615 and thus permits this relay to release. Likewise, the release of the call identifying sender in turn causes the release of the identifier connected thereto as well as the relays in connecting the identifier with the sender or with the call tracing sender and connecting the call identifying sender with the call tracing sender. Thereafter, the nuisance call will proceed in a normal manner and upon the termination of this call the various switches, relays and control circuits employed in establishing the call will be restored to normal in their usual manner.

The various time-out alarm and checking circuits described in the above-identified Gooderham patent are also provided and operated in combination with the various circuits described herein. These various checking time-out and alarm circuits are provided to insure proper operation and aid in the maintenance and corrections of troubles when encountered in the various circuits. When normal periods for completion of a particular function when the call identifying sender is employed with the call tracing sender are longer than when employed with the ticketing trunk as described in the above-identified patent of Gooderham, the time-out interval will be correspondingly lengthened or otherwise adjusted to provide sufficient time and satisfactory operation when the call identifying sender is used in combination with either the ticketing trunk or the call tracing sender. In addition, other suitable time-out intervals may be provided for the call tracing sender described herein as well as other of the circuits cooperating therewith as is common practice. Furthermore, as set forth herein the various check circuits normally employed to insure proper operation of the various relays and apparatus are provided and suitable cross-connections made between various circuits as described herein to insure proper operation not only of the circuits themselves but also of the cross-connecting circuits. Inasmuch as the various alarm, time-out and checking circuits operate in their usual manner when employed in cooperation with the various circuits described herein, these checking, time-out and alarm circuits have not been shown or described herein.

It is to be understood that the above-described arrangements are illustrative of the application of the principles of the invention. Numerous other arrangements may be devised by those skilled in the art without departing from the spirit and scope of the invention.

What is claimed is:

1. In an automatic telephone switching system, a switching office, a plurality of communication circuits terminating at said office, each of said communication circuits having a terminal individual thereto, switching apparatus for establishing communication paths between any two of said communication circuits and the terminals individual thereto, means connected to said switching apparatus for applying a distinctive electrical signal to the individual terminal of one of two communication circuits between which a communication path is established through said switching apparatus, other apparatus for searching others of said individual terminals for said distinctive signal, and automatic printing equipment interconnected with said other apparatus for automatically recording indicia identifying both terminals of said communication path.

2. In an automatic telephone switching system, a switching station, a plurality of communication lines terminating at said switching station, each of said lines having a terminal individual thereto, automatic switching apparatus at said switching station controlled by signals from one of said communication lines for selectively establishing a communication path from said one line to another of said communication lines, apparatus including signal means individual to said other communication line for applying a distinctive electrical signal through said switching apparatus to the terminal individual to said one line, apparatus for searching the terminals of said lines for said distinctive electrical signal and apparatus controlled by said searching apparatus for recording indicia identifying said one line.

3. In a communication system, a switching station, a plurality of subscribers' lines terminating at said switching station, a plurality of trunk circuits terminating at said switching station, switching apparatus for selectively establishing connections between said lines and said trunk circuits, search equipment for searching said subscribers' lines, transfer apparatus for transferring said search equipment from searching said subscribers' lines to searching said trunk circuits, apparatus for applying a distinctive electrical signal to a subscriber's line which is connected through said switching apparatus to one end of one of said trunk circuits, and means responsive to the locating of said electrical signal on one of said trunk circuits for recording indicia identifying the location of the other end of said trunk circuit.

4. In a switching system, a switching station, a plurality of local lines terminating at said switching station, a plurality of trunk circuits terminating at said switching station and extending to other switching stations, switching apparatus for selectively establishing connections between said trunk circuits and said local lines, apparatus for transmitting a distinctive electrical signal from a line connected with a trunk circuit through said switching apparatus to the trunk circuit connected thereto, means for searching said trunk circuits for said signal, and apparatus responsive to the locating of said signal on one of said trunk circuits for automatically selectively establishing a connection with another of the trunk circuits extending to the same switching station to which said one trunk circuit extends.

5. In a switching system, a plurality of switching stations, a plurality of local lines terminating at said switching stations, a plurality of trunk circuits terminating at said switching stations and extending to other switching stations, switching apparatus at each switching station for selectively establishing connections between said trunk circuits and said local lines, apparatus for transmitting a distinctive electrical signal from a local line connected with a trunk circuit through said switching apparatus to the trunk circuit connected thereto, means for searching said trunk circuits for said signal, apparatus responsive to the locating of said signal on one of said trunk circuits for automatically establishing a connection with another trunk circuit extending to the same switching station to which said one trunk circuits extends, and apparatus at said same switching station controlled over said other trunk circuit for automatically tracing the connection from said one trunk circuit through said same switching station.

6. In an automatic switching system, a switching station, a plurality of local lines terminating thereat, a plurality of trunk circuits also terminating thereat, automatic switching apparatus connecting one of said local lines with a first one of said trunk circuits, apparatus controlled over a second one of said trunk circuits for selecting said first trunk circuit, means controlled over said second trunk circuit for maintaining the connection through said switching apparatus between said one line and said first trunk circuit, and means for automatically identifying the local line connected through said switching apparatus at said switching station to said first trunk circuit.

7. In an automatic switching system, a switching station, a plurality of local lines terminating thereat, a plurality of trunk circuits also terminating thereat, automatic switching apparatus interconnecting one of said local lines with a first one of said trunk circuits, apparatus controlled over a second one of said trunk circuits for selecting said first one of said trunk circuits, means controlled over said second trunk circuit for maintaining the connection through said switching apparatus between said one line and said first trunk circuit, means for identifying the local line connected through said switching apparatus to said first trunk circuit, and apparatus for automatically transmitting signals representing the identity of said local line over said second trunk circuit.

8. In an automatic switching system, a switching station, a plurality of local lines terminating thereat, a plurality of trunk circuits also terminating thereat, automatic switching apparatus connecting one of said local lines with a first one of said trunk circuits, apparatus controlled over a second one of said trunk circuits for selecting said first one of said trunk circuits, means under control of said second trunk circuit for maintaining the connection through said switching apparatus to said first trunk circuit, means for identifying the local line connected through said switching apparatus to said first trunk circuit, apparatus for transmitting signals representing the identity of said local line automatically over said second trunk circuit, and means for thereafter interrupting the connection between said first and said second trunk circuits without interfering with the connection between said first trunk circuit and said local line.

9. In a communication system, a plurality of switching stations, local lines terminating at said switching stations, trunk circuits interconnecting said switching stations, automatic switching apparatus at each of said switching stations for interconnecting said local lines and said trunk circuits, call tracing equipment at each of said switching stations for tracing connections through said respective switching stations, apparatus individual to each of said switching stations responsive to signals from a local line to which one of said trunk circuits is connected for tracing the connection through the one of said switching stations at which said local line terminates, means for recording the identity of said one trunk circuit, apparatus for selectively and automatically establishing a connection over another trunk circuit to the other switching station to which said one trunk circuit is connected, means at said other switching station responsive to signals received over said other trunk circuit for tracing the established connection through said other switching station, and apparatus at said one switching station for determining the identity of said local line at said one switching station.

10. In a switching system, a switching station, a plurality of two-party lines terminating at said switching station, a plurality of search fields each comprising a plurality of terminals, a terminal individual to one of the parties on each of said lines in one of said search fields and a terminal individual to the other of the parties on each of said lines in another of said search fields, apparatus controlled over one of said lines for applying a distinctive electrical signal to the terminal individual to a desired one of the parties of said line, apparatus for searching for said distinctive signal on the terminals in one of said search fields, and apparatus operative upon failure to locate said signal in said one search field for searching for said signal in said other search field.

11. In an automatic switching system, a switching station including a plurality of local lines terminating thereat, a plurality of trunk circuits also terminating thereat, automatic switching means for interconnecting said lines and said trunk circuits, call tracing equipment comprising a call tracing control circuit, apparatus controlled over one of said local lines for interconnecting said local line with said control circuit, means controlled by said control circuit for transmitting a distinctive electrical signal through said switching system means from said local line, searching means for locating said distinctive signal upon transmission through said switching means, automatic call initiating equipment, and means for actuating said automatic call indicating equipment under control of said searching equipment.

12. In an automatic switching system, a switching station including a plurality of local lines terminating thereat, a plurality of trunk circuits also terminating thereat, automatic switching means for interconnecting said lines and said trunk circuits, call tracing equipment comprising a call tracing control circuit, apparatus controlled over one of said local lines to connect said local line with said control circuit, means including said control circuit for transmitting a distinctive electrical signal through said switching means from said local line, search means for locating said distinctive signal upon transmission through said switching means including call initiating means for selectively operating said switching means to connect said call tracing control circuit to one of said trunk circuits, and means for transmitting call tracing control signals over said one trunk circuit.

13. In an automatic switching system a switching station including a plurality of local lines terminating thereat, a plurality of trunk circuits also terminating thereat, switching means for selectively interconnecting said lines and said trunk circuits, call tracing equipment comprising a call tracing control circuit, apparatus controlled over one of said local lines to connect said local line with said control circuit, means including said control circuit for transmitting a distinctive electrical signal through said switching means from said local line, search means for locating said distinctive signal upon transmission through said switching means, means including call initiating means for selectively operating said switching means to connect said call tracing control circuit to one of said trunk circuits, means for transmitting call tracing control signals over said one trunk circuit, apparatus connected with said call initiating means for receiving call tracing signals over said one trunk circuit, and means for recording indicia representing the call tracing signals received over said one trunk circuit.

14. In an automatic telephone switching system, a first switching station, a second switching station, trunk circuits interconnecting said switching stations, other communication circuits terminating at each of said switching stations, automatic switching means located at each of said switching stations for establishing connections between trunk circuits terminating thereat and other communication circuits terminating thereat, apparatus located at one of said switching stations for initiating a first one of said call over trunk circuits extending to said other switching station, and apparatus at said other switching station for identifying the communication circuit connected through the switching means thereat to another one of said trunk circuits, and means for transmitting signals from said other switching station over said first trunk circuit to said one switching station, said signals identifying said communication circuit.

15. In an automatic telephone switching system, a first switching station, a second switching station, trunk circuits interconnecting said switching stations, other communication circuits connected to each of said switching stations, automatic switching means located at each of said switching stations for establishing connections between trunk circuits terminating thereat and other communication circuits terminating thereat, apparatus located at one of said switching stations for initiating a call over a first one of said trunk circuits extending to said other switching station, and apparatus at said other switching station for identifying the communication circuit connected through the switching means thereat to another one of said trunk circuits, and means for transmitting signals from said other switching station over said first trunk circuit to said one switching station, said signals identifying the communication circuit connected to said other trunk circuit, and automatic printing equipment interconnected with said means for printing symbols representing the signals received at said first switching station.

16. In a communication system, a plurality of switching stations, local lines terminating at said switching stations, trunk circuits interconnecting said switching stations, automatic switching apparatus at each of said switching stations for interconnecting said local lines and said trunk circuits, call tracing equipment at each of said stations for tracing connections through said respective switching stations, and means responsive to said call tracing equipment at one of said switching stations for identifying the interconnecting trunk circuit, other apparatus for tracing an established connection from said identified trunk circuit through a second switching station to an interconnected local line thereat, and means for recording the identity of said local line at said second switching station.

17. In a communication system, a plurality of switching stations, local lines terminating at said switching stations, trunk circuits interconnecting said switching stations, automatic switching apparatus at each of said switching stations for interconnecting said local lines and said trunk circuits, call tracing equipment at each of said stations for tracing connections through said respective switching stations, means responsive to said call tracing equipment at one of said switching stations for identifying the interconnecting trunk circuit, other apparatus for tracing an established connection from said identified trunk circuit through a second switching station to an interconnected local line thereat, and means for transmitting signals representing the identity of said interconnected local line from said second switching station to said one switching station.

18. In a communication system, a plurality of switching stations, local lines terminating at said switching stations, trunk circuits interconnecting said switching stations, automatic switching apparatus at each of said switching stations for interconnecting said local lines and said trunk circuits, call tracing equipment at each of said stations for tracing connections through said respective switching stations, means responsive to said call tracing equipment at one of said switching stations for identifying the interconnecting trunk circuit, other apparatus for tracing an established connection from said identified trunk circuit through a second switching station to an interconnected local line thereat, means for transmitting signals representing the identity of said interconnected local line from said second switching station to said one switching station, and means at said one switching station for recording indicia identifying both of said local lines, the interconnecting trunk circuit, and the time at which said identification is made.

References Cited in the file of this patent
UNITED STATES PATENTS

| | | |
|---|---|---|
| 2,077,537 | Taylor | Apr. 20, 1937 |
| 2,440,277 | Kruithof et al. | Apr. 27, 1948 |
| 2,615,987 | Gooderham | Oct. 28, 1952 |
| 2,629,016 | Gooderham | Feb. 17, 1953 |
| 2,672,515 | Barlow | Mar. 16, 1954 |